(12) United States Patent
Nakanishi et al.

(10) Patent No.: US 8,290,071 B2
(45) Date of Patent: Oct. 16, 2012

(54) MODULATING DEVICE AND METHOD, DEMODULATING DEVICE AND METHOD, PROGRAM, AND RECORDING MEDIUM

(75) Inventors: Takashi Nakanishi, Tokyo (JP); Masato Kikuchi, Tokyo (JP); Shunsuke Mochizuki, Tokyo (JP); Masahiro Yoshioka, Tokyo (JP); Ryosuke Araki, Tokyo (JP); Masaki Handa, Kanagawa (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 12/396,770

(22) Filed: Mar. 3, 2009

(65) Prior Publication Data

US 2009/0232237 A1 Sep. 17, 2009

(30) Foreign Application Priority Data

Mar. 13, 2008 (JP) ................................. 2008-064221

(51) Int. Cl.
*H04K 1/10* (2006.01)

(52) U.S. Cl. ........ 375/260; 375/299; 375/267; 375/349; 375/347

(58) Field of Classification Search ................... 375/260, 375/299, 267, 349, 347
See application file for complete search history.

(56) References Cited

U.S. PATENT DOCUMENTS

| | | | |
|---|---|---|---|
| 6,973,118 B1 * | 12/2005 | Ikeda et al. ................ | 375/146 |
| 7,386,072 B2 * | 6/2008 | Uno ............................... | 375/344 |
| 2007/0211806 A1 * | 9/2007 | Mudulodu et al. ........... | 375/260 |
| 2007/0297323 A1 * | 12/2007 | Seki ............................... | 370/208 |

FOREIGN PATENT DOCUMENTS

| | | |
|---|---|---|
| JP | 8-316846 | 11/1996 |
| JP | 2001-148678 | 5/2001 |
| JP | 2003-230145 | 8/2003 |
| JP | 2004-328255 | 11/2004 |
| WO | WO 2005/004361 A1 | 1/2005 |
| WO | WO 2006/013729 A1 | 2/2006 |

OTHER PUBLICATIONS

Jianyu Fu, et al., "Fundamental Analysis on Throughput Characteristics of Orthogonal Frequency Division Multiple Access (OFDMA) in Multipath Propagation Environments", IEICE, vol. J85-B, No. 11, Nov. 2002, pp. 1884-1894, (with 2 cover pages), (with English Abstract and English translation).

* cited by examiner

*Primary Examiner* — Kabir A Timory
(74) *Attorney, Agent, or Firm* — Oblon, Spivak, McClelland, Maier & Neustadt, L.L.P.

(57) ABSTRACT

A modulating device configured to perform modulation with the orthogonal frequency division multiplexing method, includes: a modulating unit configured to modulate main information with the orthogonal frequency division multiplexing method; and a determining unit configured to determine a subcarrier pattern employed when modulating the main information by the modulating unit based on additional information relating to the main information.

9 Claims, 51 Drawing Sheets

RELATED ART

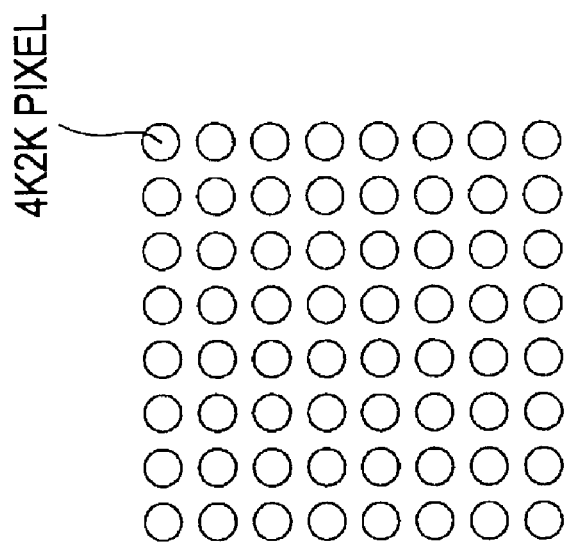
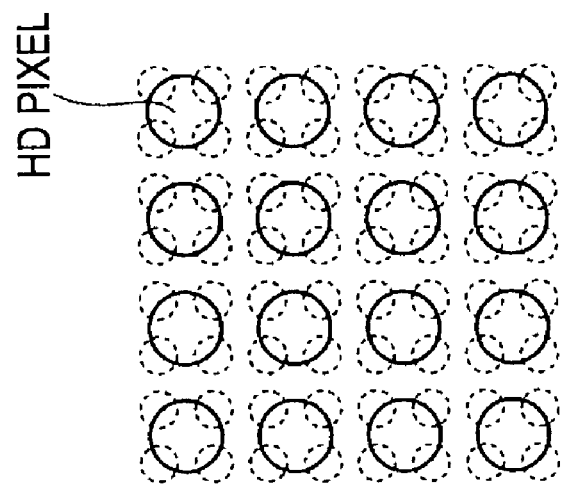
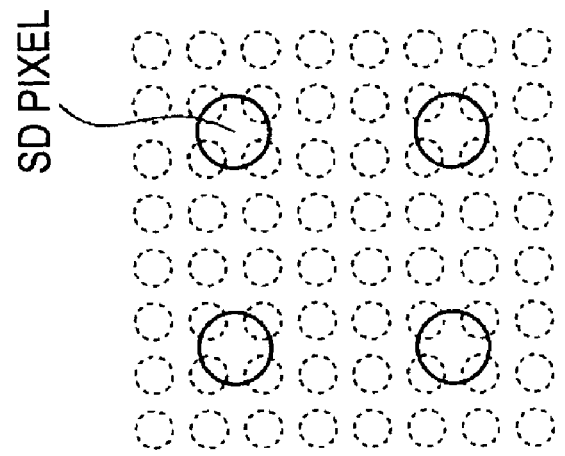

FIG. 28

| VECTOR QUANTIZATION CODE | VECTOR DATA (HD) | VECTOR DATA (SD) |
|---|---|---|
| 0 | (V0_0, V0_1, V0_2, ... V0_16) | (V0_0, V0_1, V0_2, V0_3) |
| 1 | (V1_0, V1_1, V1_2, ... V1_16) | (V1_0, V1_1, V1_2, V1_3) |
| 2 | (V2_0, V2_1, V2_2, ... V2_16) | (V2_0, V2_1, V2_2, V2_3) |
| 3 | (V3_0, V3_1, V3_2, ... V3_16) | (V3_0, V3_1, V3_2, V3_3) |
| ... | ... | ... |
| N−1 | (VN−1_0, VN−1_1, VN−1_2, ... VN−1_16) | (VN−1_0, VN−1_1, VN−1_2, VN−1_3) |

452

470

MODULATING DEVICE AND METHOD, DEMODULATING DEVICE AND METHOD, PROGRAM, AND RECORDING MEDIUM

CROSS REFERENCES TO RELATED APPLICATIONS

The present invention contains subject matter related to Japanese Patent Application JP 2008-064221 filed in the Japanese Patent Office on Mar. 13, 2008, the entire contents of which are incorporated herein by reference.

BACKGROUND OF THE INVENTION

1. Field of the Invention

The present invention relates to a modulating device and method, demodulating device and method, program, and recording medium, and specifically, relates to a modulating device and method, demodulating device and method, program, and recording medium, wherein information is included in carriers, and the information thereof is processed at a receiving side, thereby realizing high image quality and so forth.

2. Description of the Related Art

FIG. 1 is a diagram illustrating the configuration of an example of a modulating device which performs wireless modulation. A baseband signal input to the modulating device is multiplied by an optional carrier wave at a multiplier 11, and is transmitted to another device (demodulating device). The term "carrier wave", or simply "carrier", as used here is a signal for transmitting information by a transmission line (cable communication), by radio (wireless communication), or commonly by wave (light or acoustic wave or the like), i.e., a reference signal not subjected to modulation, with communication.

FIG. 2 is a diagram illustrating the configuration of an example of a demodulating device which performs wireless demodulation. The demodulating device multiplies an input signal (modulated signal) by a signal of which the frequency and phase are synchronized with the carrier employed at the time of modulation at a multiplier 21 again, extracts low-frequency components at an LPF (Low-Pass Filter) 22, thereby reproducing a transmitted signal. With modulation, a method for changing the amplitude, frequency, or phase of a carrier is employed, modulating a carrier enables various information to be transmitted.

FIGS. 3A through 3C are diagrams illustrating a modulation method. FIG. 3A illustrates a case where information is carried in amplitude, and illustrates modulation referred to as amplitude modulation (amplitude shift keying). FIG. 3B illustrates a case where information is carried in frequency, and illustrates modulation referred to as frequency modulation (frequency shift keying). FIG. 3C illustrates a case where information is carried in a phase, and illustrates modulation referred to as phase modulation (phase shift keying).

Such modulation methods, like the amplitude shift keying, frequency shift keying, and phase shift keying, are in common use, but in addition to these modulation methods, there is a modulation method wherein the phase shift keying and amplitude shift keying are compounded, such as QAM (Quadrature Amplitude Modulation) and so forth.

Further, in recent years, the multicarrier method such as OFDM (Orthogonal Frequency Division Multiplexing) and so forth have been employed generally as a technique which applies these. OFDM is a particular case of the multicarrier method for dividing information to be transmitted into multiple carriers to transmit these (hereafter, an information transmission channel according to each carrier will be referred to as "subcarrier").

FIG. 4 is a diagram illustrating the configuration of an OFDM modulating device. The OFDM modulating device shown in FIG. 4 is configured of a serial/parallel conversion unit 31 (hereafter, described as "S/P conversion unit 31"), IFFT (Inverse Fast Fourier Transform) unit 32, parallel/serial conversion unit 33 (hereafter, described as "P/S conversion unit 33"), guard interval adding unit 34 (hereafter, described as "GI adding unit 34"), D/A (Digital/Analog) conversion units 35-1 and 35-2, low-pass filters (LPFs) 36-1 and 36-2, multipliers 37-1 and 37-2, oscillator 38, adder 39, band-pass filter (BPF) 40, and antenna 41.

The S/P conversion unit 31 converts the data (transmitted data) of each packet (block) which has been encoded, for example, by an unshown encoding unit upstream, and supplied serially, into parallel data for each packet (block), and outputs this to the IFFT unit 32.

The IFFT unit 32 subjects the supplied data to inverse fast Fourier transform (IFFT). The P/S conversion unit 33 converts the data supplied from the IFFT unit 32 in parallel into serial data. A component in phase (I: In phase) and a quadrature component (Q: Quadrature) are each output from the P/S conversion unit 33. The GI adding unit 34 adds a guard interval to data for each symbol supplied from the P/S conversion unit 33.

The D/A conversion unit 35-1 subjects the data of the component in phase output from the GI adding unit 34 to D/A conversion, and the D/A conversion unit 35-2 subjects the data of the quadrature component output from the GI adding unit 34 to D/A conversion. The LPF 36-1 extracts the low-frequency component of the data of the component in phase supplied from the D/A conversion unit 35-1, thereby performing band limiting so as not to cause intersymbol interference. Similarly, the LPF 36-2 extracts only the low-frequency component of the data of the quadrature component supplied from the D/A conversion unit 35-2, thereby performing band limiting so as not to cause intersymbol interference.

The multiplier 37-1 multiplies the data of the component in phase output from the LPF 36-1 by the carrier output from the oscillator 38 (frequency shift keying). Similarly, the multiplier 37-2 multiplies the data of the quadrature component output from the LPF 36-2 by the carrier output from the oscillator 38 (frequency shift keying). The adder 39 adds the data of the component in phase from the multiplier 37-1, and the data of the quadrature component from the multiplier 37-2.

The BPF 40 extracts only the component of a predetermined frequency band (carrier component) of the data supplied from the adder 39, thereby performing band limiting. The output of the BPF 40 is transmitted to the transmission path through the antenna 41.

Description will be made regarding a demodulating device which demodulates the signal thus transmitted. FIG. 5 is a diagram illustrating the configuration of the OFDM demodulating device. The OFDM demodulating device shown in FIG. 5 is configured of an antenna 51, BPF 52, multipliers 53-1 and 53-2, oscillator 54, LPFs 55-1 and 55-2, A/D (Analog/Digital) conversion units 56-1 and 56-2, valid symbol cycle extraction unit 57, S/P conversion unit 58, FFT (Fast Fourier Transform) unit 59, and P/S conversion unit 60.

The demodulating device receives the transmitted data through the antenna 51. The BPF 52 removes unnecessary band components from the data received through the antenna 51 to extract only a carrier component. The multipliers 53-1 and 53-2 each multiply the output of the BPF 52 by the carrier component oscillated from the oscillator 54, thereby performing frequency conversion processing.

The LPF 55-1 extracts only the data including a subcarrier component (baseband component) from the data output from the multiplier 53-1, and outputs this to the A/D conversion unit 56-1. Similarly, the LPF 55-2 extracts only the data including a subcarrier component (baseband component) from the data output from the multiplier 53-2, and outputs this to the A/D conversion unit 56-2.

The A/D conversion units 56-1 and 56-2 each subject the input data to A/D conversion. The valid symbol cycle extraction unit 57 extracts only a valid symbol portion from the data supplied from each of the A/D conversion unit 56-1 and 56-2. The S/P conversion unit 58 converts data supplied in serial into data in parallel, and outputs this to the FFT unit 59.

The FFT unit 59 subjects the valid symbol portion supplied from the valid symbol cycle extraction unit 57 to FFT processing to output this to the P/S conversion unit 60. The P/S conversion unit 60 subjects the data supplied from the FFT unit 59 to serial/parallel conversion. Thus, the modulated data is demodulated.

The following points can be listed as the features of the OFDM method. First, as the advantages of OFDM, the following can be listed.
1. A great number of subcarriers are employed, and accordingly can handle frequency-selective phasing at multi-path transmission paths well.
2. Not only time interleaving but also frequency interleaving can be performed, thereby using error correction effects effectively.
3. The symbol cycle is long, and further a GI (guard interval) is provided, whereby disturbance due to reflected waves can be reduced.
4. Each carrier of OFDM is a digital modulation wave having a low bit rate and a narrow band, whereby the spectrum of each subchannel can be disposed tightly, and accordingly, frequency use efficiency is high.
5. Flexible information transmission can be performed such that a channel from which interference is expected is not employed.
6. Hierarchization of information can be readily performed by changing the modulation method of each subcarrier, or the like.

Of the above-mentioned advantages, a method has been proposed in J. Fu and Y. Karasawa, "Fundamental Analysis on Throughput Characteristics of Orthogonal Frequency Division Multiple Access (OFDMA) in Multipath Propagation Environments", IEICE journal, vol. J85-B, no. 11, pp. 1884-1894, November 2002, wherein "flexible information transmission can be performed such that a channel from which interference is expected is not employed" cited as the above-mentioned advantage 5 is utilized, and a subcarrier of which the influence of phasing is weak is selected and assigned to a user. According to this method, though complexity of the system increases, a subcarrier having small influence of phasing is selected, whereby satisfactory BER (Bit Error Ratio) characteristics can be obtained.

SUMMARY OF THE INVENTION

With wireless communication according to the related art including the OFDM method, carriers (including subcarriers) are employed from the following viewpoints other than that data is provided in the amplitude, frequency, or phase thereof.
1. Frequency shift to the frequency band specified for each service
2. Multiplexing of multiple systems
3. Reduction in size of an antenna (DC is not transmitted)

For example, with the wireless communication according to the related art, processing has generally been employed wherein, with a system in which real time nature is regarded as an important factor, a bit error which has occurred on the transmission path is restored at the reception side by employing an error correction code. In a case where an error correction code is employed,
1. Higher compression of the original data has to be performed in accordance with the increase of the band by the error correction code.
2. Higher band communication has to be performed in accordance with the increase of the band by the error correction code.
3. A great circuit scale has to be employed for both of transmission and reception for the error correction code.

There has been demand for improvement for enabling transmission even in low compression, improvement to low-frequency band communication, reduction in circuit scale, and so forth. It has been recognized that there is demand to realize communication with low compression, low-frequency band communication, reduction in a circuit scale, and so forth by providing meaning to the frequency layout of carriers.

According to an embodiment of the present invention, a modulating device configured to perform modulation with the orthogonal frequency division multiplexing method, includes: a modulating unit configured to modulate main information with the orthogonal frequency division multiplexing method; and a determining unit configured to determine a subcarrier pattern employed when modulating the main information by the modulating unit based on additional information relating to the main information.

The modulating device may further include a holding unit configured to hold a table in which vector quantization code is correlated with vector data, with the determining unit determining the vector quantization code from vector data at the time of compressing the main information, and regarding the determined vector quantization code as the additional information to determine a subcarrier pattern corresponding to the additional information thereof.

The modulating device may further include a holding unit configured to hold a table in which vector data for each format is correlated with one vector quantization code, with the determining unit determining the vector quantization code from vector data at the time of compressing the main information, and regarding the determined vector quantization code as the additional information to determine a subcarrier pattern corresponding to the additional information thereof.

The determining unit may determine a subcarrier pattern included in the modulation band of the image data of a low-resolution image, of the modulation band of the image data of a high-resolution image.

With the main information being image data, the modulating device may further include: a reducing unit configured to reduce the image based on the image data thereof; and a output unit configured to execute class classifying processing upon the image data to output a class value, with the modulating device modulating the image data of the image reduced by the reducing unit, and with the determining unit determining a subcarrier pattern corresponding to the class value.

The main information may be a content, with the additional information being an operand as to the content, and with the determining unit determining the subcarrier pattern for each of the operand.

The main information may be the image data of multiple images displayed on one screen, with the additional information being an operand for each of the multiple images, and with the determining unit determining the subcarrier pattern for each of the operand.

According to an embodiment of the present invention, a modulating method for a modulating device configured to perform modulation with the orthogonal frequency division multiplexing method, includes the steps of: determining a subcarrier pattern employed when modulating the main information, based on additional information relating to the main information; and modulating the main information with the orthogonal frequency division multiplexing method, based on the determined subcarrier pattern thereof.

According to an embodiment of the present invention, a program for a modulating device configured to perform modulation with the orthogonal frequency division multiplexing method, causes a computer to execute processing including the steps of: determining a subcarrier pattern employed when modulating the main information, based on additional information relating to the main information; and modulating the main information with the orthogonal frequency division multiplexing method, based on the determined subcarrier pattern thereof.

According to an embodiment of the present invention, a recording medium records the program.

According to the above-mentioned configurations, a subcarrier at the time of the main information being modulated is determined with the additional information relating to the main information.

According to an embodiment of the present invention, a demodulating device configured to perform demodulation with the orthogonal frequency division multiplexing method, includes: a demodulating unit configured to demodulate main information with the orthogonal frequency division multiplexing method; and a detecting unit configured to detect a subcarrier pattern employed when modulating the main information to detect additional information correlated with the subcarrier pattern thereof.

The demodulating device may further include a holding unit configured to hold a table in which vector quantization code is correlated with vector data, with the detecting unit detecting vector quantization code from the subcarrier pattern as the additional information, and further reading out vector data corresponding to the additional information thereof from the table, and with at least one of the main information demodulated by the demodulating unit, and the vector data detected by the detecting unit being employed, and data before modulation being reproduced.

The demodulating device may further include a holding unit configured to hold a table in which vector quantization code is correlated with vector data, with the detecting unit detecting vector quantization code from the subcarrier pattern as the additional information, and further reading out vector data corresponding to the additional information thereof from the table, and with, when the demodulating unit fails to demodulate the main information, the vector data detected by the detecting unit being output as a demodulation result.

The detecting unit may detect the subcarrier pattern with a subcarrier included in the modulation band of the image data of a low-resolution image as an object of detection, of the modulation band of the image data of a high-resolution image.

With the main information being the image data of a reduction image obtained by a predetermined image being reduced, and with the additional information being a class value to be output when class classifying processing is executed as to a more precise image than the reduction image, the demodulating device may further include a generating unit configured to generate the high-precise image from the image data of the reduction image demodulated by the demodulating device, and the class value detected by the detecting unit.

With the main information demodulated by the demodulating unit being a content, and with the additional information detected by the detecting unit being an operand as to the content, the demodulating device may further include a processing unit configured to subject the content demodulated by the demodulating unit to processing corresponding to the operand detected by the detecting unit.

With the main information demodulated by the demodulating unit being the image data of multiple images displayed on one screen, and with the additional information detected by the detecting unit being an operand for each of the multiple images, the demodulating device may further include a processing unit configured to subject each of the multiple images demodulated by the demodulating unit to processing corresponding to the operand detected by the detecting unit.

According to an embodiment of the present invention, a demodulating method for a demodulating device configured to perform demodulation with the orthogonal frequency division multiplexing method, includes the steps of: demodulating main information with the orthogonal frequency division multiplexing method; detecting a subcarrier pattern employed when modulating the main information; and detecting additional information correlated with the subcarrier pattern thereof.

According to an embodiment of the present invention, a program for a demodulating device configured to perform demodulation with the orthogonal frequency division multiplexing method, causing a computer to execute processing including the steps of: demodulating main information with the orthogonal frequency division multiplexing method; detecting a subcarrier pattern employed when modulating the main information; and detecting additional information correlated with the subcarrier pattern thereof.

According to an embodiment of the present invention, a recording medium records the program.

According to the above-mentioned configurations, when the main information is demodulated, the additional information relating to the main information is detected from the subcarrier wave pattern employed at the time of the main information being modulated.

According to an embodiment of the present invention, communication with low compression, low-frequency band communication, reduction in a circuit scale, and so forth can be realized.

BRIEF DESCRIPTION OF THE DRAWINGS

FIGS. 26A through 26C are diagrams describing a pixel layout according to a different format;

FIG. 28 is a diagram describing another table;

DESCRIPTION OF THE PREFERRED EMBODIMENTS

Embodiments of the present invention will be described below with reference to the appended drawings. Note that, with embodiments described below, description will be made with reference to a case where an input signal is an image as an example, but the present invention can also be applied to data such as audio or the like, besides images.

First Embodiment

Figure 1:
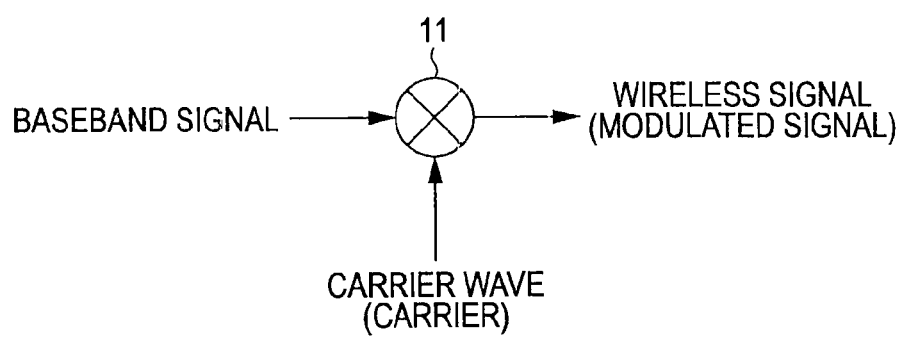
FIG. 1 is a diagram illustrating the configuration of an example of a wireless communication transmitter according to the related art.
Figure 2:
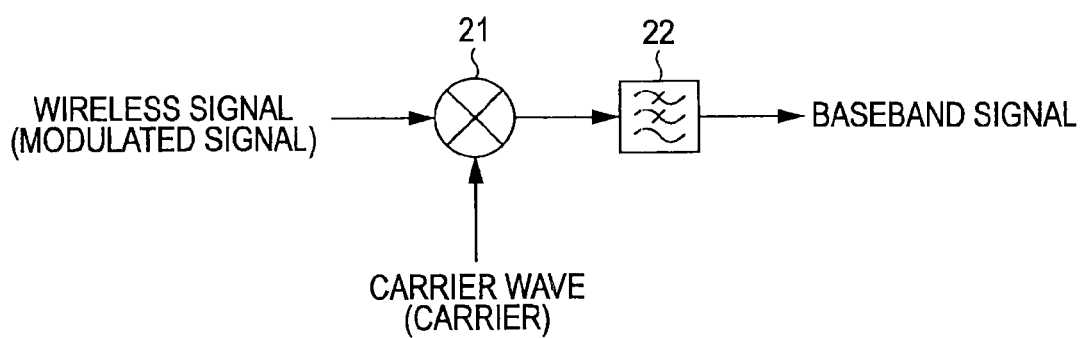
FIG. 2 is a diagram illustrating the configuration of an example of a wireless communication receiver according to the related art.
Figure 3A:
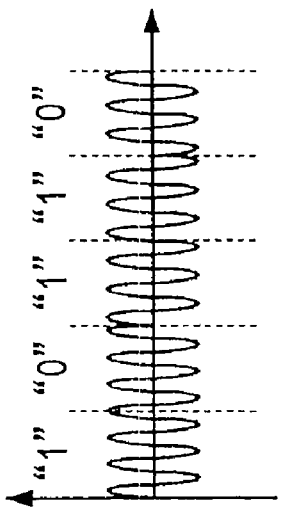
FIGS. 3A through 3C are diagrams describing a modulating method for wireless communication.
Figure 3B:
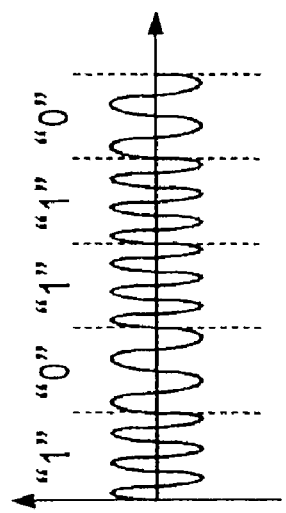
Figure 3C:
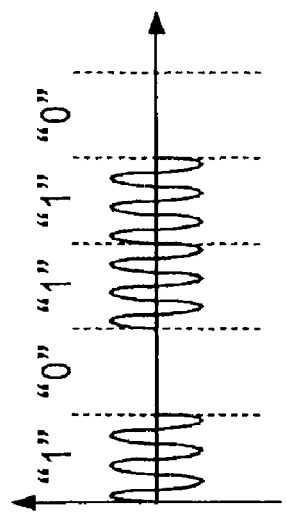
Figure 4:
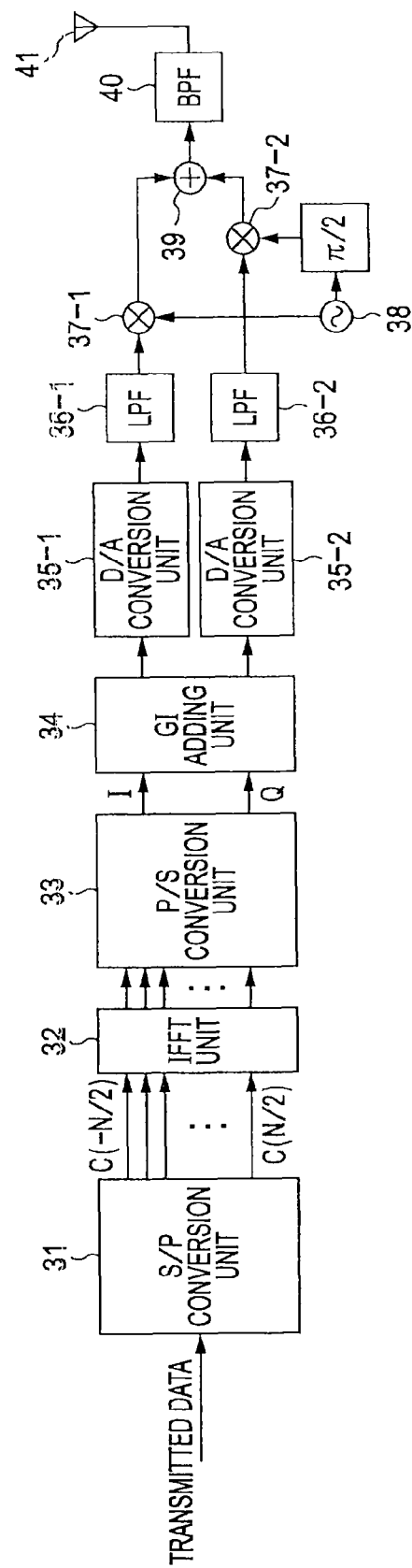
FIG. 4 is a diagram illustrating the configuration of an example of a modulating device according to the related art.
Figure 5:
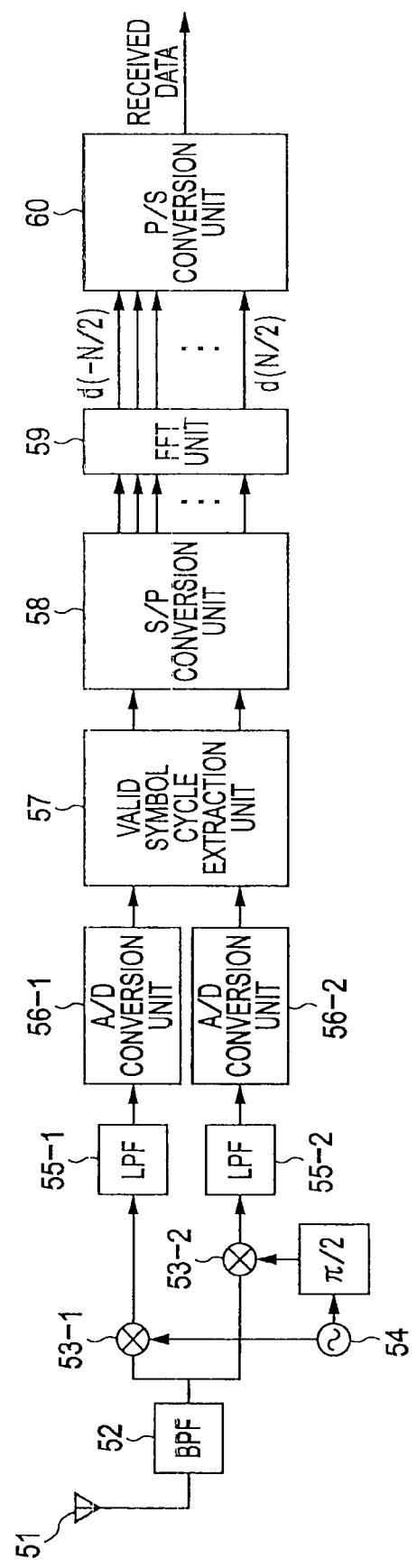
FIG. 5 is a diagram illustrating the configuration of an example of a demodulating device according to the related art.
Figure 6:
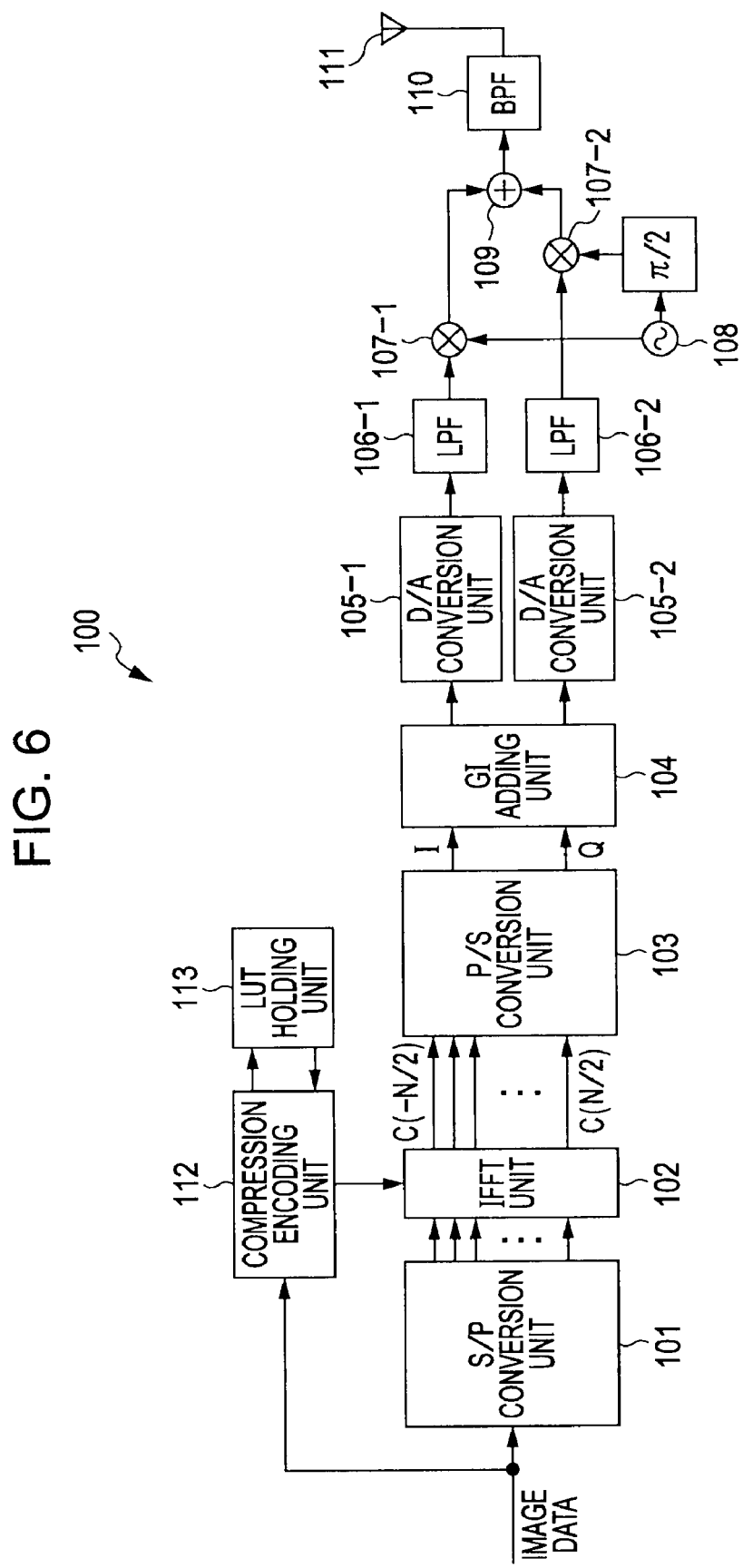
FIG. 6 is a diagram illustrating the configuration of an embodiment of a modulating device to which an embodiment of the present invention has been applied.

FIG. 6 is a diagram illustrating an embodiment of a modulating device to which the present invention has been applied. The first embodiment is a modulating device and demodulating device whereby robustness can be improved. The modulating device 100 shown in FIG. 6 illustrates the configuration of a device for modulating data input in accordance with the OFDM (Orthogonal Frequency Division Multiplexing) method.

The OFDM modulating device 100 shown in FIG. 6 is configured of a serial/parallel conversion unit 101 (hereafter, described as "S/P conversion unit 101"), IFFT (Inverse Fast Fourier Transform) unit 102, parallel/serial conversion unit 103 (hereafter, described as "P/S conversion unit 103"), guard interval adding unit 104 (hereafter, described as "GI adding unit 104"), D/A (Digital/Analog) conversion units 105-1 and 105-2, low-pass filters (LPFs) 106-1 and 106-2, multipliers 107-1 and 107-2, oscillator 108, adder 109, band-pass filter (BPF) 110, antenna 111, compression encoding unit 112, and LUT (Look Up Table) holding unit 113.

The S/P conversion unit 101 converts serial data into parallel data for each packet (block), and outputs this to the IFFT unit 102. The IFFT unit 102 subjects the supplied data to inverse fast Fourier transform (IFFT). When the IFFT unit 102 executes inverse fast Fourier transform processing, information from the compression encoding unit 112 is supplied, a subcarrier is selected based on the information thereof, thereby executing inverse fast Fourier transform.

The same image data as the image data input to the S/P conversion unit 101 is input to the compression encoding unit 112. The compression encoding unit 112 subjects the input image data to predetermined compression processing, references the table held by an LUT holding unit 113 based on the information obtained as a result thereof to read out information for selecting a subcarrier.

The P/S conversion unit 103 converts the data supplied in parallel by the IFFT unit 102 into serial data. A component in phase (I: In phase) and a quadrature component (Q: Quadrature) are each output from the P/S conversion unit 103. The GI adding unit 104 adds a guard interval to data for each symbol supplied from the P/S conversion unit 103.

The D/A conversion unit 105-1 subjects the data of the component in phase output from the GI adding unit 104 to D/A conversion, and the D/A conversion unit 105-2 subjects the data of the quadrature component output from the GI adding unit 104 to D/A conversion. The LPF 106-1 extracts only the low-frequency component of the data of the component in phase supplied from the D/A conversion unit 105-1, thereby performing band limiting so as not to cause intersymbol interference. Similarly, the LPF 106-2 extracts only the low-frequency component of the data of the quadrature component supplied from the D/A conversion unit 105-2, thereby performing band limiting so as not to cause intersymbol interference.

The multiplier 107-1 multiplies the data of the component in phase output from the LPF 106-1 by the carrier output from the oscillator 108 (frequency shift keying). Similarly, the multiplier 107-2 multiplies the data of the quadrature component output from the LPF 106-2 by the carrier output from the oscillator 108 (frequency shift keying). The adder 109 adds the data of the component in phase from the multiplier 107-1, and the data of the quadrature component from the multiplier 107-2.

The BPF 110 extracts only the component of a predetermined frequency band (carrier component) of the data supplied from the adder 109, thereby performing band limiting. The output of the BPF 110 is transmitted to the transmission path through the antenna 111.

With the following description, description will be made on the assumption that binarized serial data is input to the S/P conversion unit 101, but in a case where input image data is transmitted in parallel without being converted into serial data, an arrangement may be made wherein the S/P conversion unit is not provided, or an arrangement may be made wherein there is provided a route to input to the IFFT unit 102 without performing the processing of the S/P conversion unit 101. Also, let us say that optimal conversion is performed so as to match with the number of FFT points of the IFFT unit 102.

Next, description will be made regarding the modulation processing of the modulating device 100 shown in FIG. 6 with reference to the flowchart shown in FIG. 7.

In step S11, the P/S conversion unit 101 subjects the input image data to parallel/serial conversion processing. The S/P conversion unit 101 converts the data of each block (packet) supplied in serial into parallel data to supply this to the IFFT unit 102.

Figure 8:
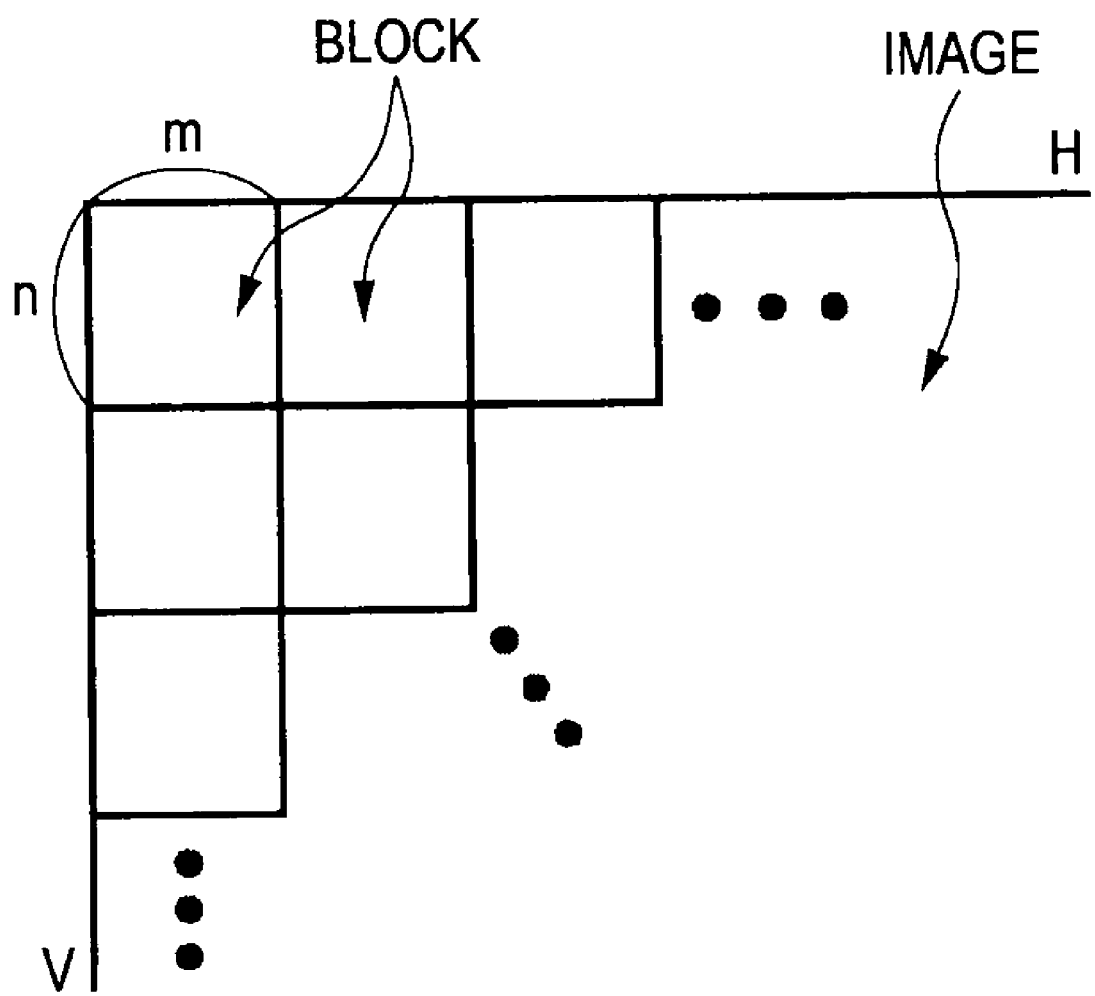
FIG. 8 is a diagram describing blocks.

On the other hand, in step S12 the compression encoding unit 112 subjects the input image data to compression encoding processing. Now, as shown in FIG. 8, let us say that the image data to be processed at the compression encoding unit 112 and S/P conversion unit 101 is data divided into blocks. FIG. 8 represents an example of blocking processing. With this example, one frame worth of image data is divided into blocks for every m×n pixels.

The compression encoding processing performed by the compression encoding unit 112 is performed, for example, with a VQ (Vector Quantizer). The compression encoding unit 112 subjects the supplied pixel data to vector quantization for each block. Description will be made regarding vector quantization processing with reference to the flowchart shown in FIG. 9.

In step S31, the compression encoding unit 112 divides the supplied image data into blocks having an arbitrary size. In step S32, the compression encoding unit 112 performs initialization. Initializing processing is processing wherein i (variable i) indicating the i'th vector data of a lookup table (LUT) is set to zero, and the value of distance Ei calculated in later-described Expression (1) is set to zero.

Figure 10:
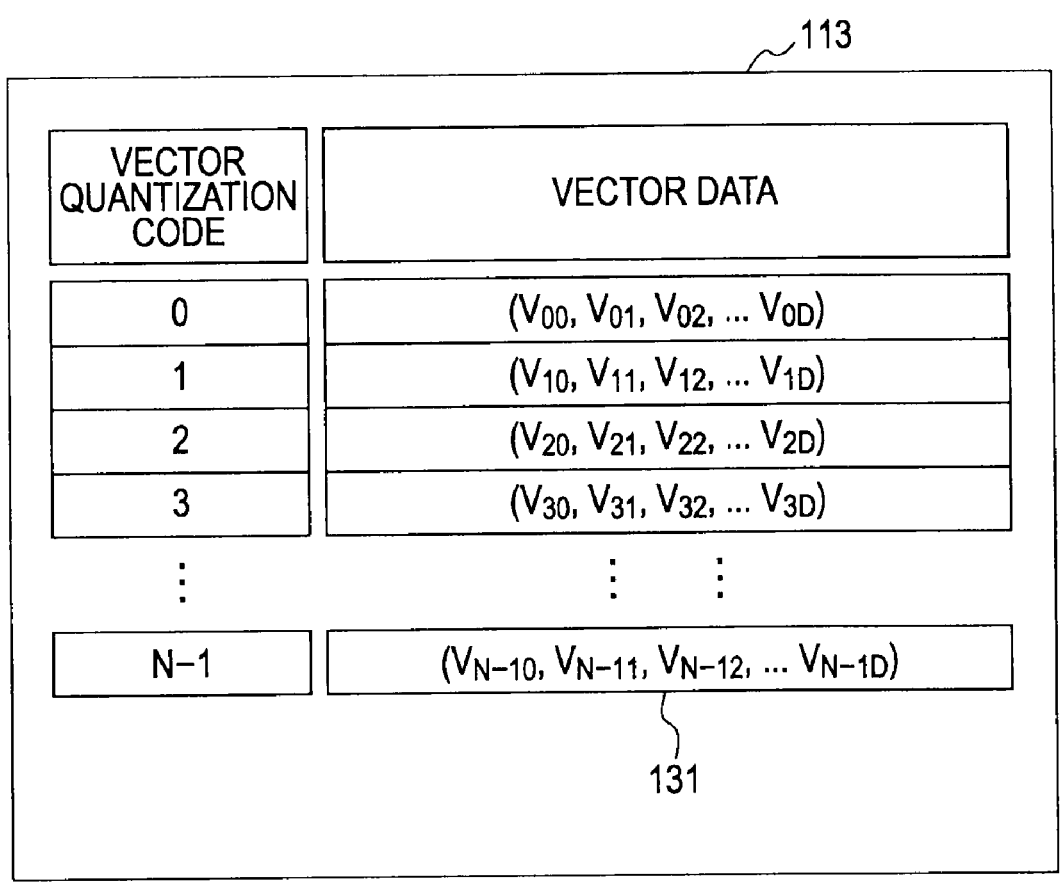
FIG. 10 is a diagram illustrating an example of a table.

Now, description will be made regarding a table 131 held by the LUT holding unit 113. FIG. 10 is a diagram illustrating an example of the table 131. The table 131 is a table in which a vector quantization code is correlated with representative vector data. A vector quantization code 0 corresponds to a representative vector made up of components $V_{00}$, $V_{01}$, $V_{02}$, $V_{03}$, and so on, a vector quantization code 1 corresponds to a representative vector made up of components $V_{10}$, $V_{11}$, $V_{12}$, $V_{13}$, and so on, and a vector quantization code 2 corresponds to a representative vector made up of components $V_{20}$, $V_{21}$, $V_{22}$, $V_{23}$, and so on.

In step S33, the compression encoding unit 112 reads out a representative vector C corresponding to the i'th vector quantization code stored in the table 131. Subsequently, in step S34, the compression encoding unit 112 calculates, based on the following Expression (1), distance Ei from the representative vector C of a vector V made up of the pixels of a block of interest obtained by being divided into blocks in the processing in step S31.

[Equation 1]

$$Ei = \sum_{i=0}^{N-1} \sum_{j=0}^{D-1} (Vj - Cij) \qquad (1)$$

In Expression (1), D represents the order number, which is equal to m×n. Also, N corresponds to the number of vector quantization codes recorded in the table 131.

In step S35, determination is made whether or not the calculated distance Ei is the minimum value. The compression encoding unit 112 stores the minimum value of the already calculated distance Ei, and determines whether or not the distance Ei calculated at that point is smaller than the stored minimum value.

In a case where determination is made in step S35 that the calculated distance Ei is the minimum value, in step S36 the value thereof is stored, and the processing proceeds to step S37. In a case where determination is made that the calculated distance Ei is not the minimum value, the processing in step S36 is skipped, i.e., the minimum value stored at that point is kept in a stored state as is, and the processing proceeds to step S37.

In step S37, the compression encoding unit 112 determines whether or not the value of a variable i is equal to a value N. In a case where the value of the variable i is not equal to the value N, the processing proceeds to step S38, where the compression encoding unit 112 increments the value of the variable i by one, and then executes the processing in step S33 again. Thus, a representative vector C corresponding to the next vector quantization code recorded in the table 131 is read out, and in step S34, distance Ei as to the representative vector C of a vector V is calculated.

The above-mentioned processing in steps S33 through S38 is executed repeatedly until determination is made in step S37 that i=N holds.

In a case where determination is made in step S37 that the value of the variable i is equal to the value N (in a case where determination is made that of the vector V made up of the pixels of a block, the calculations of the distances E as to all of the representative vectors C corresponding to the vector quantization codes recorded in the table 131 have been completed), the processing proceeds to step S39, where of the obtained N distances Ei (i=0, 1, 2, and so on through N−1), the minimum value is obtained. Subsequently, the value of the vector quantization code (index) i corresponding to the minimum distance Ei thereof is output as the optimal value of the vector quantization code. In this case, the minimum value of the distance Ei is stored, so the index i of the stored distance Ei is output.

Figure 11:
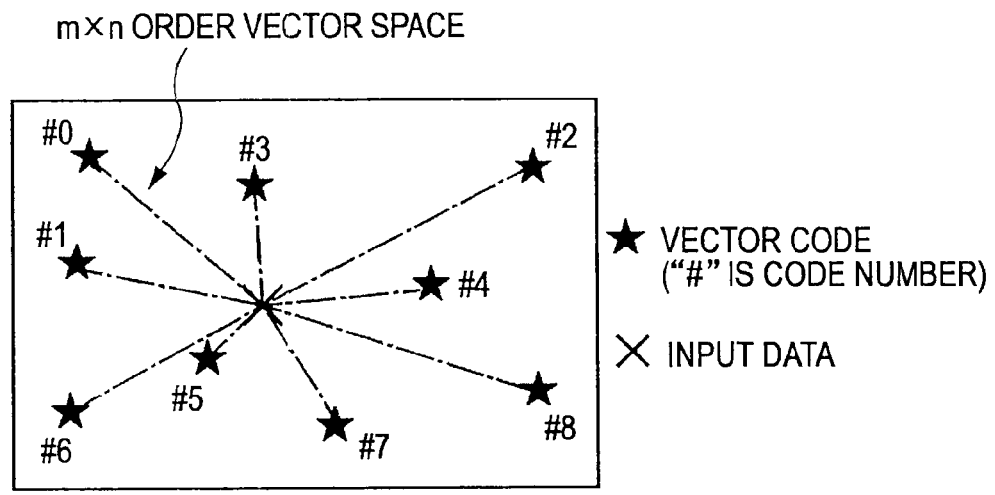
FIG. 11 is a diagram describing vector codes.

FIG. 11 schematically represents the above-mentioned vector quantization processing. With vector quantization, there is a method for combining several values into a group, and subjecting this group to quantization, as to scalar quantization for subjecting each value to quantization. According to quantization, distortion is caused between the original information source (distortion referred to as quantization distortion or quantization noise or the like), but when assuming that a rate is constant, vector quantization has smaller distortion than scalar quantization. FIG. 11 is a diagram for describing the concept of vector quantization. In a case where data having m×n block size is subjected to vector quantization, input data of m×n order vector is projected over arbitrary vector space, such as indicated by star-shaped symbols in FIG. 11.

The number of a vector code having the shortest distance as to the input vector data (x-mark within FIG. 11) is selected, and the code number of the vector thereof is transmitted. That is to say, with the example in FIG. 11, nine (N=9) representative vectors corresponding to the m×n order vector space are recorded in the table 131. In FIG. 11, numbers 0 through 9 represent the numbers of vector quantization codes. In the case of the example in FIG. 11, the distance as to the representative vector represented with the vector quantization code of the number 5 is the smallest. Accordingly, with this example, the vector quantization code of the number 5 is output.

Note that as a method for generating a vector code employed for vector quantization (equivalent to star-shaped symbols #0 through #8 in FIG. 11),
1. Recursive division,
2. Hierarchical clustering,
3. LBG algorithm,
or the like is employed.

Returning to FIG. 7, in step S12, following vector quantizing processing (compression encoding processing) being performed as described above, the vector quantization code determined in the vector quantization processing thereof is supplied to the IFFT unit 102. In step S13, the IFFT unit 102 determines a subcarrier. The IFFT unit 102 is configured to select a subcarrier to use, corresponding to a vector quantization code.

Figure 12:
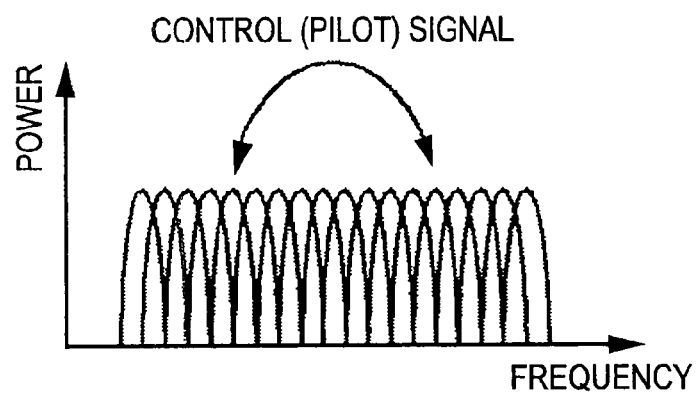
FIG. 12 is a diagram describing a subcarrier.

Now, an example of a vector quantization code, and an employed subcarrier will be described with reference to FIG. 13. For the purpose of reference, first, a subcarrier pattern according to the related art will be described with reference to FIG. 12. In the case of data transmission employing the OFDM method, as shown in FIG. 12, all of the subcarriers other than a pilot signal inserted for an arbitrary frequency interval (employed for phase rotation correction of reception, two signals in FIG. 12) are employed.

Figure 13:
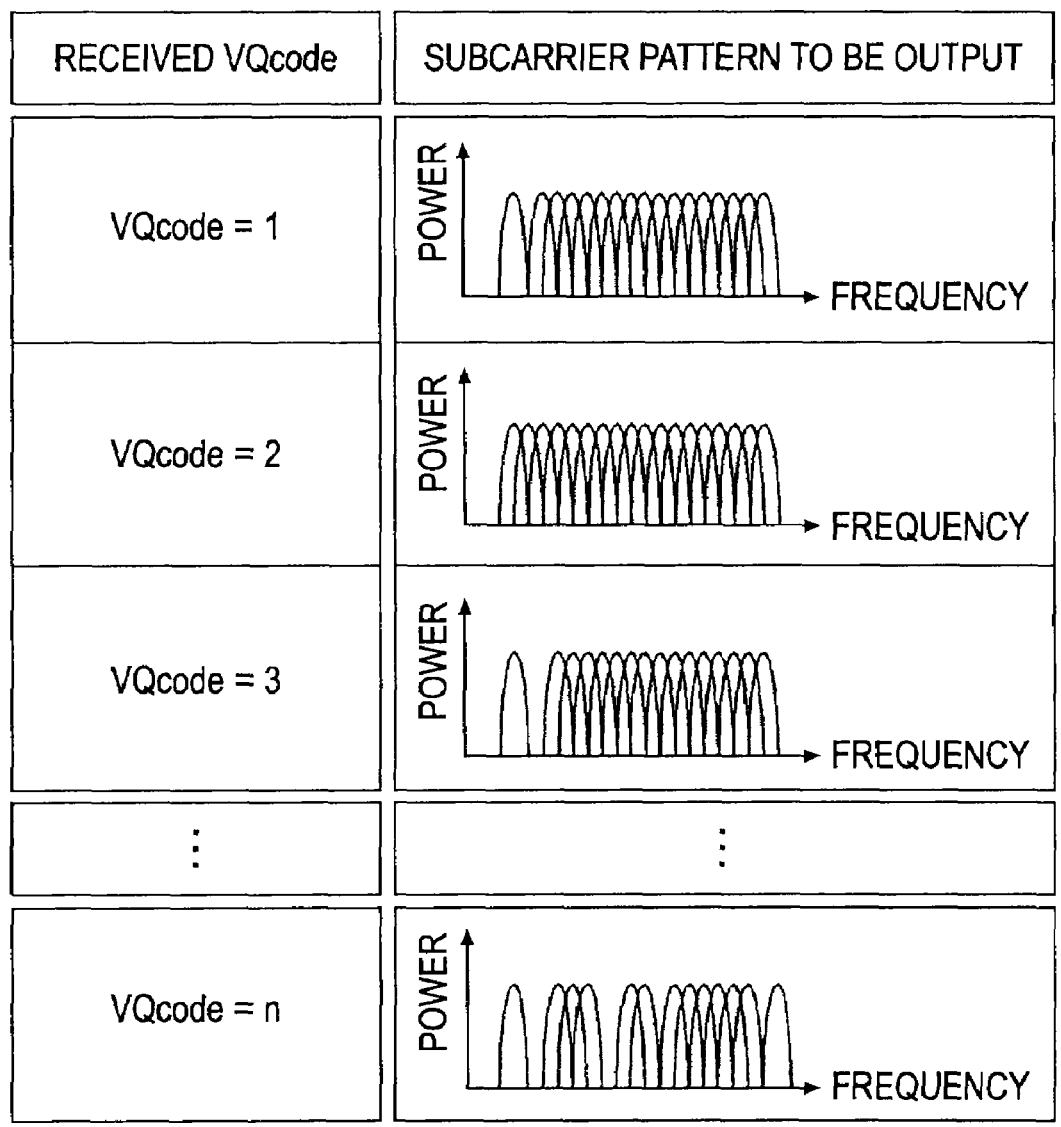
FIG. 13 is a diagram describing subcarrier patterns.

With the present embodiment, as shown in FIG. 13, a subcarrier to use is set according to a vector quantization code, and a meaning is given to the set subcarrier pattern (information is included therein). For example, as shown in FIG. 13, in a case where the information of the vector quantization code from the compression encoding unit 112 is "1" (VQcode=1), selection of a subcarrier is performed such that a subcarrier of C (−N/2−1) is not employed.

Similarly, in a case where the information of the vector quantization code from the compression encoding unit 112 is "2" (VQcode=2), selection of a subcarrier is performed such that a subcarrier of C (−N/2−2) is not employed. Selection of such a subcarrier is set for each vector quantization code. In other words, a subcarrier pattern is set for each vector quantization code, the subcarrier with the pattern thereof is employed, and the transmission of data is performed.

In other words, heretofore, the transmission of data has been performed by employing all of the subcarriers, but with the present embodiment, a subcarrier not employed is set without employing all of the subcarriers, thereby generating a subcarrier pattern, and including information for each subcarrier pattern thereof (one piece of information can be determined uniquely with a subcarrier pattern). The information to be included in a subcarrier pattern is additional information as to information to be transmitted (main information).

Thus, the reception side can also obtain information (additional information) from a subcarrier pattern as well as information (main information) can be obtained from transmitted data. Accordingly, the reception side to which an embodiment of the present invention has been applied (later-described demodulating device 300) is configured so as to read out information from the received subcarrier pattern, and holds the same table 131 as the transmission side (modulating device 100).

Such a case will be further described with reference to FIG. 14. For example, with the modulating device 100 capable of employing 256 subcarriers, 192 subcarriers are employed for data transmission, and 64 subcarriers are employed for control. The number of the 64 subcarriers for control is a number set so as to realize a proportion of one subcarrier for control as to three subcarriers for data.

Thus, in a case where subcarriers are divided for data transmission and for control, of the 192 subcarriers for data transmission, when selecting further 128 subcarriers to use, the following data
1. 4 pixels×4 pixels of 8-bit data, and
2. Around 16 bits worth of vector quantization codes obtained by compressing 4 pixels×4 pixels of 8-bit data (192C128>>16 bits (65536)) can be transmitted simultaneously.

Figure 14:
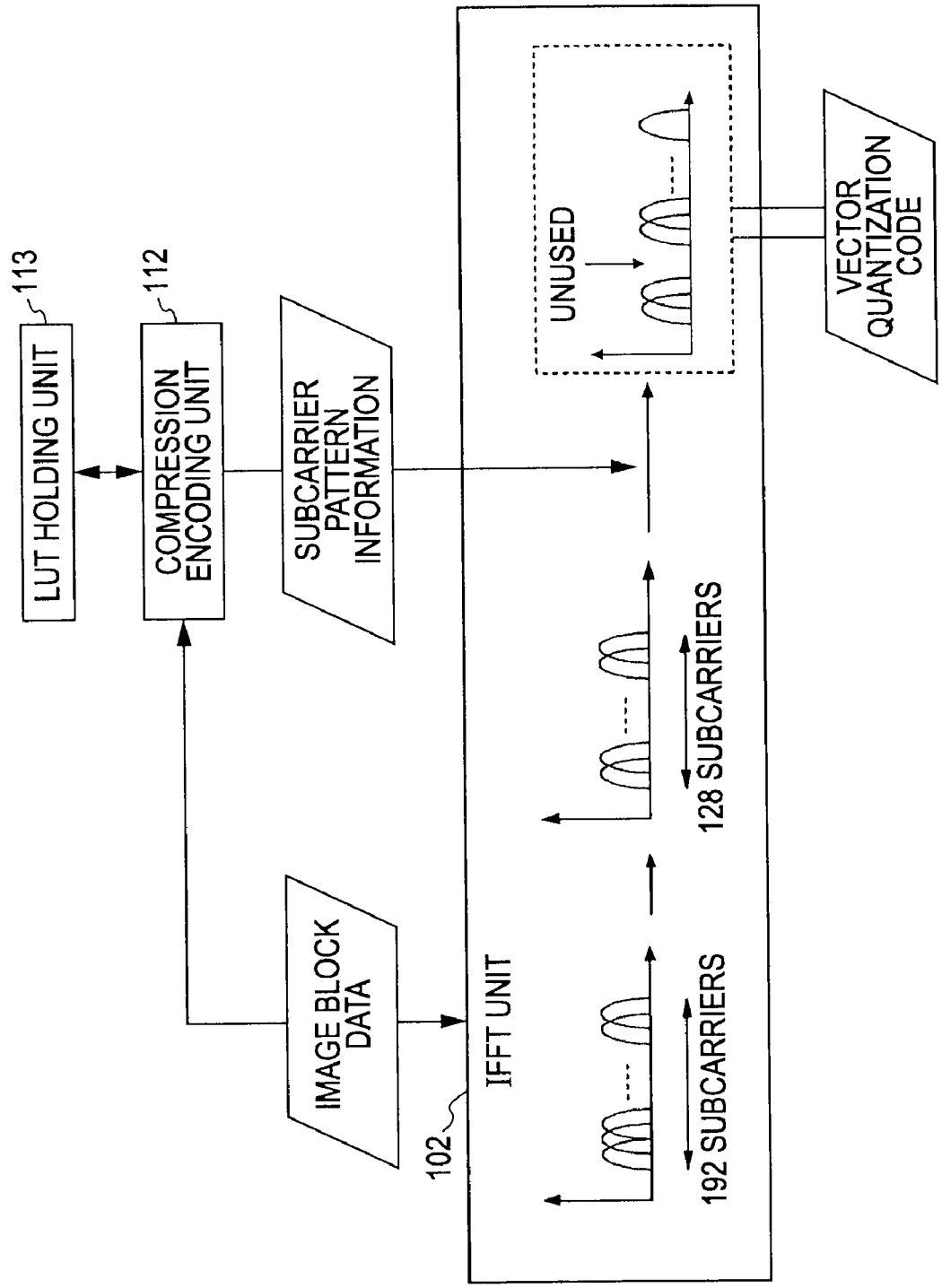
FIG. 14 is a diagram describing the relation between a subcarrier pattern and image block data.

As shown in FIG. 14, image block data is input to the IFFT unit 102 and compression encoding unit 112. The compression encoding unit 112 subjects the input image block data to compression encoding processing, and also referencing the table 131 held at the LUT holding unit 113, thereby determining a vector quantization code. A subcarrier pattern is determined from this vector quantization code, and the information thereof is supplied to the IFFT unit 102. The IFFT unit 102 determines a subcarrier pattern from the supplied information, i.e., determines an unused subcarrier (determines an unused frequency), and subjects the input image block data to the IFFT processing based on the determination thereof.

As described above, in a case where as subcarriers, 192 subcarriers for data transmission are employed, and 64 subcarriers for control are employed, the remaining 128 subcarriers can be employed. The IFFT unit 102 determines, of the 128 subcarriers thereof, an unused subcarrier pattern according to the subcarrier pattern information. The subcarrier pattern thereof represents a vector quantization code, so the reception side can obtain a vector quantization code by detecting a subcarrier pattern.

Thus, the IFFT unit 102 performs the IFFT processing, but does not encode the input image block data. The input image data is not encoded, so can be transmitted without adding information, such as error correction and so forth, thereto, and accordingly, the data can be transmitted without having to have a band used when adding information such as error correction and so forth thereto. Also, the subcarrier pattern in this case indicates a vector quantization code, and consequently, information when compressing the image block data is transmitted with this subcarrier pattern.

That is to say, with the first embodiment, both data (image data and data compressed therefrom) is converted into a different signal format without performing encoding such as error correction or the like, whereby both data can be transmitted by being superimposed upon a different signal.

Even if the reception side fails to reproduce image block data from the received data due to influence such as noise or the like, a vector quantization code can be reproduced from a subcarrier pattern, and image block data can be reproduced from the vector quantization code thereof. Accordingly, from such a viewpoint as well, image block data can be reproduced without transmitting information such as error correction and so forth.

Figure 7:
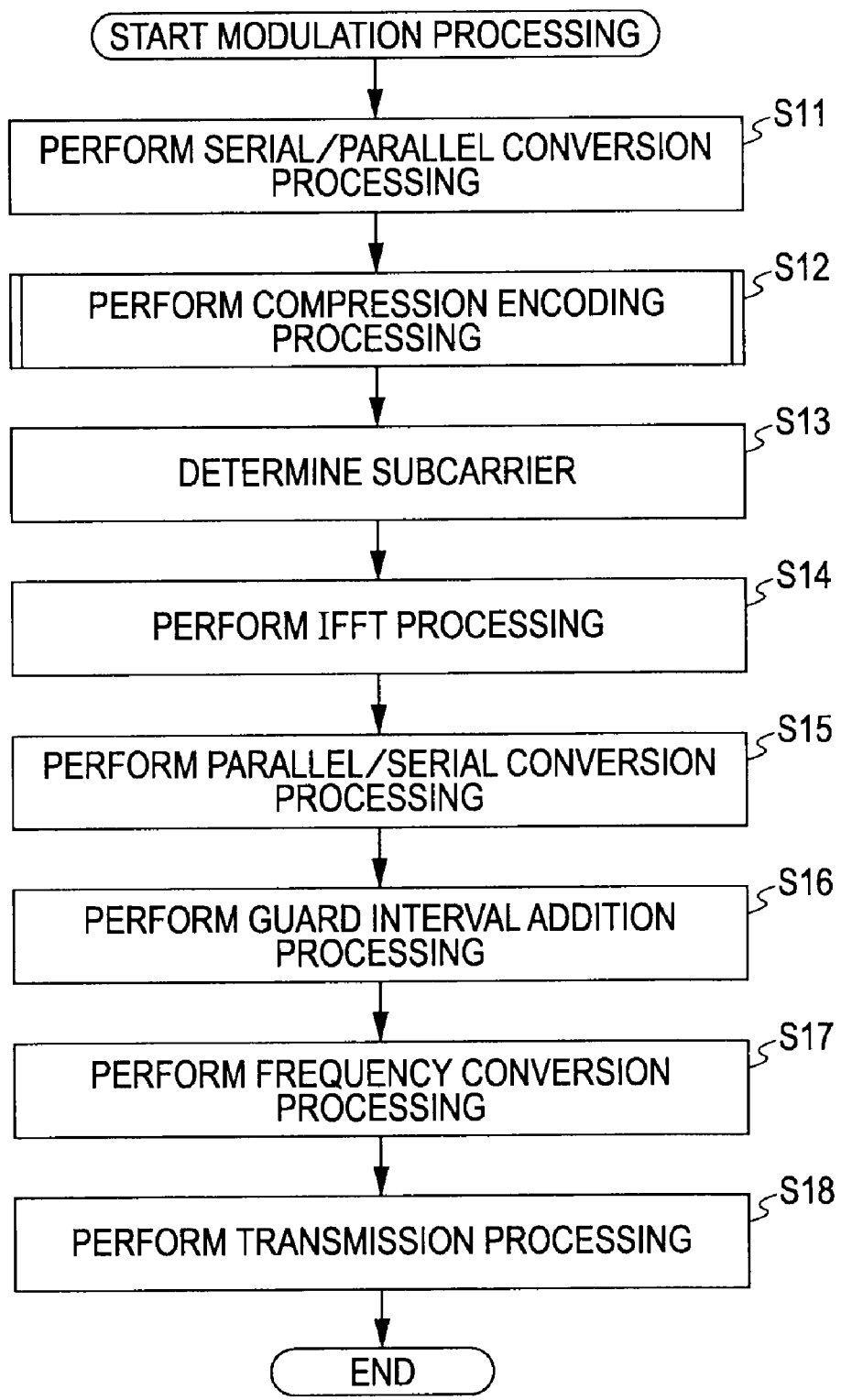
FIG. 7 is a flowchart describing the operation of the modulating device shown in FIG. 6.

Now, description will return to the flowchart shown in FIG. 7. In step S13, a subcarrier is decided, and in step S14, the IFFT processing is executed by the IFFT unit 102. The data subjected to the IFFT processing by the IFFT unit 102 is supplied to the P/S conversion unit 103. In step S15, the P/S conversion unit 103 converts the data output in parallel for each block by the IFFT unit 105 into serial data. Thus, the transmission data is multiplexed over the time axis.

Next, in step S16, the GI adding unit 104 adds a guard interval to the data supplied from the P/S conversion unit 103. The guard interval is generated by copying a part of signal waveform in the vicinity of the terminal end portion of the valid symbol period of each block data. Thus, a guard interval portion is added to the data, whereby influence due to multipath can be reduced.

Figure 15:
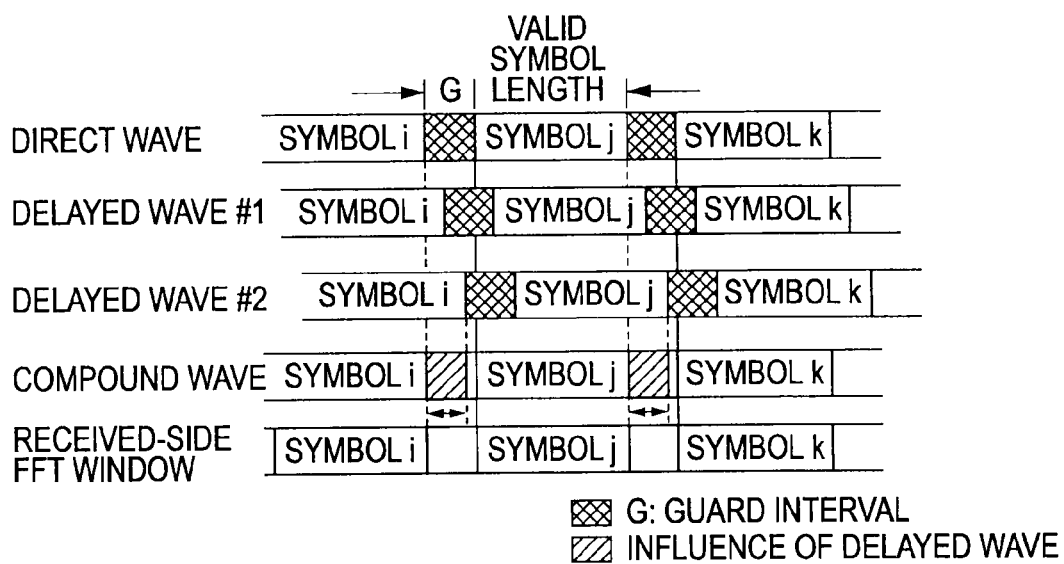
FIG. 15 is a diagram describing guard intervals.

That is to say, as shown in FIG. 15, when there is a multipath, a delayed wave, such as a delayed wave #1 or #2, other than a direct wave occurs. Consequently, the reception side receives a compound wave of the direct wave and delayed wave. As shown in FIG. 15, for example, in a case where a compound wave of the direct wave and delayed wave #2 has been received at the reception side, even if the FFT window of the reception side is synchronized with the length and timing corresponding to each valid symbol length of the direct wave, with regard to a delayed wave having smaller delayed time than the guard interval, influence due to overlapping of the own symbol is unavoidable, but demodulation can be performed by avoiding the overlapping of another symbol one symbol ahead.

Figure 16:
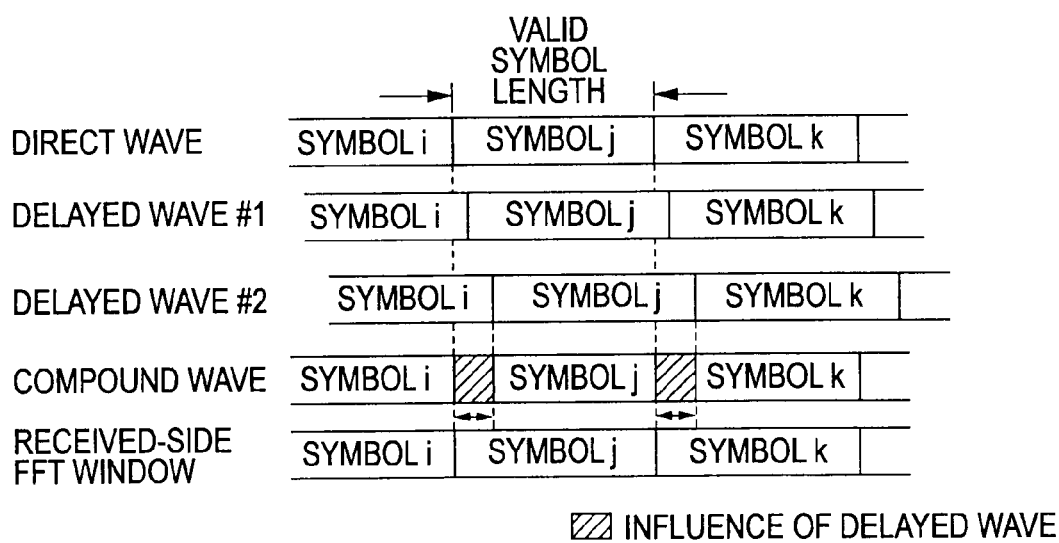
FIG. 16 is a diagram describing guard intervals.

On the other hand, as shown in FIG. 16, in a case where there is no guard interval, the symbol one symbol ahead is overlapped by a delayed wave being added, and accordingly, the properties deteriorate at the time of demodulating the data of each symbol.

As described above, the data to which the guard interval has been added by the GI adding unit 104 is input to the D/A conversion units 105-1 and 105-2, and is subjected to D/A conversion, following which an unnecessary band is limited by the LPFs 106-1 and 106-2, and the data is input to the multipliers 107-1 and 107-2. In step S17, the multipliers 107-1 and 107-2 perform frequency conversion processing. Specifically, the multiplier 107-1 multiplies the output of the low-pass filter 106-1 by the carrier supplied from the oscillator 108 to generate a carrier (OFDM signal) including multiple subcarriers, and the multiplier 107-2 multiplies the output of the low-pass filter 106-2 by the carrier supplied from the oscillator 108 to generate a carrier (OFDM signal) including multiple subcarriers.

The data output from each of the multipliers 107-1 and 107-2 is added by the adder 109, and is then input to the BPF 109, and in step S18, transmission processing is executed. That is to say, the BPF 109 extracts only a carrier component from the input data, and transmits this to the transmission path through the antenna 111.

Note that, as described above, in a case where the same image data is input to the S/P conversion unit 101 and compression encoding unit 112, and is processed, timing wherein the data is output from the S/P conversion unit 101 to the IFFT unit 102, and timing wherein a vector quantization code is supplied from the compression encoding unit 112 to the IFFT unit 102 have to be synchronized. That is to say, the vector quantization code corresponding to the image data processed by the IFFT unit 102 has to be supplied when the IFFT unit 102 processes the image data.

Accordingly, with the above-mentioned first embodiment and the following description, description will be continued on the assumption that an arrangement is made wherein the image data to be input to the IFFT unit 102 input from the S/P conversion unit 101, and the vector quantization code to be input to the IFFT unit 102 input from the compression encoding unit 112 are synchronized.

With the above-mentioned embodiment, description has been made with reference to an example wherein image data is transmitted by increments of 128 bits, but in such a case, the IFFT unit 102 performs control so as to transmit the baseband data input from the S/P conversion unit 101 by switching the carrier for every 128 bits. In a case where the table 131 held by the LUT holding unit 113 is great in size, and it takes time to perform processing at the compression encoding unit 112, an arrangement is made wherein a delayed element or the like is provided between the S/P conversion unit 101 and IFFT unit 102, and time for the processing at the compression encoding unit 112 is adjusted.

Figure 17:
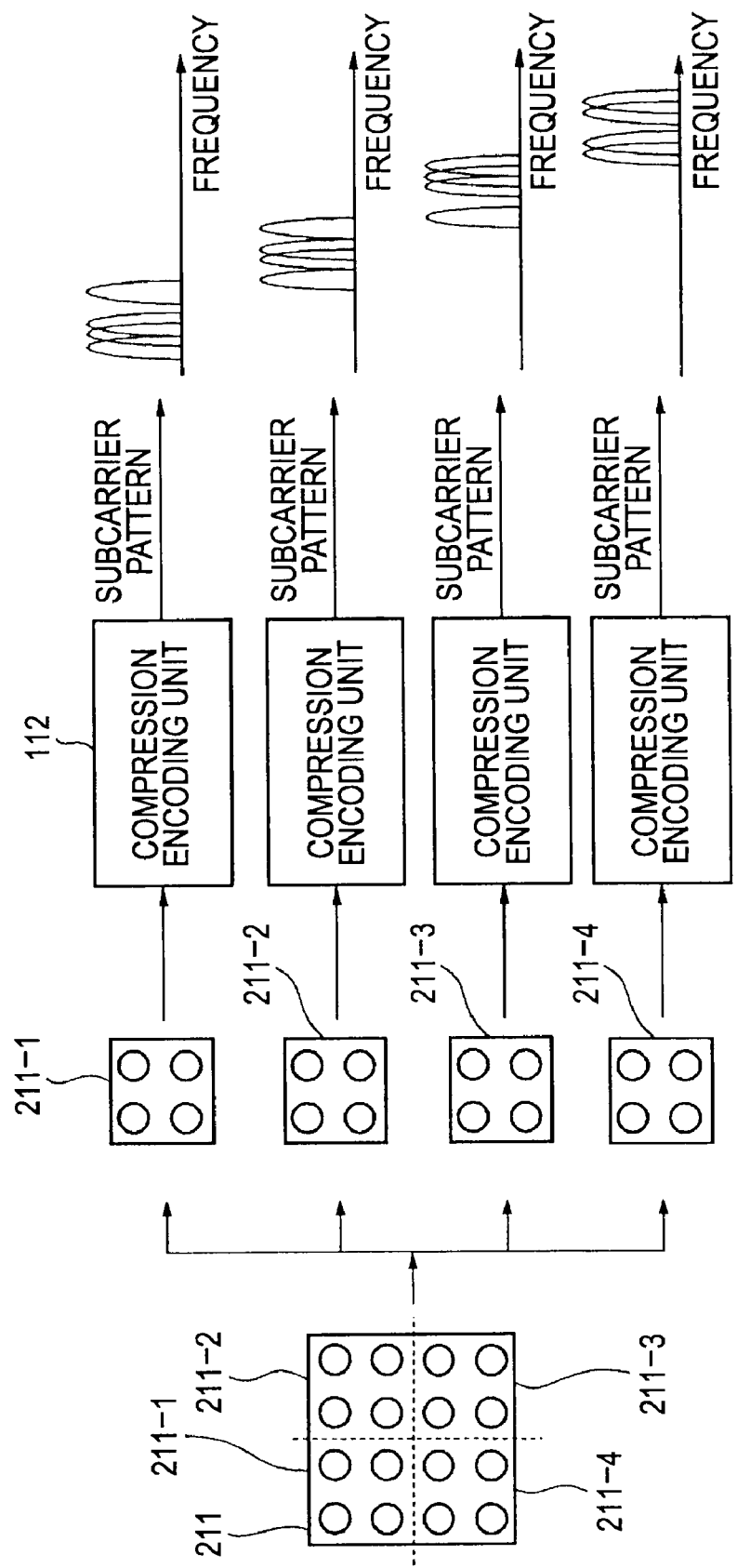
FIG. 17 is a diagram describing a case where encoding is performed by dividing image data into blocks.

As described above, a vector quantization code may be represented with a subcarrier pattern, or as shown in FIG. 17, subcarriers may be hierarchized. As shown in FIG. 17, when image data of 16 pixels of 4×4 (128 bits worth of data) is transmitted, first a block 211 made up of 16 pixels is divided into four blocks of blocks 211-1 through 211-4. For example, the block 211 is divided into a block 211-1 of 2×2 (8 bits worth of data) of the left upper of the block 211, a block 211-2 of 2×2 of the right upper of the block 211, a block 211-3 of 2×2 of the right lower of the block 211, and a block 211-4 of 2×2 of the left lower of the block 211.

The divided blocks 211-1 through 211-4 are each subjected to compression encoding at the compression encoding unit 112. Consequently, a subcarrier pattern is set for each of the blocks 211-1 through 211-4.

Description will be added regarding the transmission path when transmitting the data thus modulated. Wireless communication employs open space as a transmission medium, so the transmitted electric wave is reflected due to change in a refractive index of air, or by the ground, a mountain, building, vehicle, or the like. Some electric waves are greatly attenuated by the geological material or incident angle, and some electric waves are hardly attenuated and the route thereof is changed, thereby forming a multi-path propagation path. Therefore, propagation properties are changed by a weather phenomenon or geographical conditions.

Figure 18:
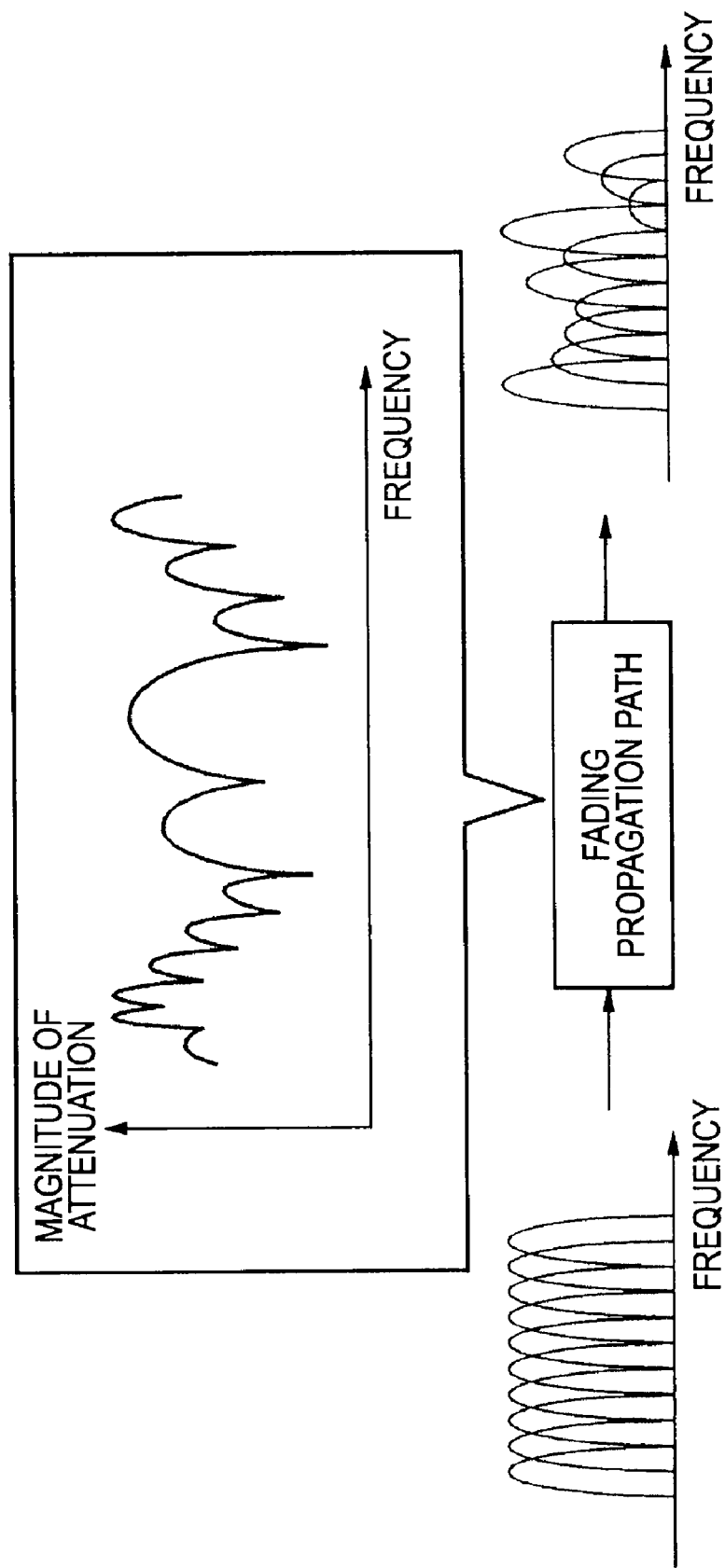
FIG. 18 is a diagram describing noise over a transmission path.

Also, in a case where fluctuation in a place is accompanied during communication, fluctuation in propagation path properties becomes further severe. This phenomenon is referred to as phasing, which causes amplitude fluctuation or phase swinging upon a transmission signal. As a result thereof, the quality of the reception signal is markedly influenced. FIG. 18 represents a signal deterioration model in a case where a phasing propagation path is regarded as filter properties. In addition to this phasing, various deteriorations, such as signal attenuation due to propagation distance, various types of noise such as white gauss noise or the like, distortion due to a transmitter/receiver (non-linear properties of an amplifier, etc.), and so forth, are added to the transmission signal on the transmission path. Demodulation has to be performed while considering such influence.

Figure 19:
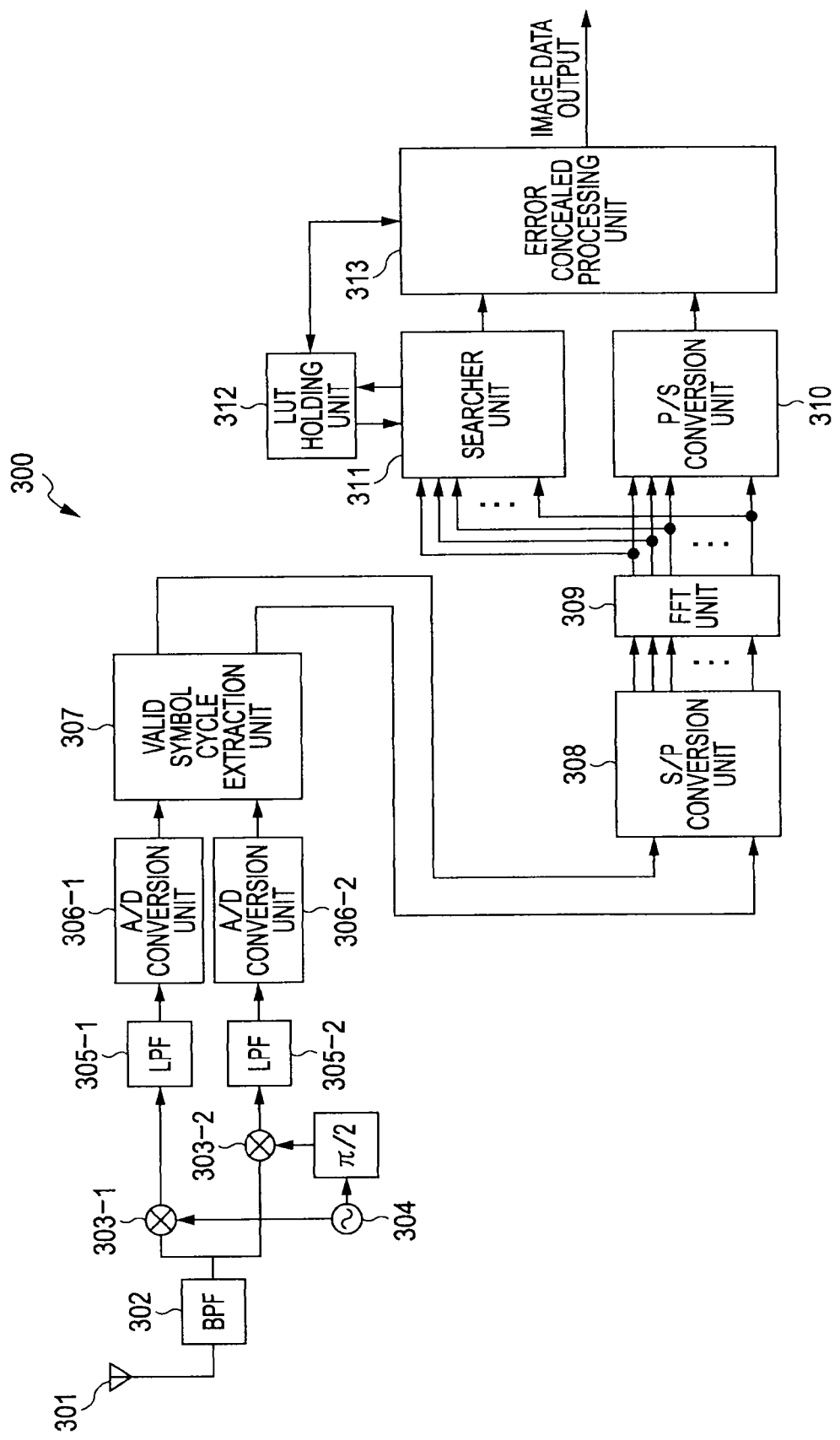
FIG. 19 is a diagram illustrating the configuration of an embodiment of a demodulating device to which an embodiment of the present invention has been applied.

Next, description will be made regarding a demodulating device which demodulates the signal modulated and transmitted at the modulating device 100. FIG. 19 is a diagram illustrating the configuration of an OFDM demodulating device. The OFDM modulating device shown in FIG. 19 is configured of an antenna 301, BPF 302, multipliers 303-1 and 303-2, oscillator 304, LPFs 305-1 and 305-2, A/D (Analog/Digital) conversion units 306-1 and 306-2, valid symbol cycle extraction unit 307, S/P conversion unit 308, FFT (Fast Fourier Transform) unit 309, P/S conversion unit 310, searcher unit 311, LUT holding unit 321, and error concealed processing unit 313.

The demodulating device receives transmission data through the antenna 301. The BPF 302 removes an unnecessary band component from the data received through the antenna 301 to extract only a carrier component. The multipliers 303-1 and 303-2 each multiply the output of the BPF 302 by the carrier component output from the oscillator 304, thereby performing frequency conversion processing.

The LPF 305-1 extracts only data including a subcarrier component (including a baseband component) from the data output from the multiplier 303-1 to output this to the A/D conversion unit 306-1. Similarly, the LPF 305-2 extracts only data including a subcarrier component (including a baseband component) from the data output from the multiplier 303-2 to output this to the A/D conversion unit 306-2.

The A/D conversion units 306-1 and 306-2 each subject the input data to A/D conversion. The valid symbol cycle extraction unit 307 extracts a valid symbol portion alone from the data supplied from each of the A/D conversion units 306-1 and 306-2. The output from the valid symbol cycle extraction unit 307 is supplied to the S/P conversion unit 308. The S/P conversion unit 308 converts the data supplied in serial into parallel data, and outputs this to the FFT unit 309.

The FFT unit 309 subjects the valid symbol portion supplied from the valid symbol cycle extraction unit 307 to the FFT processing to output this to the P/S conversion unit 310. The P/S conversion unit 310 subjects the data supplied from the FFT unit 309 to serial/parallel conversion. Thus, the modulated data is demodulated.

The output from the FFT unit 309 is also supplied to the searcher unit 311. The searcher unit 311 detects a subcarrier pattern, references the table held at the LUT holding unit 312 to read out the compressed data corresponding to the detection result thereof, and supplies this to the error concealed processing unit 313. The LUT holding unit 312 holds the same table as the table 131 held by the LUT holding unit 113 of the modulating device 100. The LUT holding unit 312 reads out the vector data determined from the vector quantization code to supply this to the error concealed processing unit 313 as appropriate.

The error concealed processing unit 313 generates image data from the data from the P/S conversion unit 310 (image data in this case), and the compressed data from the searcher unit 311 to output this to unshown processing downstream.

Figure 20:
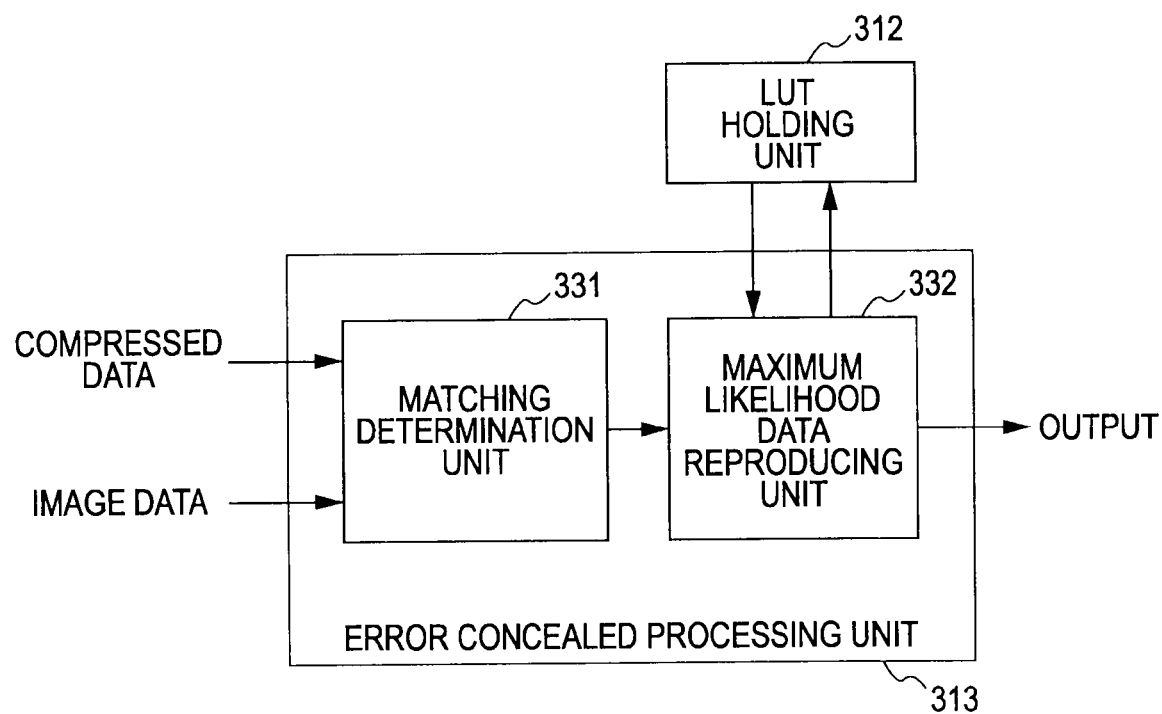
FIG. 20 is a diagram illustrating an internal configuration example of an error concealed processing unit.

FIG. 20 is a diagram illustrating an internal configuration example of the error concealed processing unit 313. The error concealed processing unit 313 is configured so as to include a matching determination unit 331 and maximum likelihood data reproducing unit 332. The image data from the P/S conversion unit 310, and the compressed data from the searcher unit 311 are supplied to the matching determination unit 331 of the error concealed processing unit 313. The determination result from the matching determination unit 331 is supplied to the maximum likelihood data reproducing unit 332. The maximum likelihood reproducing unit 332 is configured so as to reference the table held at the LUT holding unit 312 to output image data as appropriate.

Figure 21:
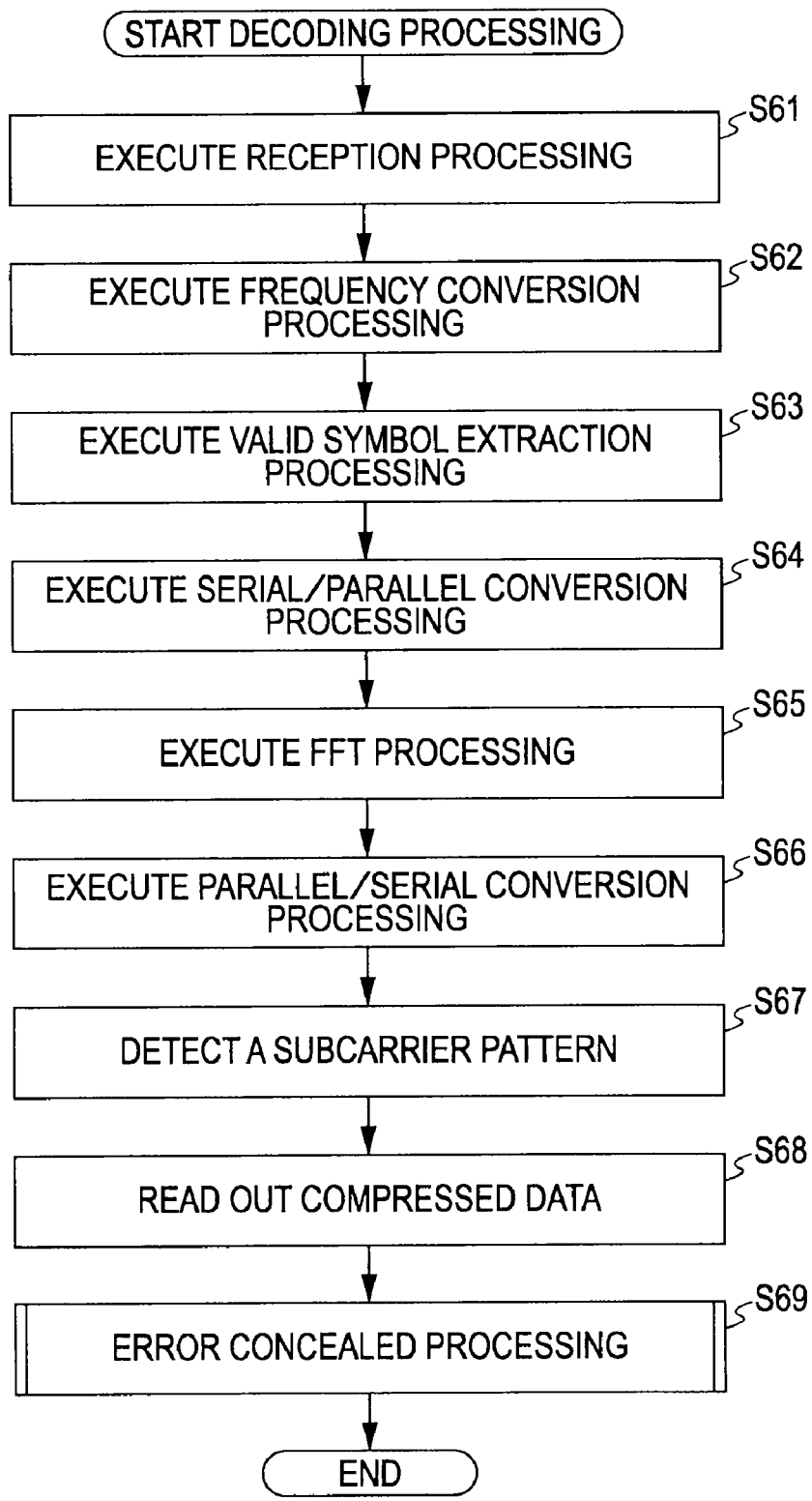
FIG. 21 is a flowchart describing the operation of the demodulating device shown in FIG. 19.

Next, the operation of the demodulating device 300 shown in FIG. 19 will be described with reference to the flowchart shown in FIG. 21.

In step S61, the BPFs 302-1 and 302-2 execute reception processing, extract a carrier component alone from the signal received through the antenna 301 to output this to the multipliers 303-1 and 303-2. In step S62, the multipliers 303-1 and 303-2 multiply the components supplied from the BPFs 302-1 and 302-2 by the carrier component output from the oscillator 304 respectively, thereby subjecting the received data to frequency conversion processing to output the data including the subcarrier component.

The LPFs 305-1 and 305-2 remove an unnecessary component from the data output from the multipliers 303-1 and 303-2, and then outputs the data to the A/D conversion units 306-1 and 306-2, respectively. The A/D conversion units 306-1 and 306-2 subject the input data to A/D conversion to output to the valid symbol cycle extraction unit 307. In step S63, the valid symbol cycle extraction unit 307 extracts a valid symbol portion from the received data to output this to the S/P conversion unit 308. In step S64, the S/P conversion unit 308 converts the input serial data into parallel data to output this to the FFT unit 309.

In step S65, the FFT unit 309 executes the FFT processing to output the data to the P/S conversion unit 310 and searcher unit 311. In step S66, the P/S conversion unit 310 converts the input parallel data into serial data. This serial data becomes basically the same data as the serial data input to the S/P conversion unit 101 of the modulating device 100. That is to say, this serial data becomes the image data before being subjected to modulation. With the present embodiment, as described above, image data is transmitted without being compressed. Accordingly, the demodulated data is uncompressed data, so decompression processing does not have to be performed.

Accordingly, a processing unit for performing decompression processing does not have to be provided, thereby simplifying the configuration of the reception side by just that much. Also, decompression processing does not have to be performed, which provides an advantage such that processing capability for the decompression processing can be reduced, and accordingly, processing capability can be relegated to other processing.

Also, with the present embodiment, predetermined information, a vector quantization code in the case of the first embodiment is included in a subcarrier pattern. Now, processing at the time of processing the information included in a subcarrier pattern will be described by returning to the flowchart shown in FIG. 21.

In step S67, the searcher unit 311 analyzes the signal supplied from the FFT unit 309 to detect a subcarrier pattern. The searcher unit 311 detects a subcarrier pattern by searching which subcarrier is employed. In step S68, the searcher unit 311 references the table 131 held at the LUT holding unit 312 to determine a vector quantization code based on the employed subcarrier pattern, and reads out the vector data (compressed data) corresponding to the vector quantization code thereof to supply this to the error concealed processing unit 313.

In step S69, the error concealed processing unit 313 executes error concealed processing. This error concealed processing will be described with reference to the flowchart shown in FIG. 22.

In step S81, the matching determination unit 331 of the error concealed processing unit 313 obtains the image data from the P/S conversion unit 310, and the compressed data from the searcher unit 311 to calculate a distance evaluation value of these data. The distance evaluation value is obtained by calculating the distance evaluation value E1 of a vector in accordance with the following Expression (2).

[Equation 2]

$$E1 = \sum_{i=0}^{N-1} (Di - Ci)^2 \quad (2)$$

In Expression (2), N denotes the order number of a vector, Di denotes the image data from the P/S conversion unit 310, and Ci denotes the compressed data from the searcher unit 311. In a case where the distance evaluation value E1 obtained in Expression (2) is greater than a predetermined threshold TH, i.e., in a case where determination is made that the distance is far away, determination is made that an error occurs.

In step S81, upon the distance evaluation value E1 being calculated by the matching determination unit 331, and being supplied to the maximum likelihood data reproducing unit 332, the processing proceeds to step S82. In step S82, the maximum likelihood data reproducing unit 332 determines whether or not the distance evaluation value E1 is greater than the predetermined threshold TH, thereby determining whether or not an error occurs. In a case where determination is made in step S82 that an error occurs, the processing proceeds to step S83.

In step S83, the maximum likelihood data reproducing unit 332 sets the code number i of a vector quantization code to be processed of the table 131 held at the LUT holding unit 312 to zero. In the processing in steps S84 through S87, vector data having the smallest distance as to both data of the image data from the P/S conversion unit 310, and the compressed data from the searcher unit 311 is searched while referencing the table 131 held at the LUT holding unit 312.

First, in step S84, the distance between the vector data of the code #i to be processed and the image data from the P/S conversion unit 310 is calculated, and the distance between the vector data of the code #i and the compressed data from the searcher unit 311 is calculated. This calculation is performed, for example, based on the following Expression (3).

[Equation 3]

$$E2 = \sum_{i=0}^{N-1} (Di - Vi)^2 + \sum_{i=0}^{N-1} (Ci - Vi)^2 \quad (3)$$

In step S85, the code #i having the minimum distance is stored in memory. Let us say that the maximum likelihood data reproducing unit 332 is configured so as to include memory for storing the code #i having the minimum distance, or configured so as to store predetermined information as to external memory. In step S86, determination is made whether or not the processing as to all of the vector codes has been completed, and in a case where determination is made that the processing has not been completed, the processing proceeds to step S87.

In step S87, i is incremented by one, the code #i corresponding to the incremented i is taken as an object to be processed, the processing in step S84 and thereafter is repeated. Thus, the processing in steps S84 through S87 is repeated, thereby searching the vector data having the minimum distance as to both of the image data from the P/S conversion unit 310 and the compressed data from the searcher unit 311.

In a case where determination is made in step S86 that the processing as to all of the vector codes has not been completed, the processing proceeds to step S88. In step S88, the vector data corresponding to the code #i having the minimum distance is selected as the maximum likelihood data. In step S89, the selected vector data thereof is output as reproducing data.

The vector data thus obtained is output, whereby a system in which real time nature is demanded can also reproduce an image having little image quality deterioration, even in a case where a transmission path error occurs.

On the other hand, in a case where determination is made in step S82 that the distance evaluation value E1 is not greater than the threshold TH, in other words, in a case where determination is made that no error occurs, the processing proceeds to step S89, where the data is output. The data to be output in this processing is the image data from the P/S conversion unit 310. The data thus modulated at the modulating device 100 side is demodulated at the demodulating device 300.

Figure 22:
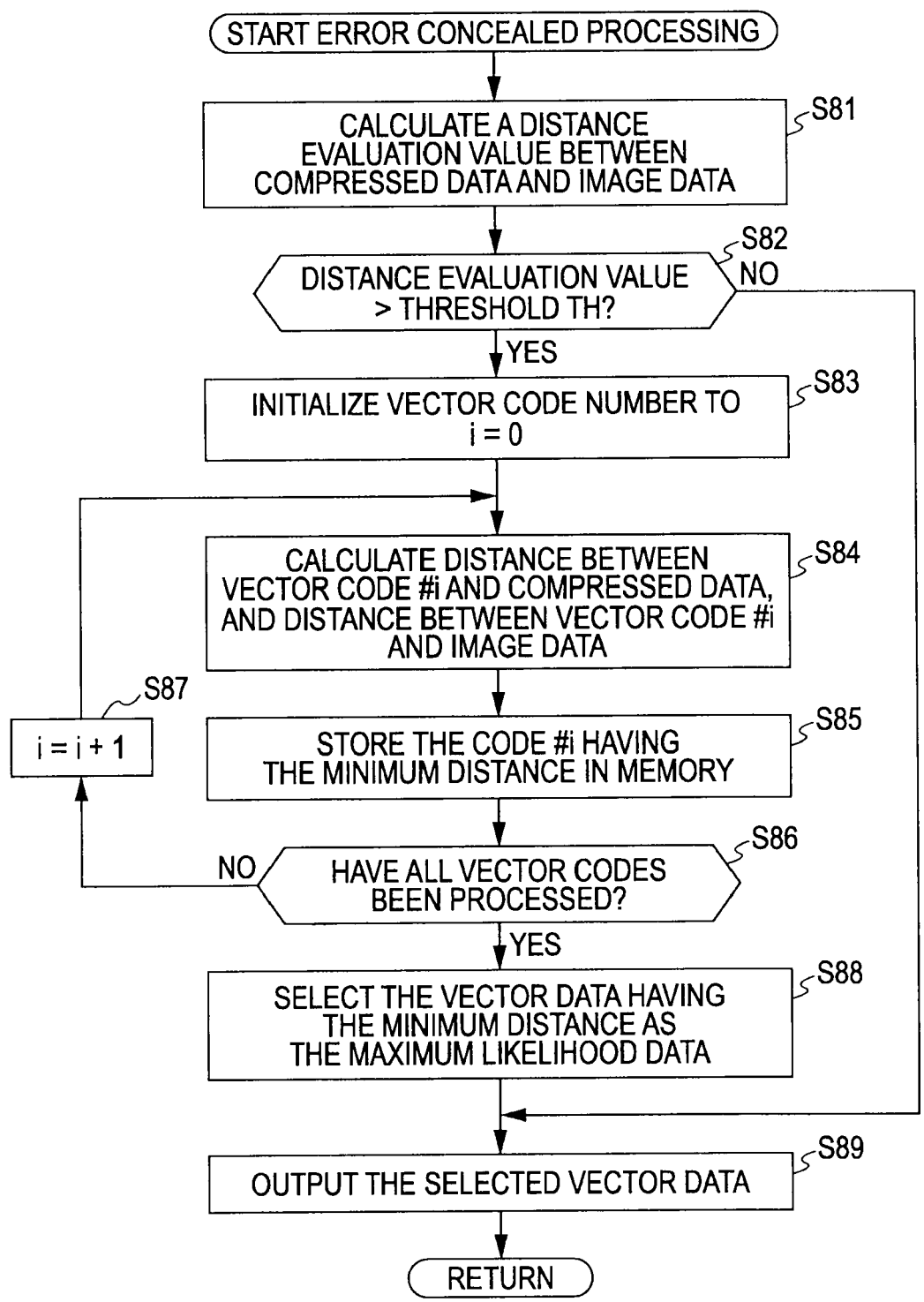
FIG. 22 is a flowchart describing error concealed processing.

Description has been made regarding the processing of the error concealed processing unit 313 with reference to the flowchart shown in FIG. 22, but processing such as described below may be performed as another processing.

With regard to the data output from the P/S conversion unit 310, in a case where a transmission signal "1" is smaller than an arbitrary threshold at the reception side, the signal is received as "−1", and determination is made as "error". With regard to the data output from the searcher unit 311, determination is made whether a power spectrum is on (there is a signal) or off (there is no signal).

With regard to the data output from the searcher unit 311, on/off determination with a power spectrum is further robust as compared to the P/S conversion unit 310 for determining with a sign (plus or minus). That is to say, in a case where determination is made at the matching determination unit 331 that there is an error, the input compressed data is simply passed through as is, i.e., the compressed data is simply selectively output without performing the processing in steps S84 through S88, thereby enabling robust communication, and accordingly, such an arrangement may be made.

Thus, a vector quantization code (compressed data) can be represented with a subcarrier pattern, i.e., vector quantization code (compressed data) information can be included in a subcarrier pattern. Thus, communication wherein robustness is improved can also be performed.

Figure 23:
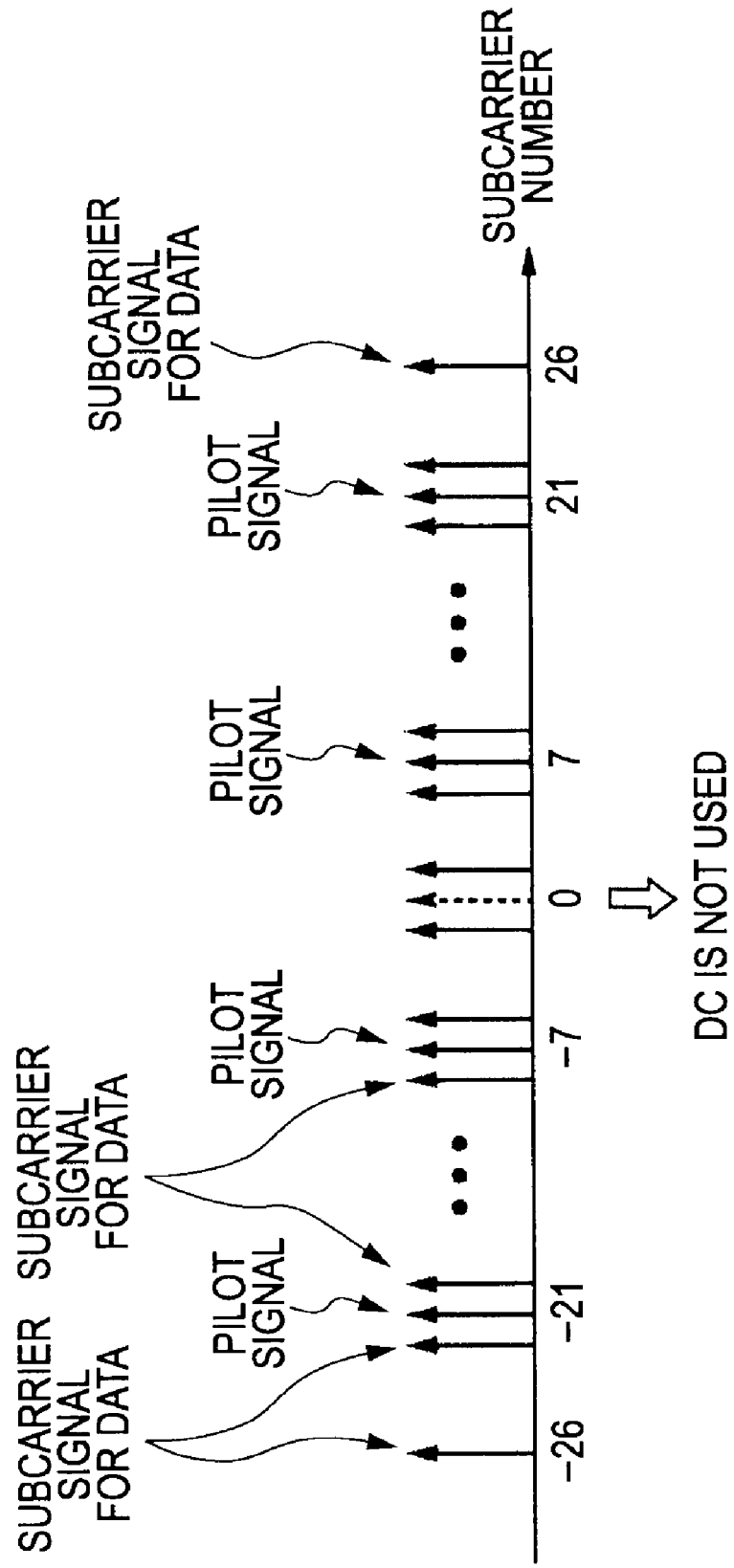
FIG. 23 is a diagram describing subcarrier signals and pilot signals.

Note that, with the above-mentioned first embodiment and embodiments described below, description will be continued with reference to modulation or demodulation with television broadcasting communication as an example, but the present invention is not restricted to such communication. For example, the present invention may be applied to communication standardized by the IEEE (The Institute of Electrical and Electronics Engineers) 802.11a such as shown in FIG. 23.

IEEE 802.11a is a standard relating to wireless LAN (Local Area Network). FIG. 23 illustrates the subcarrier layout of IEEE 802.11a. With the number of a subcarrier having a center frequency as "0", IEEE 802.11a has a configuration of 52 subcarriers vertically from "−26" to "+26". The four subcarriers of the subcarrier number "−21", "−7", "+7", and "+21" are taken as pilot signals. The present invention may be applied to communication employed for such a wireless LAN or the like.

Second Embodiment

Figure 24:
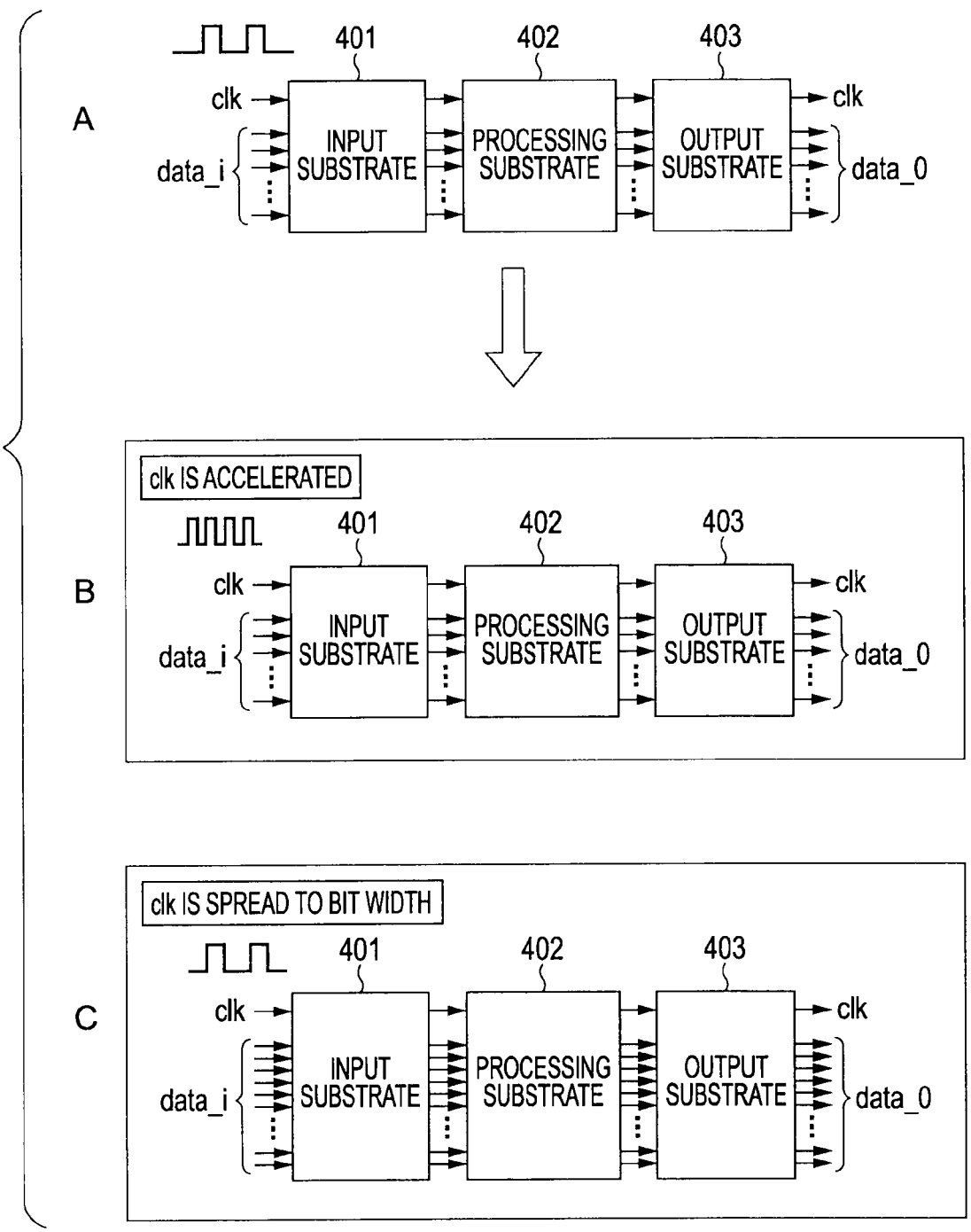
FIG. 24 is a diagram describing processing when an input data format is changed.

Next, description will be added regarding a second embodiment. The second embodiment is an embodiment for realizing a scalable configuration. Description will be added regarding a scalable configuration with reference to FIGS. 24 and 25. Let us say that A in FIG. 24 is the current configuration of substrates wherein a predetermined signal is input and processed. Data is input to an input substrate 401, the data thereof is processed by a processing substrate 402, and the data is output to an external device or the like by an output substrate 403. The input substrate 401, processing substrate 402, and output substrate 403 each process multiple pieces of data in a batch manner (processed in parallel). Let us say that these substrates process image data.

When the substrates having such a configuration are in a certain state, when desiring to process a higher resolution image than the image which these substrates can process, it can be conceived to improve processing speed. As shown in B in FIG. 24, in the case of attempting to increase clock speed to improve processing speed, for example, the processing substrate 402 fails to process the image in some cases. Consequently, increase in clock speed prevents a high resolution image from being processed.

Also, as shown in C in FIG. 24, in the case of attempting to process a high resolution image by expanding the clock pulses to a bit width, for example, the processing substrate 402 fails to process the image with the bit width thereof due to lack of the number of pins of the processing substrate 402 in some cases. Consequently, expanding the clock pulses to the bit width prevents a high resolution image from being processed.

That is to say, in such a case, when desiring to newly configure the substrates so as to process a high resolution image, i.e., when changing the format of input data, the substrates also have to be reconfigured according to the change thereof. This means that each time a bandwidth is widened according to increase in the resolution of an input signal, an LSI or substrate or the like has to be reconfigured according to the speed of the signal, and increased cost in money, time, and manpower can result in a problem in some cases.

Consequently, an arrangement is made wherein each time a bandwidth is widened according to increase in the resolution of an input signal, the signal can be processed without reconfiguring an LSI or substrate or the like according to the speed of the signal. The concept thereof is such as shown in B in FIG. 25. Let us say that the configurations of the substrates such as B in FIG. 25 are employed instead of the configurations of the substrates such as A in FIG. 25.

Figure 25:
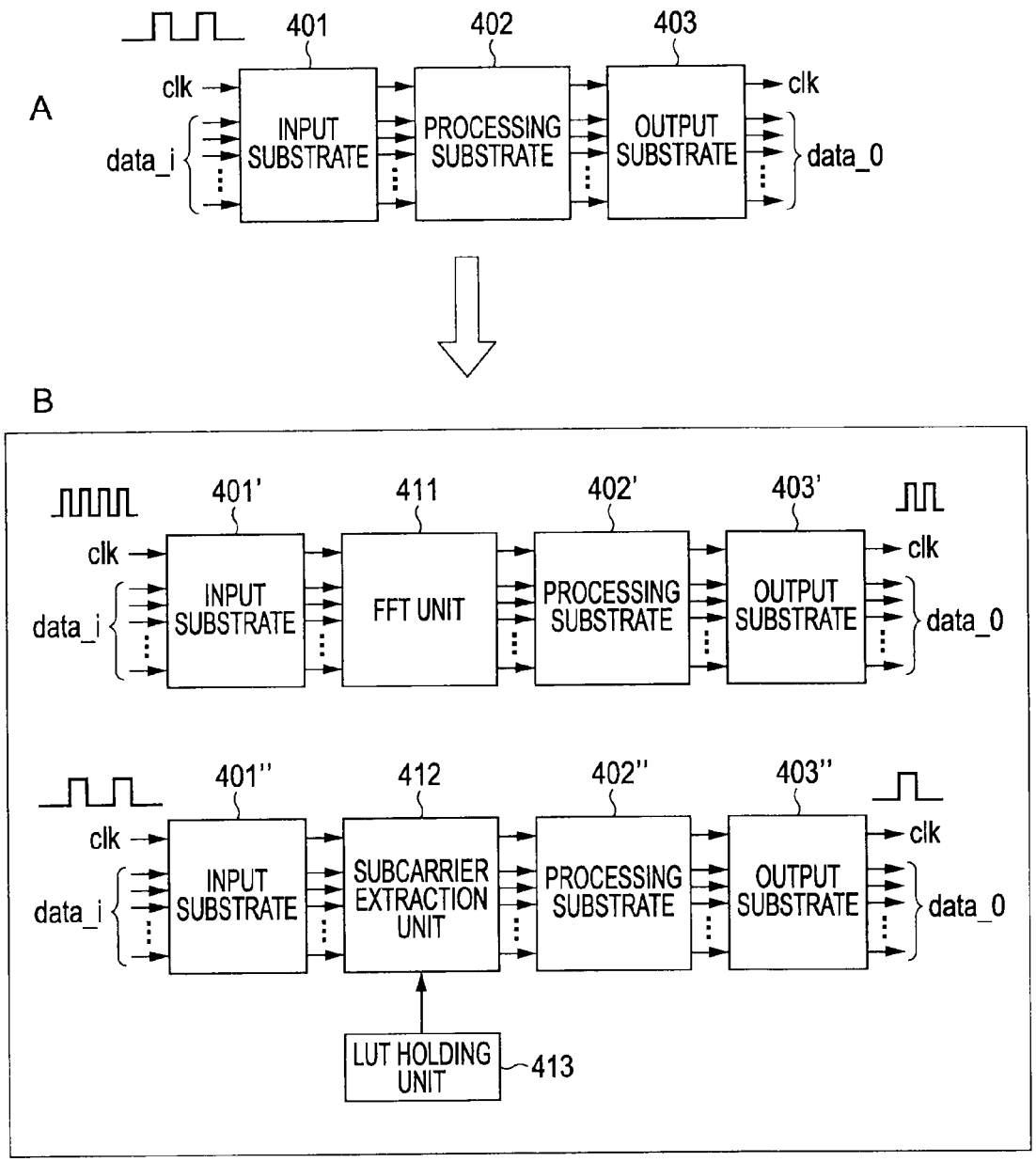
FIG. 25 is a diagram describing processing when an input data format is changed.

As shown in B in FIG. 25, there are provided a first device including an input substrate 401' FET unit 411, processing substrate 402', and output substrate 403', which can process a high-resolution image, and a second device including an input substrate 401", subcarrier extraction unit 412, LUT holding unit 413, processing substrate 402", and output substrate 403", which fail to process a high-resolution image.

The first device is designed so as to process high resolution image quality, so when high resolution image quality data is input, the data thereof can be processed. However, the second device is not designed so as to process high resolution image quality, so when high resolution image quality data is input, the data thereof fails to be processed with the same processing as the first device. Consequently, the second device is configured such that when high resolution image data is input, the subcarrier extraction unit 412 references the table held at the LUT holding unit 413 to convert this data into data which it can handle itself, and processes this.

With such a configuration, even if high resolution image data is transmitted, a device which can process low resolution image data alone can handle such high resolution image data. Also, tentatively, even in a case where a further high resolution image is generated, and is transmitted, the second device is configured so as to process such image. In other words, a device can be provided wherein even if the format of input data is changed, the data can be continuously processed without reconfiguring the substrates according to the change thereof. That is to say, the device having a scalable configuration can be realized.

FIGS. 26A through 26C are diagrams for describing the pixel positions of each of a 4K2K signal, HD (High Definition) signal, and SD (Standard Definition) signal. When describing these signals in the order of high image quality, the order is the 4K2K signal, HD signal, and SD signal. FIG. 26A is a diagram representing the pixel positions of the 4K2K signal. FIG. 26B represents the pixel positions of the HD signal in solid lines, and also represents the pixel positions of the 4K2K signal in dotted lines. FIG. 26C represents the pixel positions of the SD signal in solid lines, and also represents the pixel positions of the 4K2K signal in dotted lines.

As shown in FIGS. 26A through 26C, in the case of the same format (interlace/progressive), the size of an HD signal becomes the size of ¼ of the data quantity of a 4K2K signal, and the size of an SD signal becomes the size of 1/16 of the data quantity of a 4K2K signal.

With the second embodiment, even if the speed of an input signal increases, for example, from the speed of an HD signal to the speed of a 4K2K signal along with change in times, scalability is provided so as to continuously employ an LSI which handles the speed whereby an HD signal can be processed, and also an LSI which handles only the speed whereby an SD signal can be processed.

Figure 27:
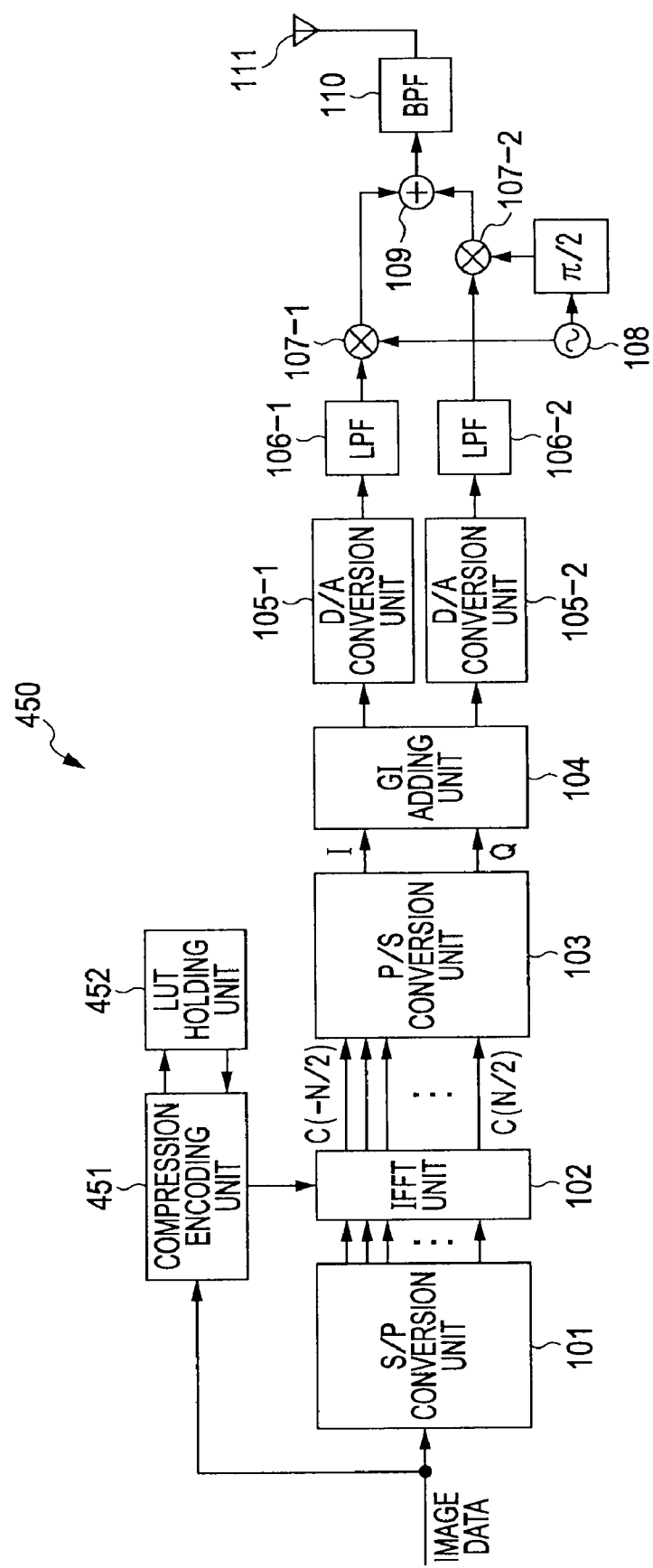
FIG. 27 is a diagram illustrating another configuration example of the modulating device.

FIG. 27 is a diagram illustrating a configuration example of a modulating device according to the second embodiment. With the modulating device 450 shown in FIG. 27 and the modulating device 100 shown in FIG. 6, the same components are appended with the same reference numerals, and description thereof will be omitted as appropriate. The modulating device 450 shown in FIG. 27 has basically the same configuration as the modulating device 100 shown in FIG. 6 has. However, there is a different configuration wherein the table held at an LUT holding unit 452 differs from the table 131 held at the LUT holding unit 113, and a compression encoding unit 451 which references the table thereof to perform processing differs from the compression encoding unit 112.

Description will be made here regarding a case where an input signal is an image signal. Also, description will be continued with reference to a case where SD signals and HD signals are handled as an example. In the case of handling SD signals and HD signals, the table held by the LUT holding unit 452 becomes, for example, a table 470 such as shown in FIG. 28.

As shown in FIG. 28, the table 470 is basically the same as the table 131 shown in FIG. 10, which is a table wherein a vector quantization code is correlated with vector data. However, with the table 470 shown in FIG. 28, two pieces of vector data are correlated with one vector quantization code. Specifically, vector data for HD signal and vector data for SD signal are correlated with one vector quantization code.

With the table 470 shown in FIG. 28, description is made with reference to SD signals and HD signals as examples, so the example is shown wherein two pieces of vector data are correlated with one vector quantization code, but for example, in the case of further handling 4K2K signals, three pieces of vector data of vector data for SD signal, vector data for HD signal, and vector data for 4K2K signal are correlated with one vector quantization code.

The modulating device 450 references this table 470 to perform processing as described below, so in a case where a new signal (new format) is added, vector data relating to the signal thereof is added (newly correlated with an existing vector quantization code), whereby the new signal thereof can be processed. Accordingly, a new substrate does not have to be reconfigured to process a new signal.

The operation of the modulating device 450 shown in FIG. 27 is basically the same as the operation of the modulating device 100 shown in FIG. 6, and the operation thereof is performed based on the flowchart shown in FIG. 7, and accordingly, the detailed description will be omitted. However, in step S12, the compression encoding processing is executed, and the compression encoding processing thereof is performed based on the flowchart shown in FIG. 9, but this compression encoding processing is performed at the compression encoding unit 451, and the table referenced by the processing thereof is the table 470 shown in FIG. 28.

Figure 9:
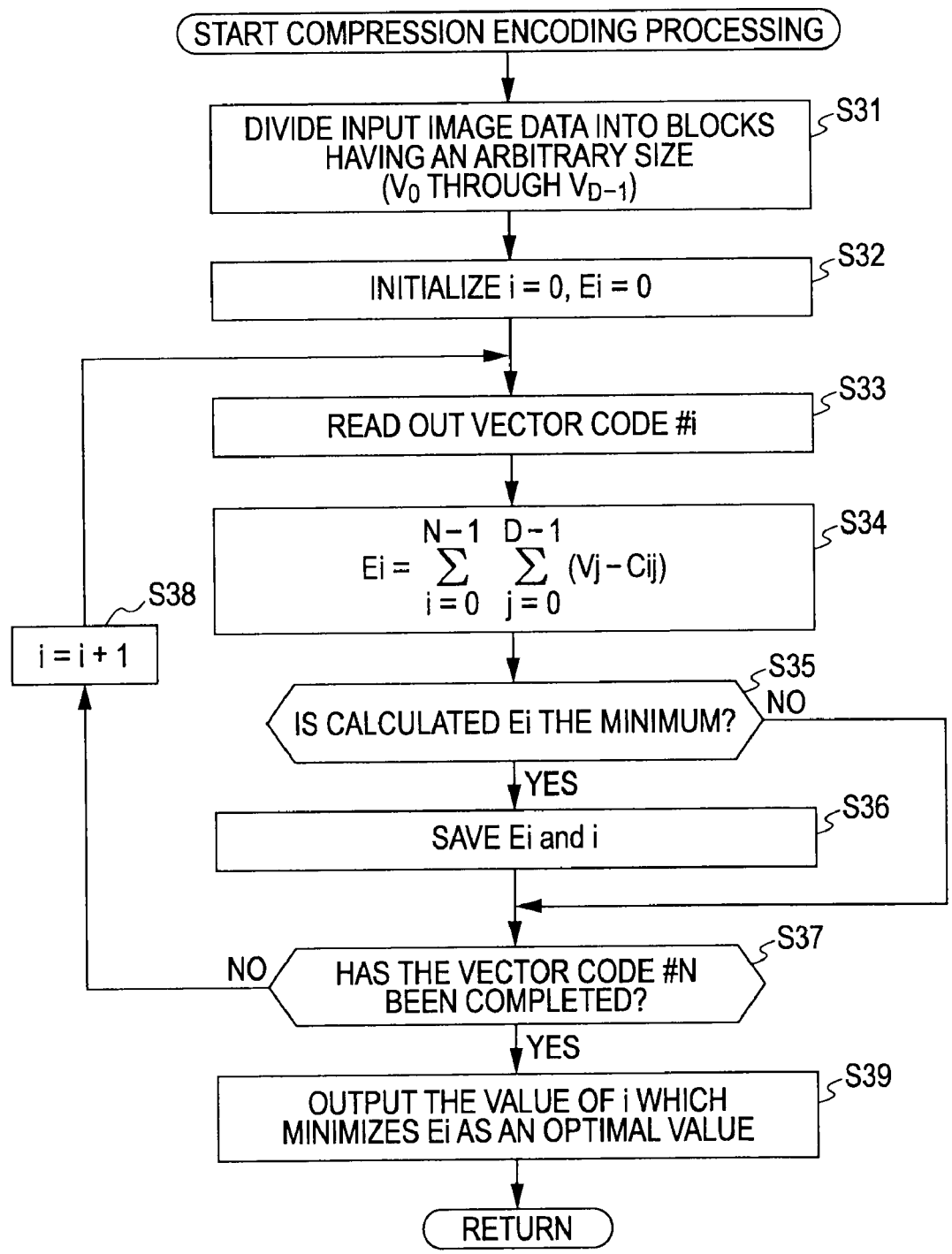
FIG. 9 is a flowchart describing compression encoding processing.

The referenced table is the table 470, so when the flowchart shown in FIG. 9 is executed, if the data being processed at that point is an HD signal, vector data for HD signal is referenced, and if the data being processed at that point is an SD signal, vector data for SD signal is referenced.

The modulating device 450 modulates input image data according to the above-mentioned configuration and operation, and also performs modulation wherein vector quantization code information is included in a subcarrier pattern. In this case, one vector quantization code is transmitted, but if the reception side is a device which can process only SD signals, the above-mentioned vector quantization code functions as a vector quantization code for SD signal, and if the reception side is a device which can also process HD signals, the above-mentioned vector quantization code functions as a vector quantization code for HD signal.

Figure 29:
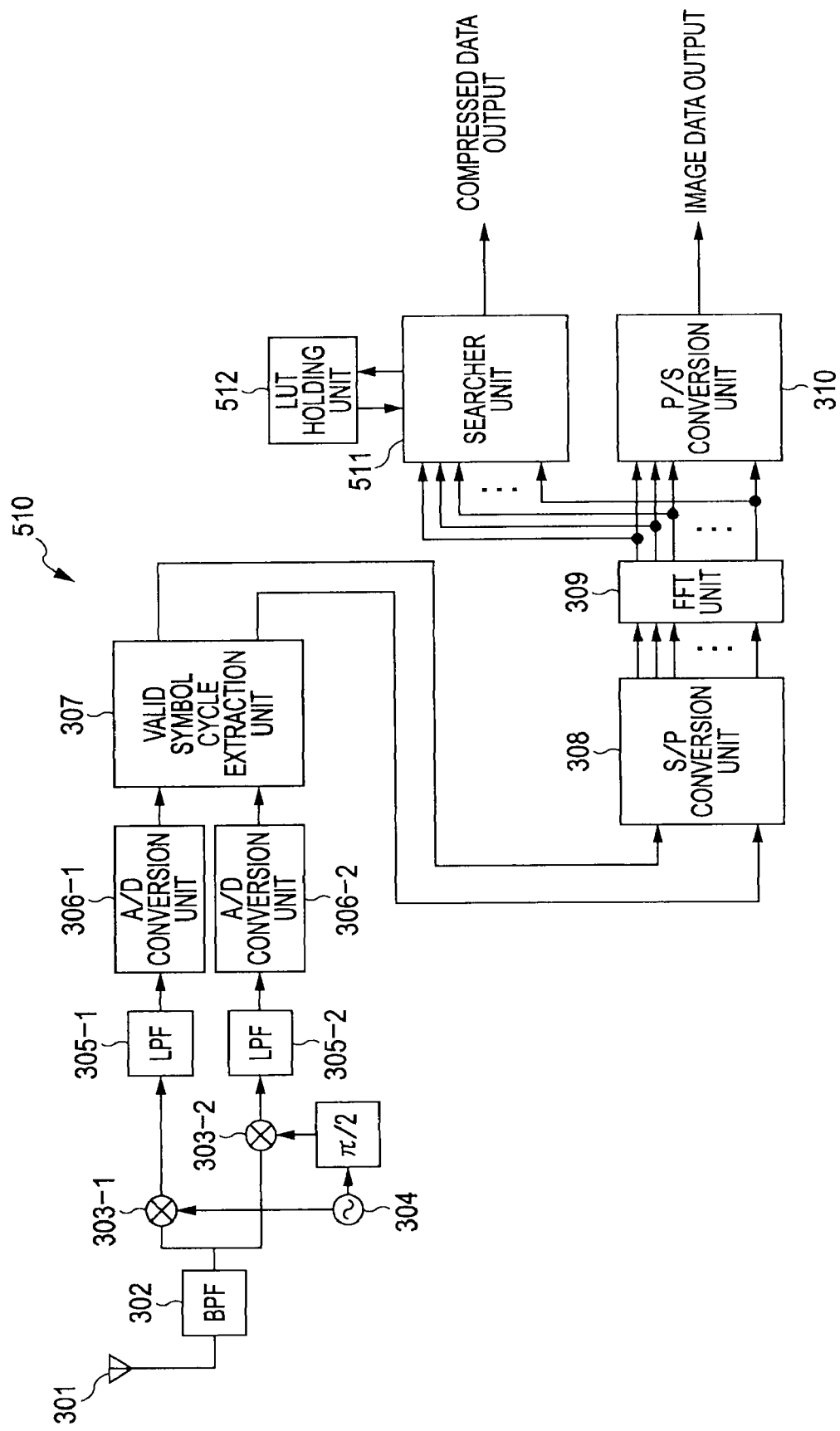
FIG. 29 is a diagram illustrating another configuration example of the demodulating device.

Next, description will be made regarding a demodulating device which demodulates the signal modulated by the modulating device 450 shown in FIG. 27. FIG. 29 is a diagram illustrating a configuration example of a demodulating device according to the second embodiment. The demodulating device 510 shown in FIG. 29 has the configuration of the demodulating device 300 shown in FIG. 19 from which the error concealed processing unit 313 is removed.

Figure 30:
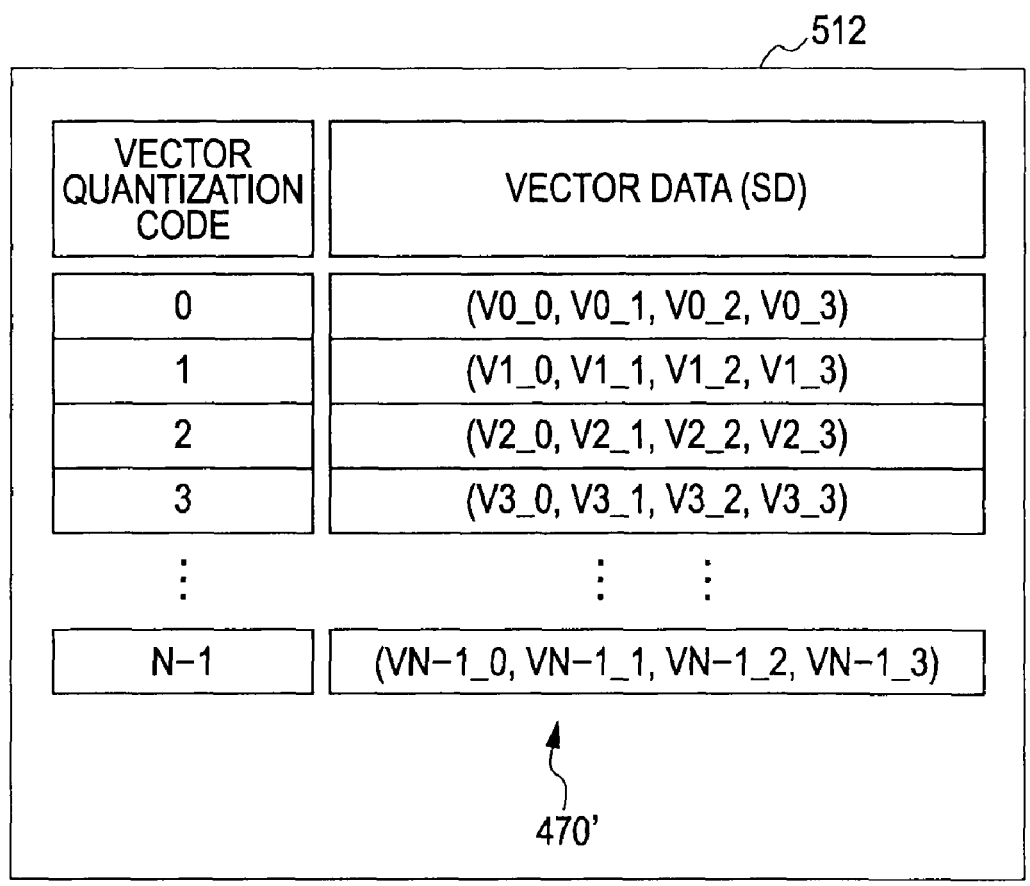
FIG. 30 is a diagram describing another table.

Also, with the configuration of the demodulating device 510, the table held at an LUT holding unit 512 differs from the table 131 held at the LUT holding unit 312, and a searcher unit 511 which references the table thereof to perform processing differs from the searcher unit 311. If the demodulating device 510 is a device which can process not HD signals but SD signals, the table held at the LUT holding unit 512 is a table 470' such as shown in FIG. 30. That is to say, the table 470' is held wherein only vector data for SD signal is described as vector data. On the other hand, if the demodulating device 510 is a device which can process HD signals, the table 470 such as shown in FIG. 28 is held, or though not shown in the drawing, a table 470" is held wherein only vector data for HD signal is described.

Figure 31:
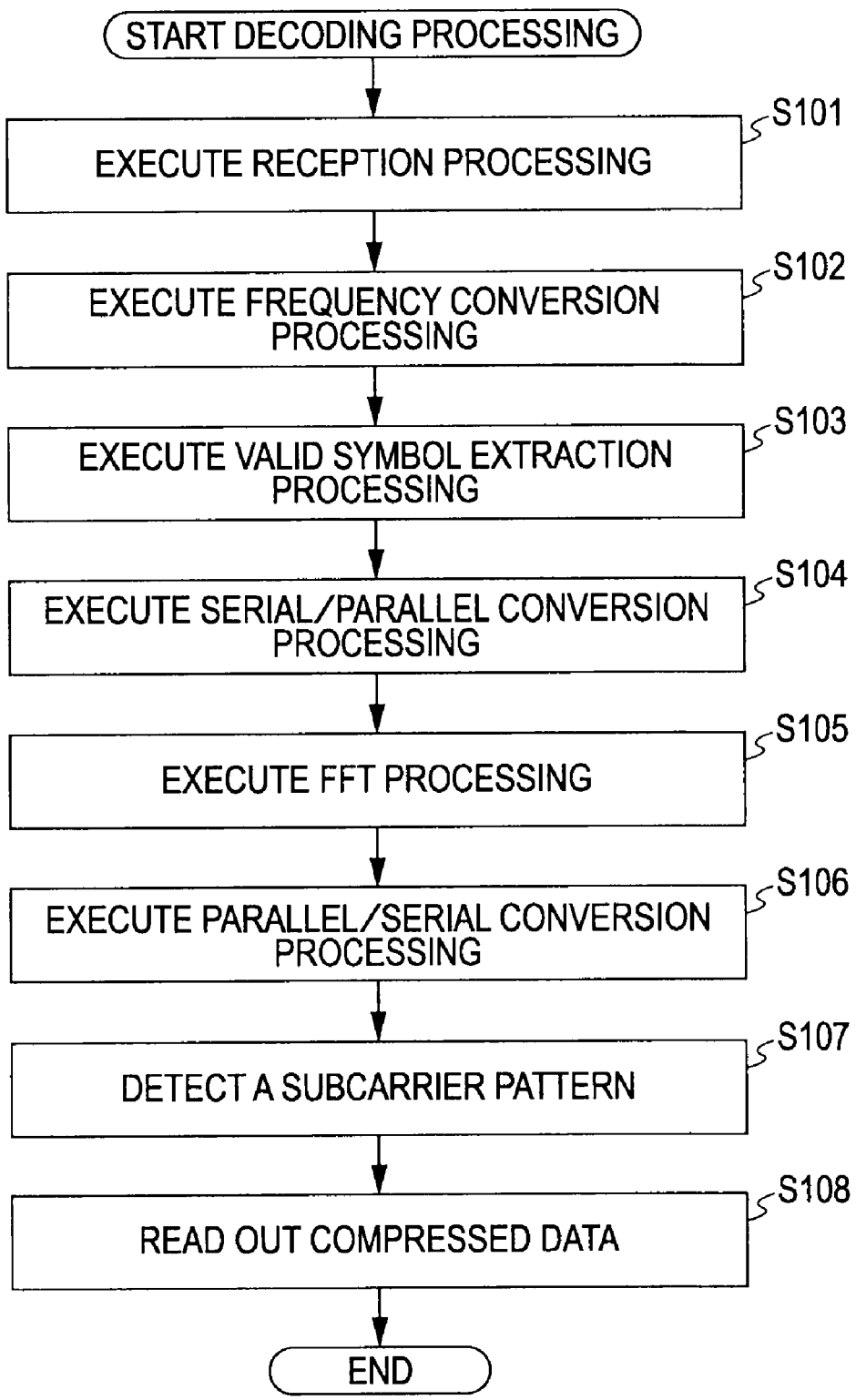
FIG. 31 is a flowchart describing the operation of the demodulating device shown in FIG. 29.

The operation of the demodulating device 510 shown in FIG. 29 will be described with reference to the flowchart shown in FIG. 31. Steps S101 through S108 are performed in the same way as steps S61 through S68 of the flowchart shown in FIG. 21. Specifically, the operation of the demodulating device 510 shown in FIG. 29 is basically the same as the operation of the demodulating device 300 shown in FIG. 19, and the operation thereof is performed based on the flowchart shown in FIG. 21, but differs in that the error concealed processing which is executed in step S69 is not executed.

Specifically, with the demodulating device 510, in the processing up to step S106, the demodulated image data is output from the P/S conversion unit 310. Subsequently, in step S107 a subcarrier pattern is detected by the searcher unit 511, in step S108 the table held at the LUT holding unit 512 is referenced, and compressed data (vector data) is read out and output.

Even if the same vector quantization code is included in subcarrier patterns, compressed data differs depending on whether or not the demodulating device 510 is a device which can process HD signals.

If the modulating device 510 is a device which can process HD signals, the table 470 such as shown in FIG. 28, or though vector data for SD signal is not described, the table 470" in which vector data for HD signal is described is held. Therefore, a subcarrier pattern is detected, and the vector quantization code corresponding to the pattern thereof is determined, and further, data which is read out as the compressed data corresponding to the vector quantization code thereof becomes vector data for HD signal.

Also, if the modulating device 510 is a device which can process SD signals, the table 470' such as shown in FIG. 30 is held. Therefore, a subcarrier pattern is detected, and the vector quantization code corresponding to the pattern thereof is determined, and further, data which is read out as the compressed data corresponding to the vector quantization code thereof becomes vector data for SD signal.

Thus, even if the same vector quantization code is received, the table 470 corresponding to the ability of the device which received the code is held, so the demodulation result corresponding to the ability of the device can be obtained. Thus, with the second embodiment, compressed data is embedded in a subcarrier, thereby enabling coexistence of systems having a different operating frequency.

Figure 32:
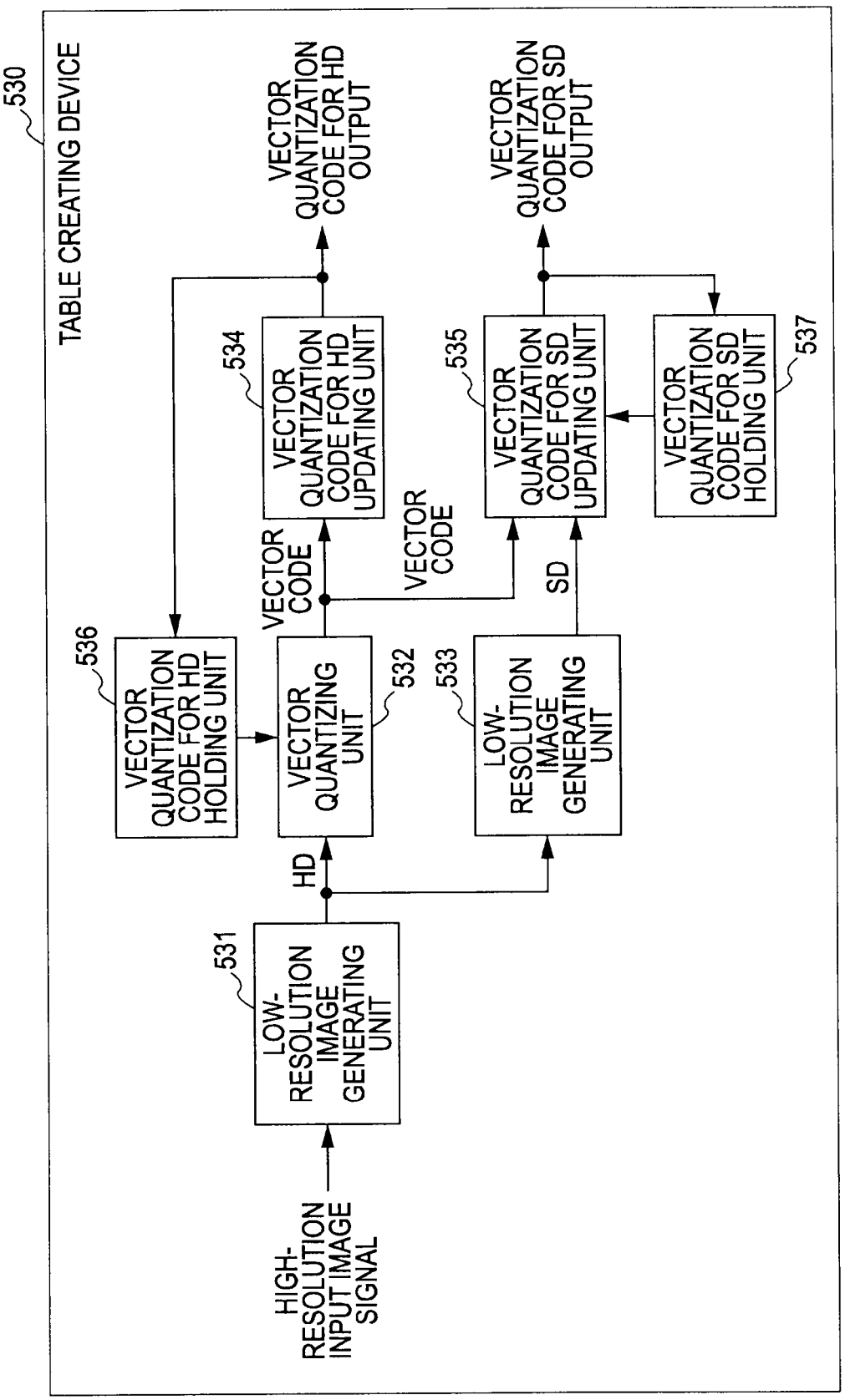
FIG. 32 is a diagram illustrating a configuration example of a creating device for creating a table.

Next, description will be made regarding creation of the table 470. FIG. 32 is a diagram illustrating a configuration example of the table creating device 530 which creates the table 470. The table creating device 530 shown in FIG. 32 is configured so as to include a low-resolution image generating unit 531, vector quantizing unit 532, low-resolution image generating unit 533, vector quantization code for HD updating unit 534, vector quantization code for SD updating unit 535, vector quantization code for HD holding unit 536, and vector quantization code for SD holding unit 537.

Figure 33:
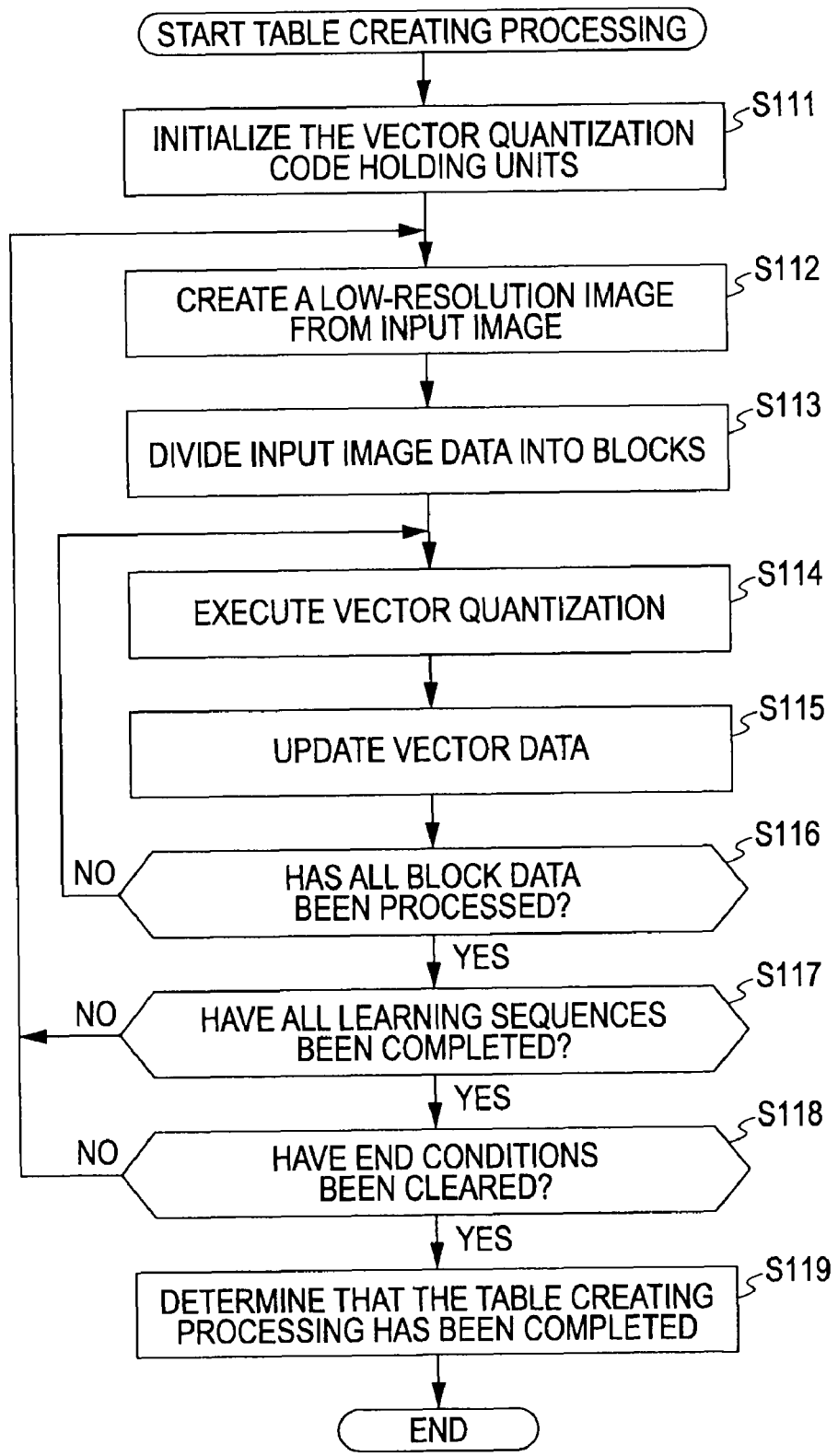
FIG. 33 is a flowchart describing the operation of a table creating device.

The operation of the table creating device 530 shown in FIG. 32 will be described with reference to the flowchart shown in FIG. 33. In step S111, the vector quantization code for HD holding unit 536 and the vector quantization code for SD holding unit 537 are initialized. In step S112, a high-resolution signal is input to the low-resolution image generating unit 531, and data of which the band is lowered is generated. For example, an image signal for 4K2K is input as a high-resolution input image signal, and an HD image is output from the low-resolution image generating unit 531. With the low-resolution image generating unit 531, for example, three pixels are thinned from four pixels serving as 4K2K data supplied from an input signal, and further, the remaining pixel is subjected to filtering by the LPF (low-pass filter), thereby converting into an HD pixel in increments of one pixel.

The HD image output from the low-resolution image generating unit 531 is input to the vector quantizing unit 532 and low-resolution image generating unit 533. The low-resolution image generating unit 533 performs the same processing as the low-resolution image generating unit 531. Specifically, three pixels are thinned from four pixels as to the input HD image, and further, the remaining pixel is subjected to filtering by the LPF (low-pass filter), thereby converting into an SD pixel in increments of one pixel.

Thus, in step S112, a lower resolution image than the image input to the low-resolution image generating unit 531 is generated by the low-resolution image generating unit 531, and a lower resolution image than the image generated by the low-resolution image generating unit 531 is generated by the low-resolution image generating unit 533.

In step S113, the vector quantizing unit 532 divides input image data, in this case, image data for HD into blocks. Subsequently, in step S114, the vector quantizing unit 532 references the vector quantization code held at the vector quantization codes holding unit 536 to obtain a vector closest to the input HD image, and outputs the vector quantization code thereof to the vector quantization code for HD updating unit 534 and vector quantization code for SD updating unit 535. Thus, the vector quantization code obtained with the HD image data is shared by the HD image and SD image, thereby providing a link between the HD and SD with the vector quantization code.

In step S115, the vector quantization code for HD updating unit 534 and vector quantization code for SD updating unit 535 each perform relearning by newly adding input HD image and SD image data to learning factors, thereby updating vector quantization codes. The data updated by the vector quantization code for HD updating unit 534 is supplied to the vector quantization code for HD holding unit 536, and the data updated by the vector quantization code for SD updating unit 535 is supplied to the vector quantization code for SD holding unit 537. Thus, updating is performed.

In step S116, the vector quantizing unit 532 determines whether or not all of the block data have been processed. In a case where determination is made in step S116 that all of the block data have not been processed, the processing returns to step S114, where the processing in step S114 and thereafter is repeated. On the other hand, in a case where determination is made in step S116 that all of the block data have been processed, the processing proceeds to step S117.

In step S117, determination is made whether or not all of the learning sequences have been completed, and in a case where determination is made that all of the learning sequences have not been completed, the processing returns to step S112, where the processing in step S112 and thereafter is repeated. According to such a loop, repetition processing is performed regarding an arbitrary learning source.

On the other hand, in a case where determination is made that all of the learning sequences have been completed, the processing proceeds to step S118. In step S118, determination is made whether or not end conditions have been cleared, and in a case where determination is made that the end conditions have not been cleared, the processing returns to step S112, where the processing in step S112 and thereafter is repeated. As the conditions, for example, determination is made with the number of times, or the square error sum of input data and created vector data, or the like.

On the other hand, in a case where determination is made in step S118 that the end conditions have been cleared, the processing proceeds to step S119. In step S119, determination is made that creation of the table has been completed. The table 470 thus created is supplied to the LUT holding unit 452 of the modulating device 450 to be held, or supplied to the LUT holding unit 512 of the demodulating device 510 to be held.

Figure 34:
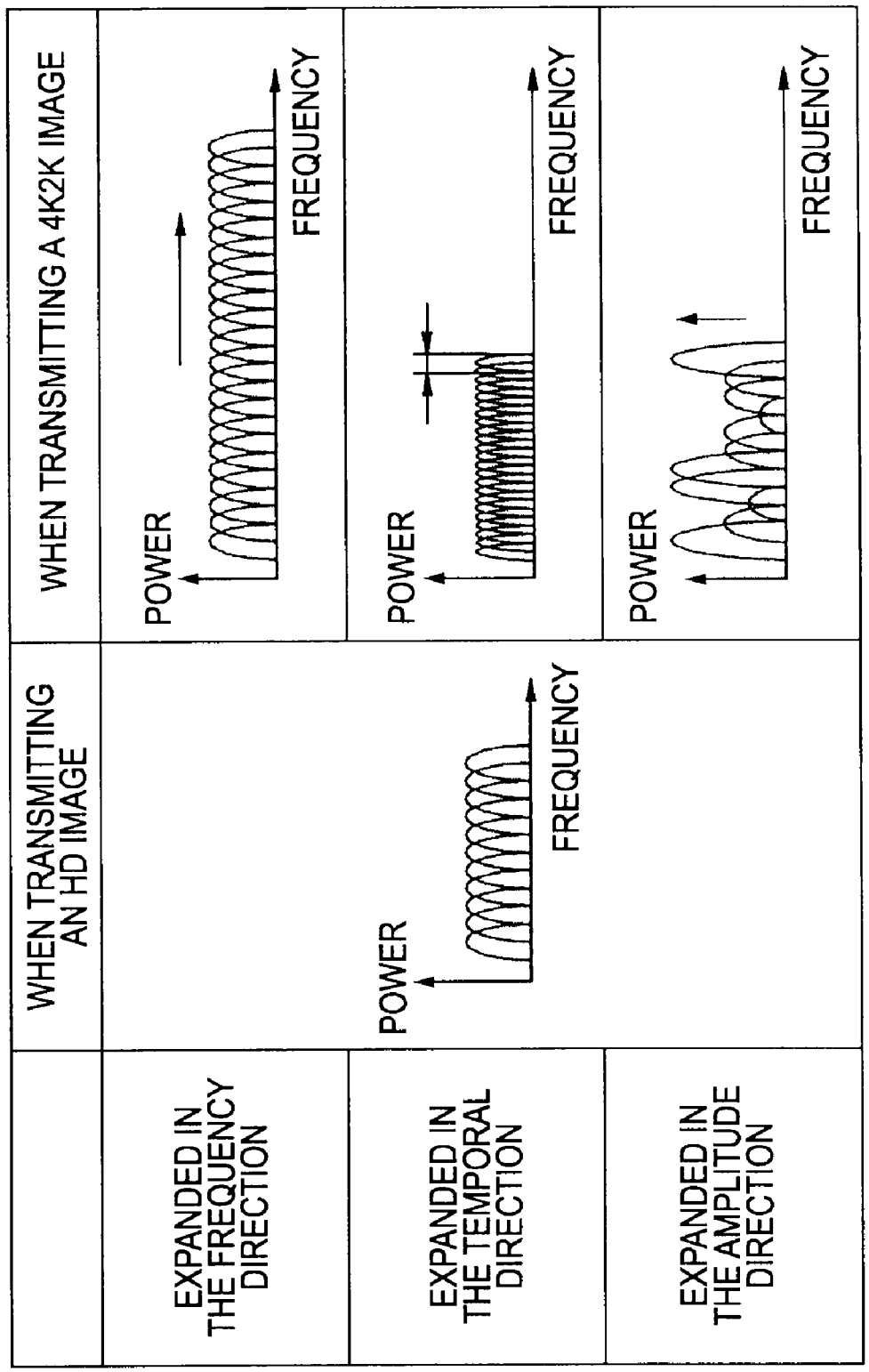
FIG. 34 is a diagram describing the difference of bands.

Incidentally, in a case where the band from which a low-resolution image which is an HD image can be transmitted is changed to the band from which a high-resolution image which is a 4K2K image can be transmitted, as shown in FIG. 34, three types of:
1. Expansion in the frequency direction,
2. Expansion in the temporal direction, and
3. Expansion in the amplitude direction
can be conceived.

Figure 35:
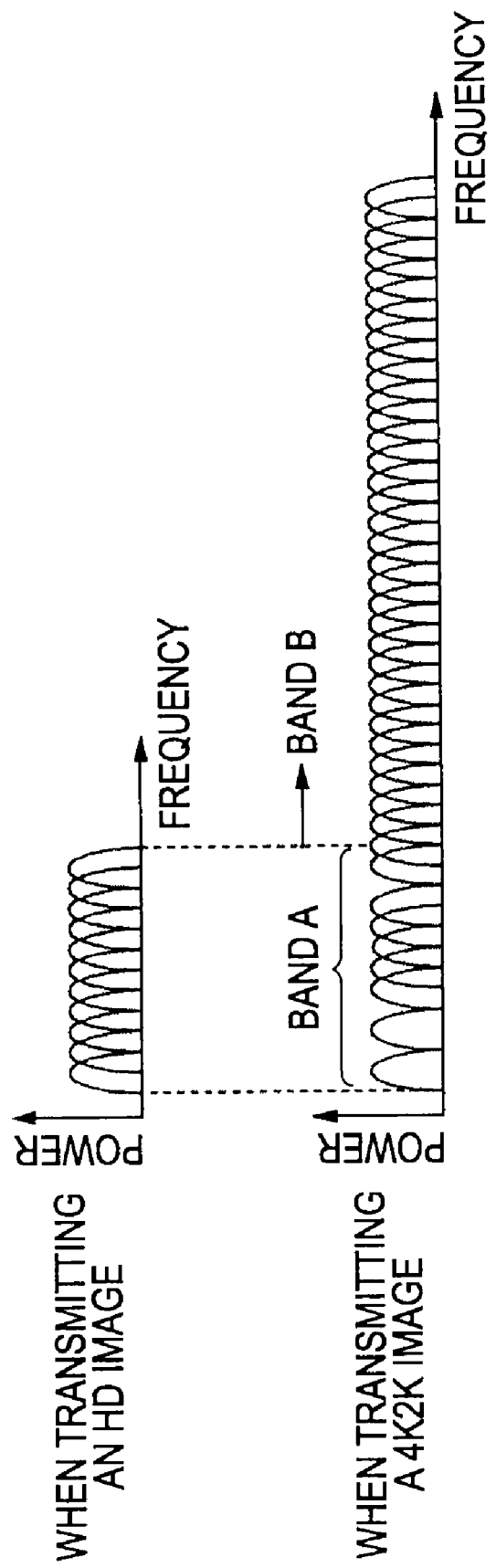
FIG. 35 is a diagram describing expansion in the frequency direction.

Description will be made with reference to the case of expansion in the frequency direction as an example. With a system which can handle HD images, in a case where estimation is made that high frequencies are not able to be handled (are not objects to be processed), a vector quantization code has to be embedded in a lower frequency of an occupancy bandwidth. Specifically, as shown in FIG. 35, of bands employed at the time of transmitting a 4K2K image, a vector quantization code is embedded in a portion corresponding to the width of a band A employed at the time of transmitting an HD image. Further, in other words, an arrangement is made wherein the above-mentioned subcarrier pattern is generated only by subcarriers included in this band A, and a vector quantization code is embedded therein.

Also, the band A and a band B which is a higher frequency band than the band A are employed at the time of transmitting a 4K2K image, but data to be usually transmitted is included in the band B. Thus, even when a 4K2K image is transmitted, even with a device which can process resolution up to HD images, the vector quantization code included in the band A can be extracted.

Thus, of the modulation band of the image data of a high-resolution image (e.g., the image data of a 4K2K image), with regard to only a subcarrier included in the modulation band of the image data of a low-resolution image (e.g., the image data of an HD image), a subcarrier pattern is set, and additional information is included therein, whereby a device which can process a high-resolution image, and a device which can process a low-resolution image can both receive and process the same image data. Also, a device which can process a low-resolution image has to process only the band A as a band to be processed, and does not have to be changed to a configuration whereby up to the band B can be processed.

Specifically, at the time of a situation wherein a device which can process a 4K2K image, and a device which can process an HD image are mixed, even if a 4K2K image is transmitted, the device which can process a 4K2K image can of course process the transmitted 4K2K image, but the device which can process an HD image can also process the transmitted 4K2K image. Consequently, a scalable system can be built.

Also, in addition to the method for expanding in the frequency direction, as shown in FIG. 34, there are the method for expanding in the temporal direction, and the method for expanding in the amplitude direction, but the present invention can be applied to these methods in the same way. For example, in the case of expanding in the temporal direction, a vector quantization code has to be embedded with a sampling interval over an arbitrary frequency axis. Also, for example, in the case of expanding in the amplitude direction, in the same way as in the case of expanding in the frequency direction, of the occupancy bandwidth, a vector quantization code has to be embedded in a portion which can process a transmitted HD image.

Third Embodiment

Next, description will be made regarding a third embodiment. The third embodiment is an embodiment for realizing data transmission with little deterioration. With a system including a modulating device and demodulating device which transmit compressed data, the third embodiment enables the demodulating device at the reception side to reproduce data effectively. Therefore, the modulating device at the transmission side transmits a reduced image as usual data, and transmits data for returning effectively by being embedded in a subcarrier. As described later, "data for returning effectively" which is embedded in a subcarrier and transmitted means the class value of the 1-bit ADRC obtained from four pixels of input data output from a class classifying unit 602.

The reception side obtains both data of the image data of the reduced image transmitted from the transmission side, and the data embedded in the subcarrier, and employs both data thereof to reproduce data before being subjected to modulation. By such processing being performed, data with little deterioration as compared to the related art can be reproduced.

Figure 36:
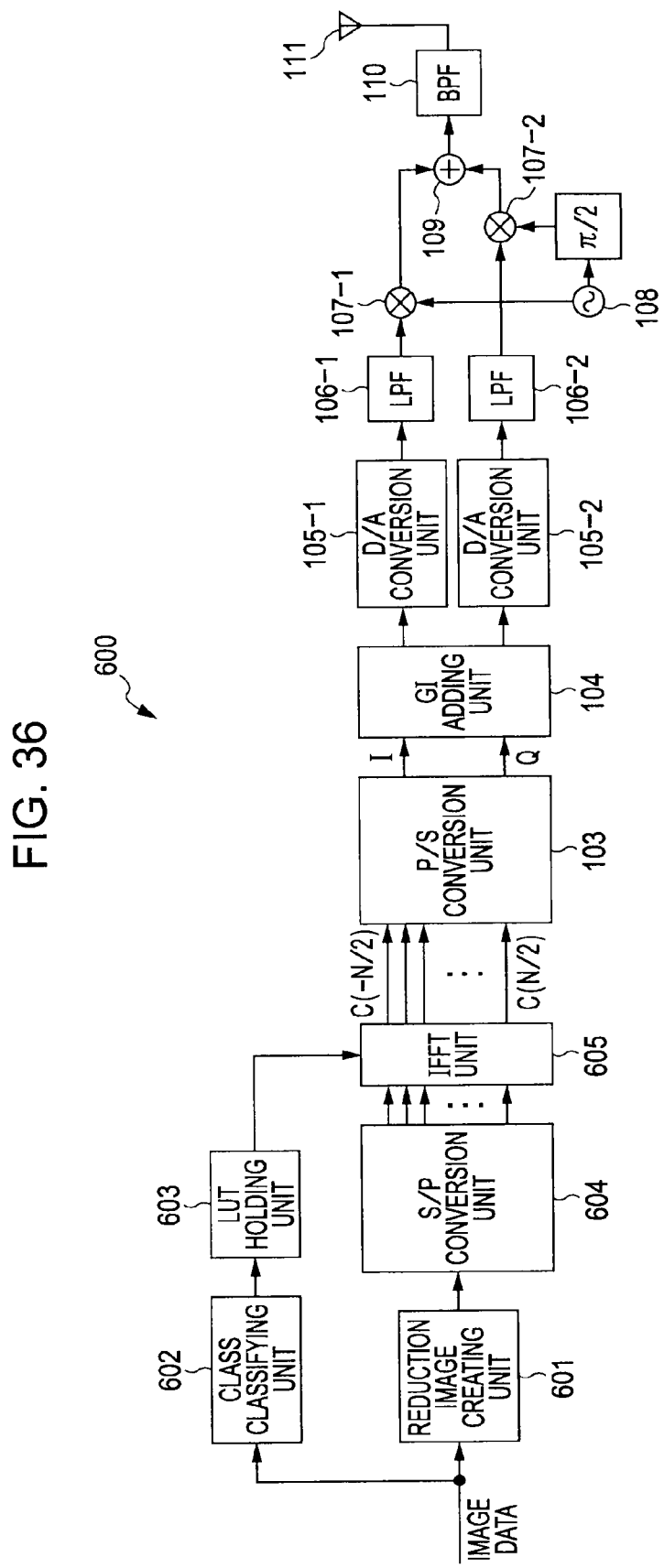
FIG. 36 is a diagram illustrating another configuration example of the modulating device.

First, description will be made regarding the modulating device which performs such processing. FIG. 36 is a diagram illustrating a configuration example of a modulating device 600 according to the third embodiment. With the modulating device 600 shown in FIG. 36 and the modulating device 100 shown in FIG. 6, the same components will be appended with the same reference numerals, and description thereof will be omitted as appropriate. The modulating device 600 shown in FIG. 36 has the configuration to which a reduction image creating unit 601 is added, as compared to the modulating device 100 shown in FIG. 6. Also, a class classifying unit 602 is employed instead of the compression encoding unit 112, and the table held at an LUT holding unit 603 differs from the table 131 held at the LUT holding unit 113.

The modulating device 600 shown in FIG. 36 is configured such that input image data is input to the reduction image creating unit 601 and class classifying unit 602, the data from the reduction image creating unit 601 is supplied to an IFFT unit 605 through a S/P conversion unit 604, and also the data from the class classifying unit 602 is supplied to the LUT holding unit 603, and the data from the LUT holding unit 603 is supplied to the IFFT unit 605. The configuration of the IFFT unit 605 and thereafter is the same as the configuration in the modulating device 100 shown in FIG. 6.

The operation of the modulating device 600 shown in FIG. 36 will be described with reference to the flowchart shown in FIG. 37. First, image data is input to the reduction image creating unit 601 and class classifying unit 602. Now, description will be made first regarding the processing by the class classifying unit 602. In step S141, class classifying processing is executed by the class classifying unit 602. As shown in FIG. 8, an image divided into blocks can be given as an example of the image data input to the class classifying unit 602.

Figure 38:
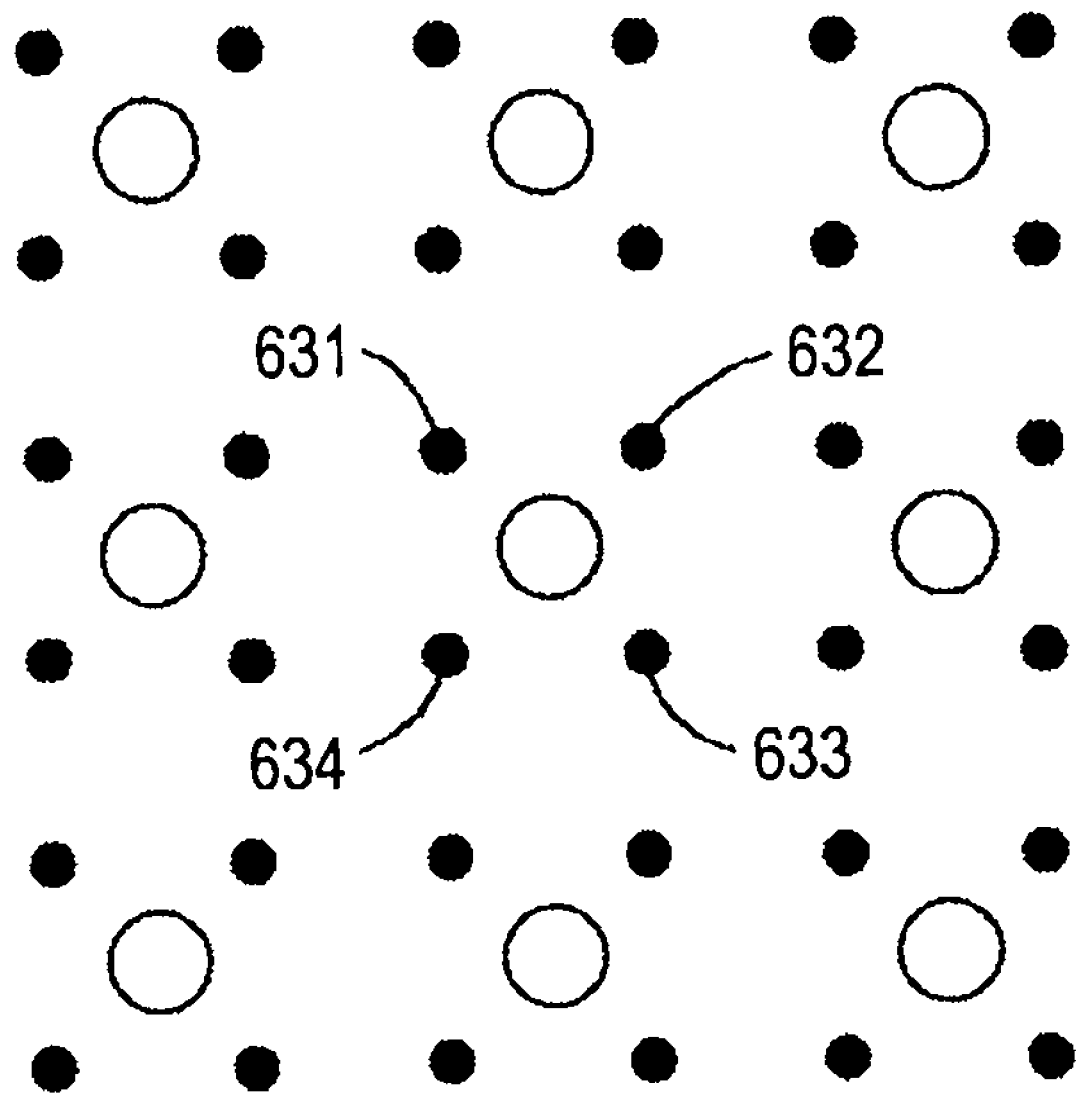
FIG. 38 is a diagram describing a pixel of interest at the time of class classification.

As shown in FIG. 38, the class classifying unit 602 extracts the four taps of pixels of interest 631 through 634 from the input data, and outputs the values corresponding to the pixel value patterns of these pixels as pixel of interest classes. In a case where many numbers of bits, for example, such as 8 bits or the like, are assigned to represent the pixel value of each input pixel, four pixels worth of the number of patterns reaches $(2^8)^4$ kinds which is an immense number. Such an immense number makes it difficult to realize increased speed of processing.

Therefore, as preprocessing before class classification is performed, a processing block is subjected to processing for reducing the number of bits of pixels making up the processing block thereof, for example, such as ADRC (Adaptive Dynamic Range Coding) processing or the like. With the ADRC processing, first, the maximum of the pixel values thereof (hereafter, referred to as the maximum pixel as appropriate), and the minimum thereof (hereafter, referred to as the minimum pixel as appropriate) are detected from four input pixels making up the processing block.

Subsequently, difference DR between the pixel value MAX of the maximum pixel and the pixel value MIN of the minimum pixel (MAX−MIN) is calculated, and with this DR as the local dynamic range of the processing block, the respective pixel values making up the processing block are quantized again to K bits fewer than the number of the original assigned bits based on this dynamic range DR. Specifically, the pixel value MIN of the minimum pixel is subtracted from the respective pixel values making up the processing block, and the respective subtraction values are divided by $DR/2^K$. As a result thereof, the respective pixel values making up the processing block are represented with K bits.

Accordingly, for example, in a case where K is set to 1, the number of pixel value patterns of the four input pixels becomes $(2^1)^4$ kinds. Accordingly, as compared to a case where the ADRC processing is not performed, the number of patterns can be greatly reduced. Note that the ADRC processing which thus converts pixel values into K bits will be described below as K-bit ADRC processing as appropriate.

Figure 37:
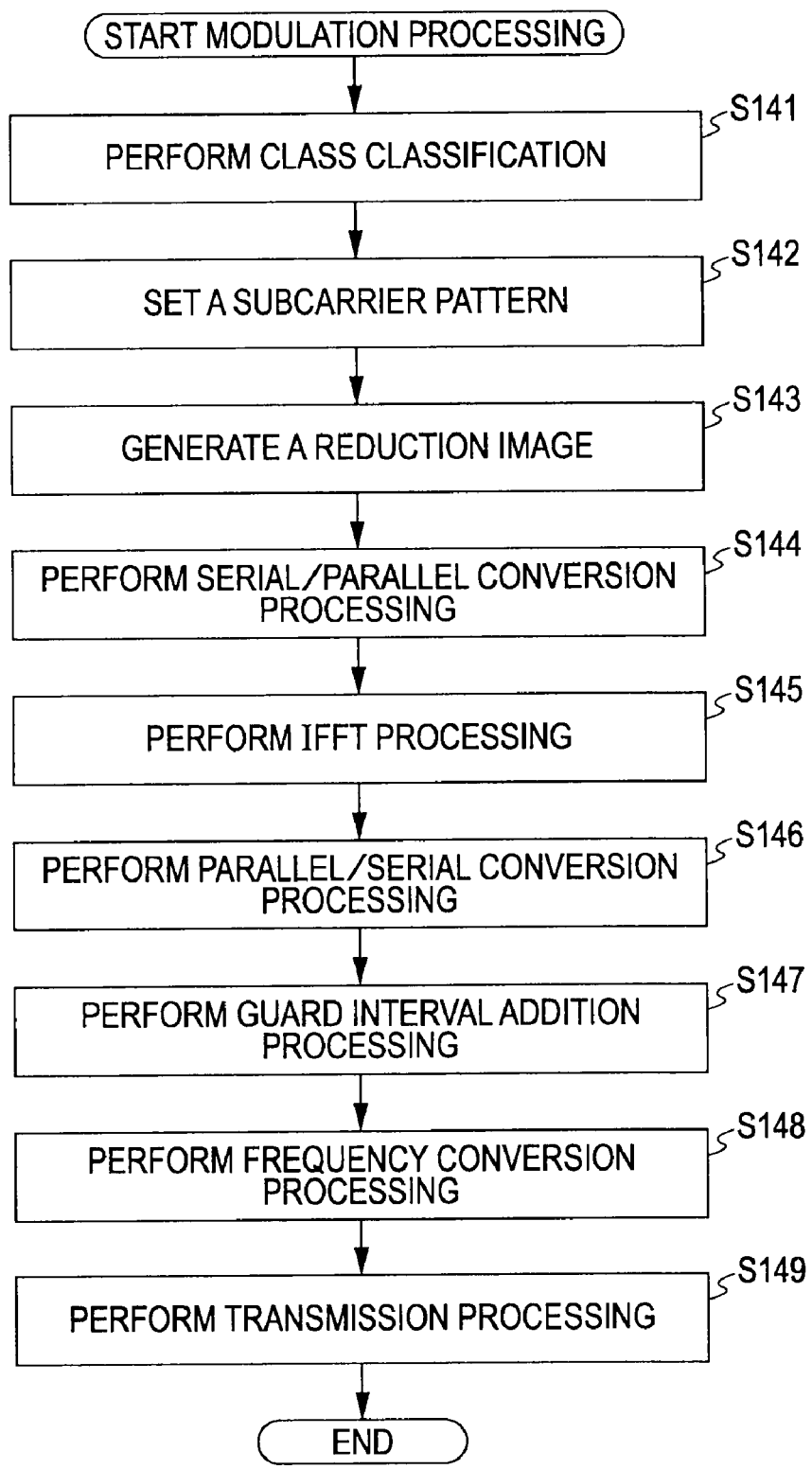
FIG. 37 is a flowchart describing the operation of the modulating device shown in FIG. 36.

Description will return to the flowchart shown in FIG. 37. Upon the class classifying being performed in step S141, the class value is determined. In step S142, the table (not shown) held at the LUT holding unit 603 is referenced based on the class value obtained as a result of the 1-bit ADRC processing such as described above, and selection of a subcarrier pattern is performed. In this case, the table in which a class value is correlated with a subcarrier pattern is held at the LUT holding unit 603. The LUT holding unit 603 notifies the subcarrier pattern corresponding to the determined class value to the IFFT unit 605.

Note that Japanese Unexamined Patent Application Publication No. 2000-217106 filed by the Present Assignee has disclosed processing relating to such class classifying and the calculation of a class value, and that an image can be reproduced accurately by employing the class of the 1-bit ADRC. This Japanese Unexamined Patent Application Publication No. 2000-217106 has disclosed that the optimal class code is transmitted by being embedded in the lower bit of the bit data transmitted as the additional information. The present embodiment differs from Japanese Unexamined Patent Application Publication No. 2000-217106 in that the optimal class code is not embedded in the lower bit of the bit data as the class value of the 1-bit ADRC obtained from the four pixels of the input pixel data but embedded in a subcarrier pattern.

Also, with the present embodiment, description will be made with reference to an example employing the class value of the 1-bit ADRC obtained from the four pixels of the input pixel data, but additionally, the present invention may be realized by employing the optimal motion vector of each block, side information, the optimal class value (class value disclosed in the above-mentioned Japanese Unexamined Patent Application Publication No. 2000-217106), or the like. That is to say, the information employed in the third embodiment is information for enabling a high image quality image when reproducing an image to be obtained, and such information is transmitted or received by being included in a subcarrier pattern.

Description will return to the flowchart shown in FIG. 37. In step S143, the reduction image creating unit 601 generates a reduction image. This processing is performed in parallel while the class classifying unit 602 is executing the processing relating to class classifying.

The reduction image creating unit 601 subjects the input image data to a method such as
1. Simple thinning, or
2. m×n pixel averaging (m and n are an arbitrary number of pixels).

Figure 39:
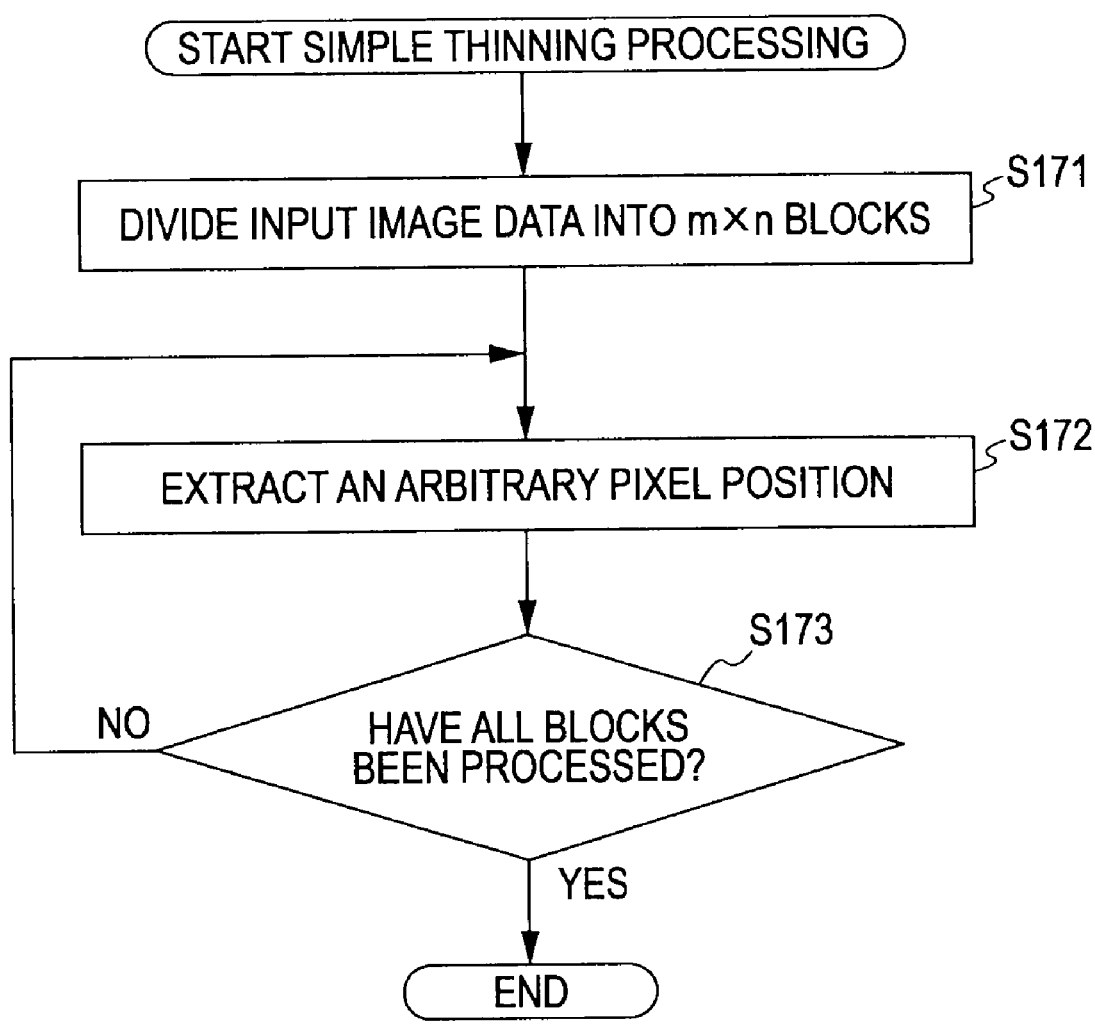
FIG. 39 is a flowchart describing simple thinning.
Figure 40:
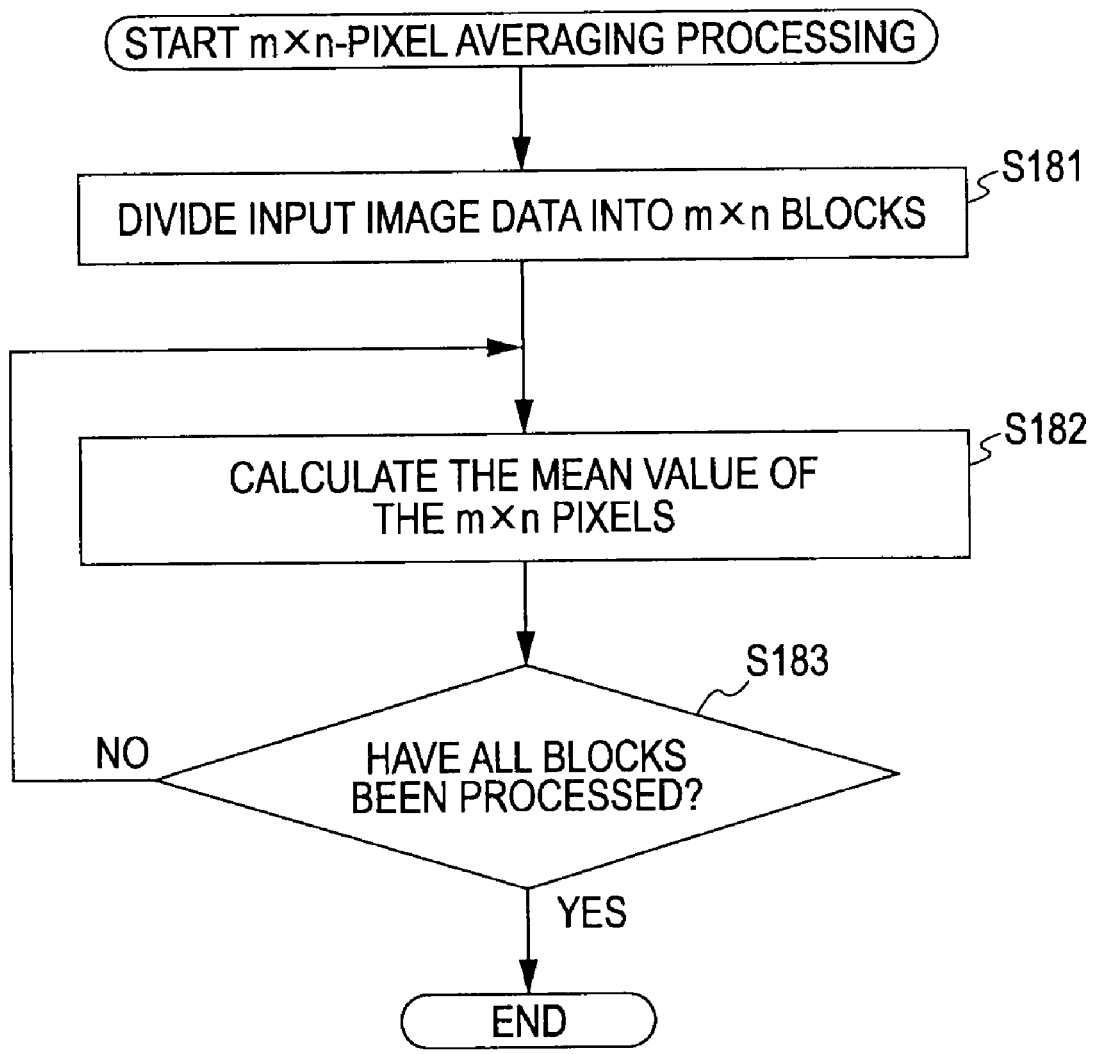
FIG. 40 is a flowchart describing a pixel average.

FIG. 39 illustrates a flowchart of the processing when creating a reduction image by the simple thinning, and FIG. 40 illustrates a flowchart of the processing when creating a reduction image by the m×n pixel averaging.

First, as shown in the flowchart shown in FIG. 39, in step S171, the image based on the input image data is converted into an image made up of an m×n block. That is to say, the input image is divided into multiple blocks configured of m×n pixels. In step S172, pixels positioned in arbitrary positions are extracted within the configured block. That is to say, the pixels are thinned out. For example, a block made up of 9×9 pixels is converted into a block made up of 3×3 pixels.

In step S173, determination is made whether or not the processing as to all of the blocks has been completed. In a case where determination is made in step S173 that the processing as to all of the blocks has not been completed, the processing returns to step S172, and the processing in step S172 and thereafter is repeated, whereby the respective blocks are converted into a block having a few number of pixels in order. On the other hand, in a case where determination is made in step S173 that the processing as to all of the blocks has been completed, this means that a reduction image has been generated, and accordingly, the processing of the flowchart shown in FIG. 39 ends.

As shown in the flowchart shown in FIG. 40, the same processing as step S171 is performed in step S181, whereby the image based on the input image data is converted into an image made up of an m×n block.

In step S182, the mean value of the m×n pixels is calculated. That is to say, the mean value of the pixels within one block is calculated. The mean value thereof is taken as the representative value of the block thereof. For example, in a case where the mean value of a 3×3 block is calculated, and the value thereof is taken as the pixel value of the block thereof, this means that the nine pixels are converted into one pixel.

The same processing as the above-mentioned step S173 is performed in step S183, whereby determination is made whether or not the processing as to all of the blocks has been completed. In a case where determination is made in step S183 that the processing as to all of the blocks has not been completed, the processing returns to step S182, and the processing in step S182 and thereafter is repeated, and in a case where the processing as to all of the blocks has been completed, this means that a reduction image has been generated, and accordingly, the processing of the flowchart shown in FIG. 40 ends.

Figure 41:
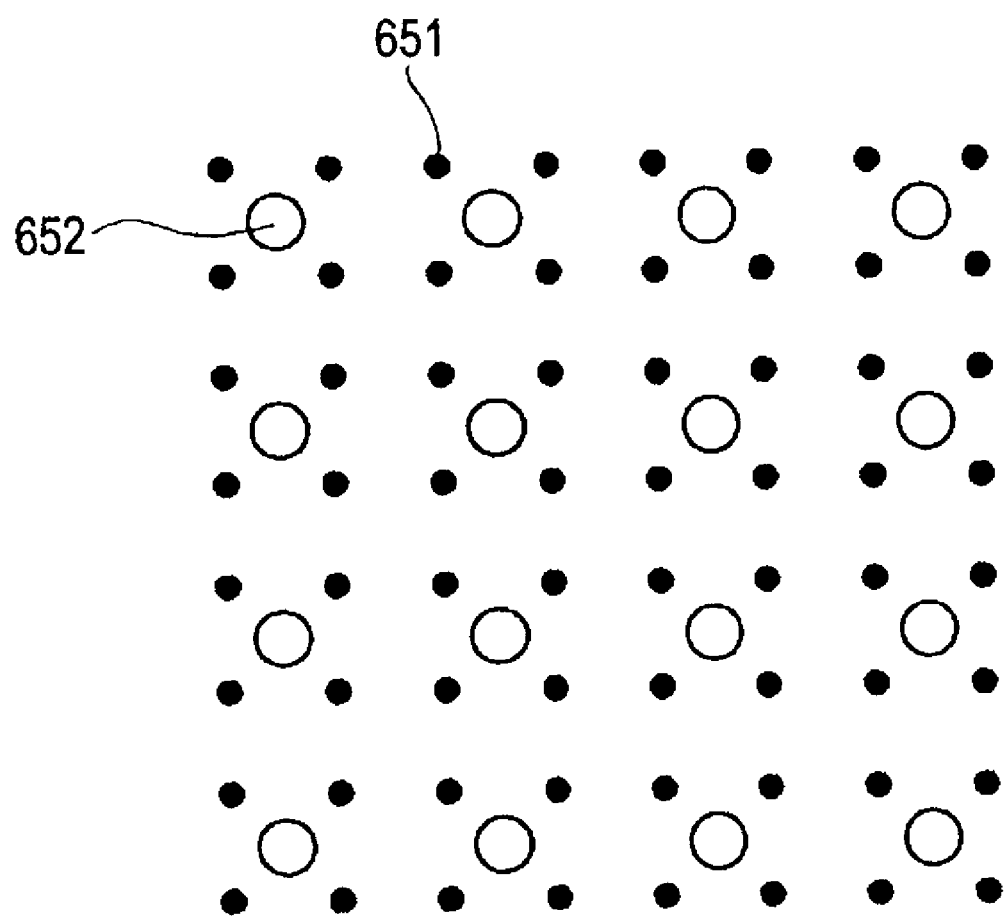
FIG. 41 is a diagram describing the position relation between the pixels of an input image and the pixels of a reduction image.

FIG. 41 is a diagram illustrating a phase relation between the pixels of the image input to the reduction image creating unit 601, and the pixels of the generated reduction image. In FIG. 41, pixels 651 shown in filled circles indicate the pixels of the input image, and pixels 652 shown in white circles indicate the pixels of the generated reduction image. The example shown in FIG. 39 illustrates a case where one pixel is generated from four pixels. Accordingly, in such a case, a ¼ reduction image is generated.

Description will return to the flowchart shown in FIG. 37. In step S144, serial/parallel conversion processing is executed. This processing in step S144 and thereafter, i.e., the processing performed at the S/P conversion unit 604 and thereafter is performed in the same way as the processing in steps S11, and S14 through S18, shown in FIG. 7, so description thereof will be omitted.

However, in step S145, the IFFT processing is executed at the IFFT unit 605, but the subcarrier pattern employed for this processing is a pattern determined based on the instructions from the LUT holding unit 603, and is a pattern determined for including a class value therein.

Figure 42:
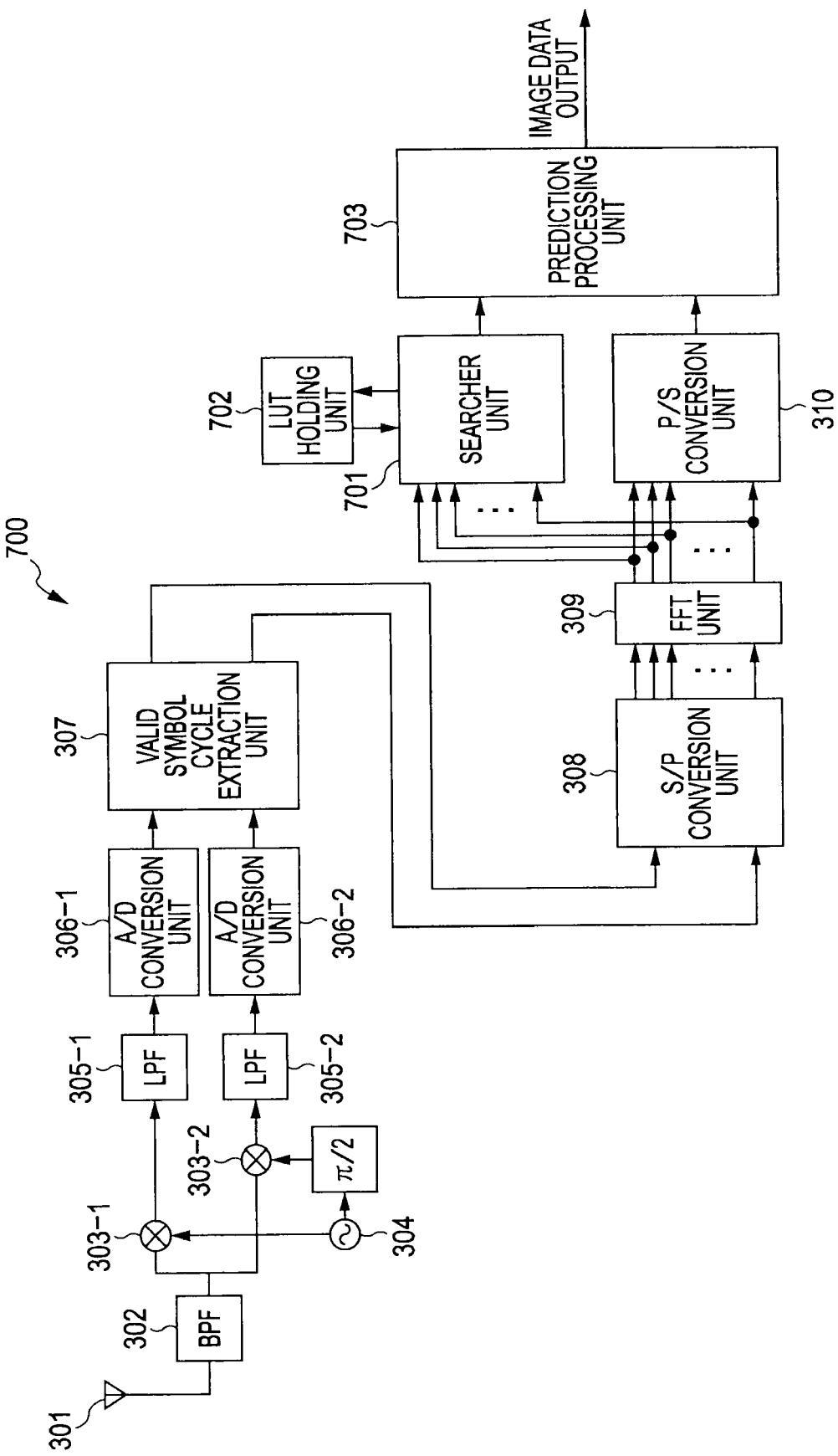
FIG. 42 is a diagram illustrating another configuration example of the demodulating device.

Next, description will be made regarding a demodulating device for demodulating the signal modulated at the modulating device 600 shown in FIG. 36. FIG. 42 is a diagram illustrating a configuration example of a demodulating device according to the third embodiment. The demodulating device 700 shown in FIG. 42 has a configuration obtained by replacing the error concealed processing unit 313 of the demodulating device 300 shown in FIG. 19 with a prediction processing unit 703.

Also, with the configuration of the demodulating device 700, the table held at an LUT holding unit 702 differs from the table 131 held at the LUT holding unit 312, and a searcher unit 701 which references the table thereof to perform processing differs from the searcher unit 311.

Figure 43:
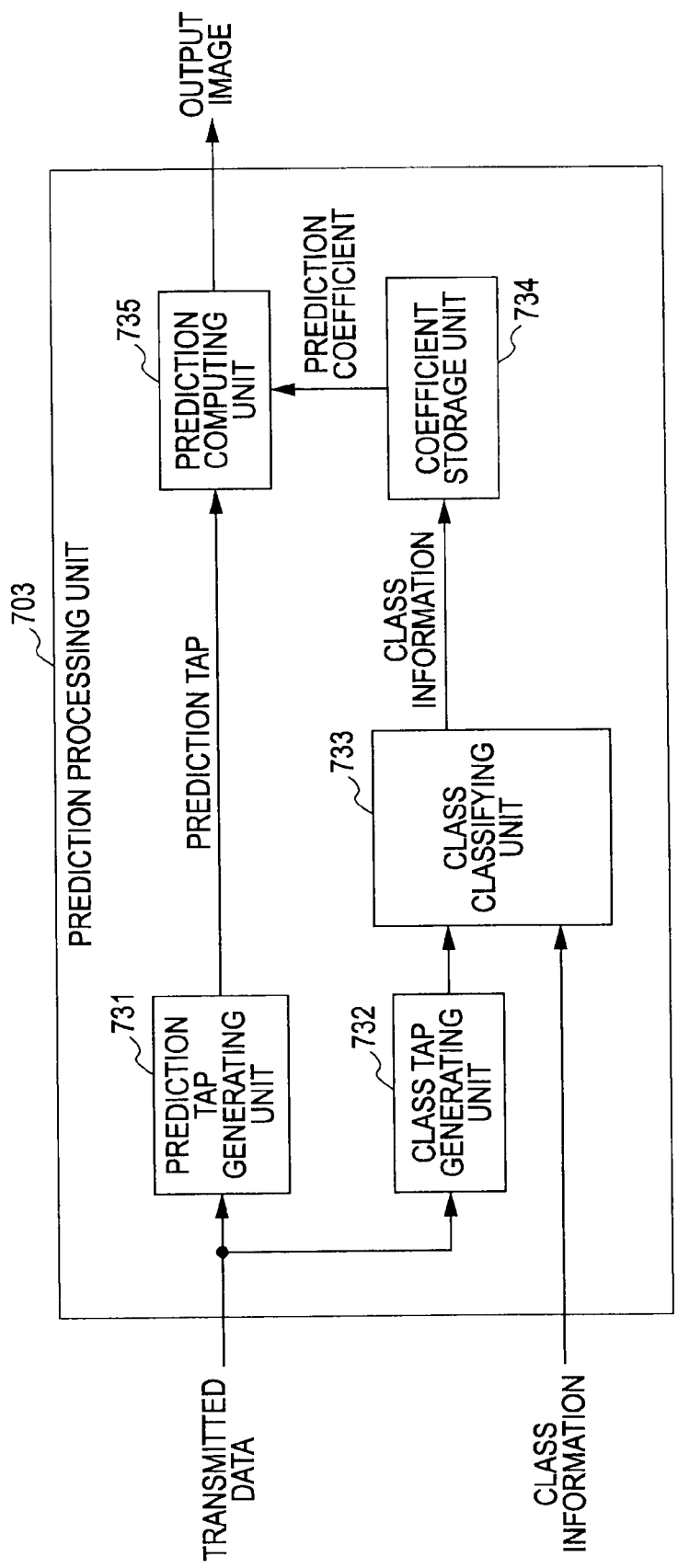
FIG. 43 is a diagram illustrating a configuration example of a prediction processing unit.

FIG. 43 is a diagram illustrating an internal configuration example of the prediction processing unit 703. The prediction processing unit 703 is configured so as to include a prediction tap generating unit 731, class tap generating unit 732, class classifying unit 733, coefficient storage unit 734, and prediction computing unit 735.

The transmission data from the P/S conversion unit 310 is supplied to the prediction tap generating unit 731 and class tap generating unit 732 of the prediction processing unit 703. The prediction tap from the prediction tap generating unit 731 is supplied to the prediction computing unit 735, and the class tap from the class tap generating unit 732 is supplied to the class classifying unit 733. The class information from the searcher unit 701 is also supplied to the class classifying unit 733.

The class information from the class classifying unit 733 is supplied to the coefficient storage unit 734. The prediction coefficient from the coefficient storage unit 734 is supplied to the prediction computing unit 735. The prediction computing unit 735 generates an output image from the supplied prediction tap and prediction coefficient to output this to the processing unit downstream.

Figure 44:
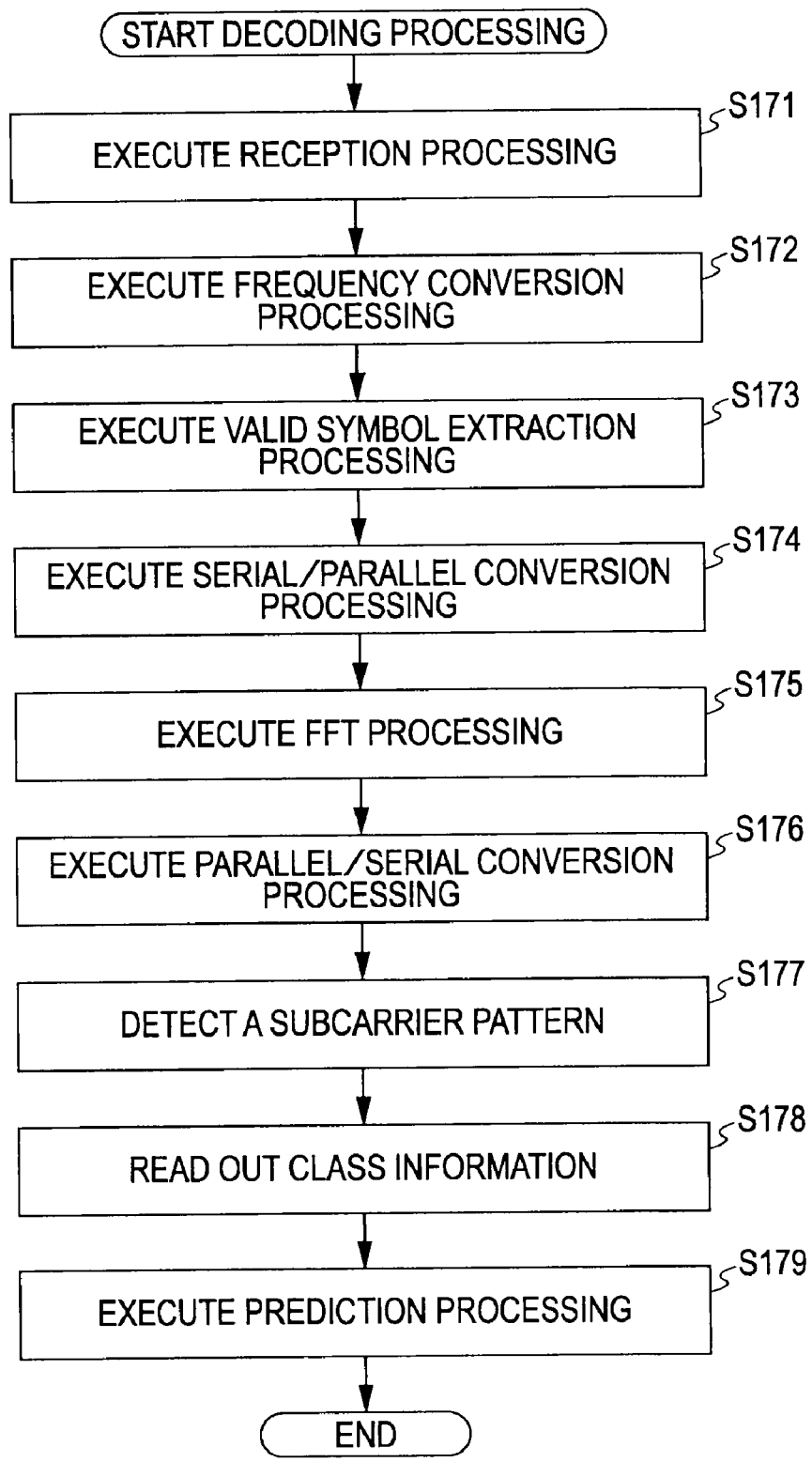
FIG. 44 is a flowchart describing the operation of the demodulating device shown in FIG. 42.

The operation of the demodulating device 700 shown in FIG. 42 will be described with reference to the flowchart shown in FIG. 44. Steps S171 through S177 are performed in the same way as the steps S61 through S67 of the flowchart shown in FIG. 21. That is to say, the operation of the demodulating device 700 shown in FIG. 42 is basically the same as the operation of the demodulating device 300 shown in FIG. 19, and the operation thereof is performed based on the flowchart shown in FIG. 21, but differs in that instead of readout of compressed data executed in step S68, class information is read out, and instead of the error concealed processing executed in step S69, prediction processing is executed.

That is to say, with the demodulating device 700, the image data demodulated from the P/S conversion unit 310 is output at the processing in step S176. Subsequently, in step S177 a subcarrier pattern is detected by the searcher unit 701, in step S178 the table held at the LUT holding unit 172 is referenced, and class information is read out. Subsequently, in step S179 the prediction processing is executed by the prediction processing unit 703. Description will be added regarding the prediction processing executed in step S179.

Figure 45:
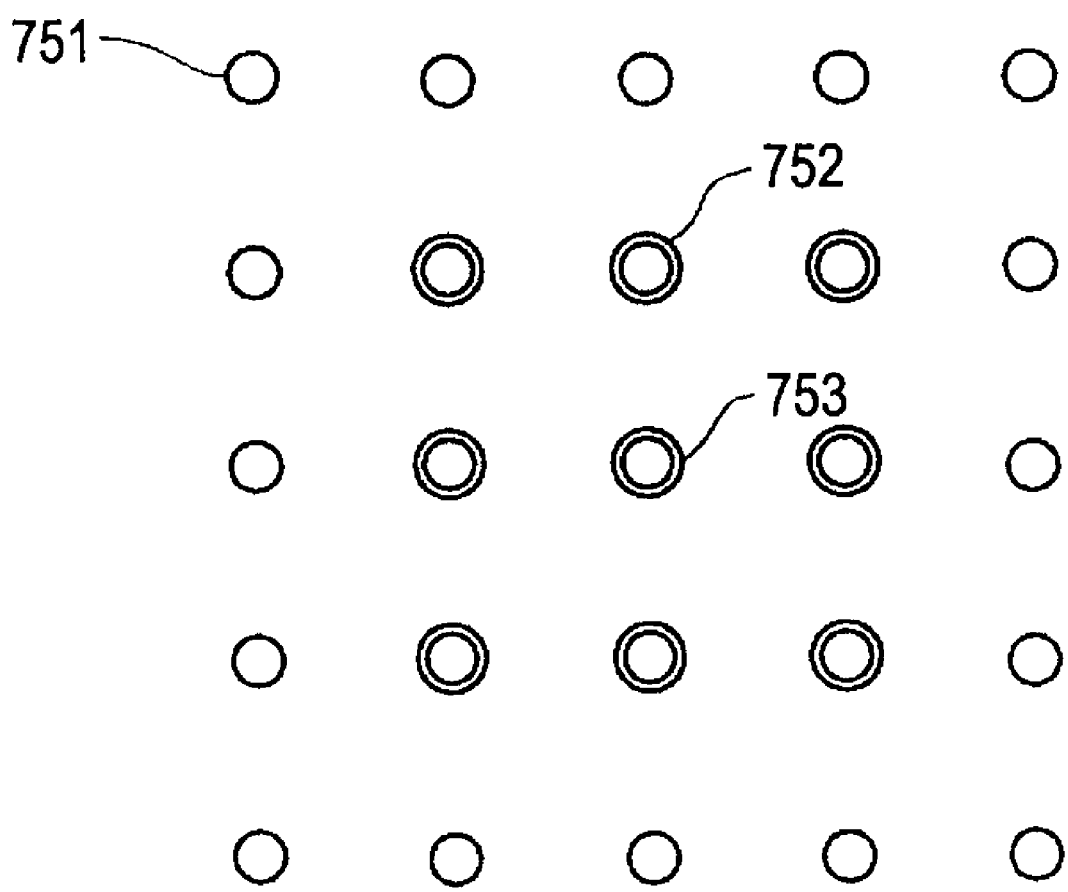
FIG. 45 is a diagram describing prediction taps.

The prediction tap generating unit 731 generates a prediction tap from the transmission data (image data in this case) supplied from the P/S conversion unit 310. FIG. 45 illustrates examples of prediction taps. In FIG. 45, white circles indicate pixels 751 of an image input to the prediction tap generating unit 731, and double circles indicate prediction taps 752. The image input to the prediction tap generating unit 731 is the reduction image created at the reduction image creating unit 601 of the modulating device 600. Accordingly, the pixels 751 are pixels making up the reduction image. Let us say that with a pixel of interest 753 as the center, the prediction taps 752 are nine pixels of 3×3 including the pixel of interest 753.

The prediction tap 752 is employed for obtaining the prediction value of an output pixel at the prediction computing unit 735, and is extracted from input data, and is supplied to the prediction computing unit 735.

Figure 46:
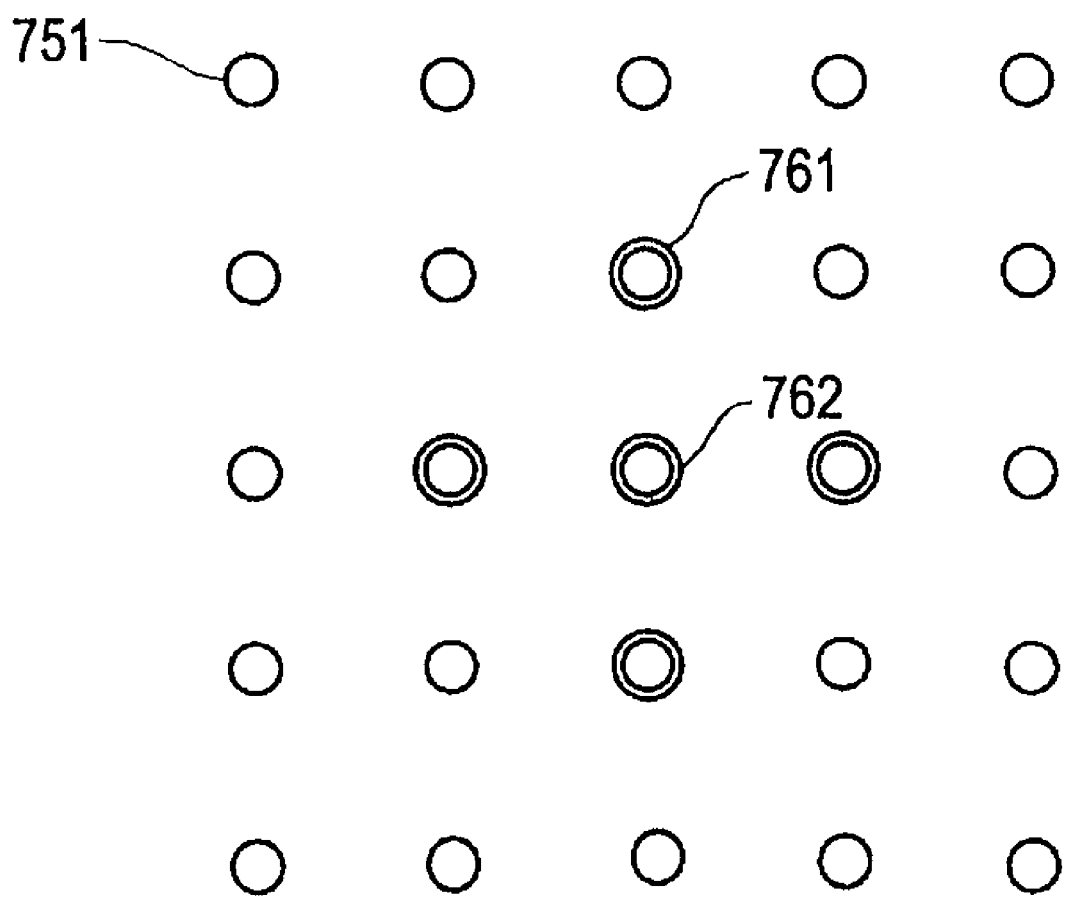
FIG. 46 is a diagram describing class taps.

The class tap generating unit 732 generates a class tap from the transmission data (image data in this case) supplied from the P/S conversion unit 310. FIG. 46 illustrates examples of class taps. In FIG. 46, white circles indicate pixels 751 of an image input to the class tap generating unit 732, and double circles indicate class taps 761. Let us say that with a pixel of interest 762 as the center, a class tap 761 is five pixels positioned vertically horizontally including the pixel of interest 762.

The class taps 761 are employed at the class classifying unit 733 downstream. The class taps 761 from the class tap generating unit 732, and the class information from the searcher unit 701, in this case, the class values of four pixels (1-bit ADRC) are supplied to the class classifying unit 733. The class classifying unit 733 generates a class code by applying the 1-bit ADRC processing to the class taps 761, and supplies this to the coefficient storage unit 734.

The coefficient storage unit 734 stores a class code and a prediction coefficient in a correlated manner. The coefficient storage unit 734 reads out the prediction coefficient correlated with the supplied class code, and supplies this to the prediction computing unit 735. The prediction computing unit 735 generates an output image by employing the prediction tap 752 from the prediction tap generating unit 731, and the prediction coefficient from the coefficient storage unit 734 to perform product sum operation, and outputs this to the unshown processing unit downstream. This output image becomes the original image of the image reduced by the reduction image creating unit 601 of the modulating device 600, i.e., the image based on the image data input to the reduction image creating unit 601.

Thus, with the demodulating device 700, the class values of four pixels can be reproduced by reproducing the image data of the reduction image from the modulating device 600 side, and the original image can be reproduced from the reproduced image data and class values. This original image is an image of which the number of pixels is greater than the reduction image, i.e., a high-precision image. Accordingly, even if the data exchanged between the modulating device 600 and demodulating device 700 according to the third embodiment is data in a small size (at least data in a smaller size than the data of an image to be reproduced), a high-precision image can be reproduced.

Fourth Embodiment

Next, description will be made regarding a fourth embodiment. The fourth embodiment is an embodiment wherein the transmission side adds to each piece of data a command (operand) for processing the data thereof to transmit this, thereby enabling the reception side to operate effectively. The fourth embodiment is employed in a case where two or more contents having different properties are processed simultaneously, for example, such as an effect referred to as picture-in-picture, an effect of caption processing shown in FIG. 48, or the like which are frequently employed as an effect of a television broadcasting program, and is a particularly effective embodiment in such a case.

Figure 47:
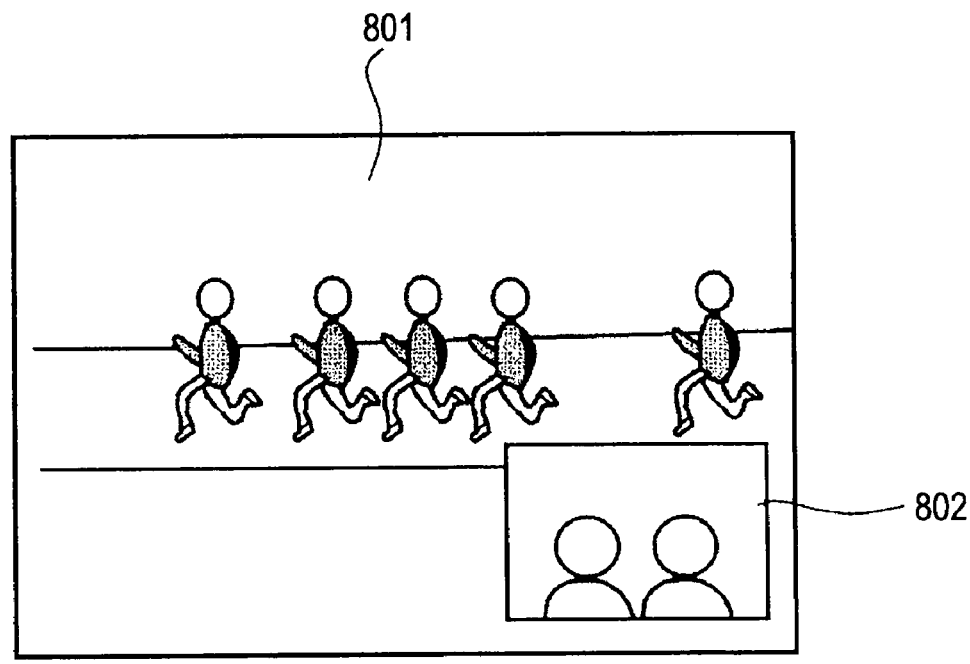
FIG. 47 is a diagram illustrating a screen example.

FIG. 47 is a diagram illustrating a screen example of picture-in-picture. Another image 802 is displayed over a television program screen (hereafter, referred to as the present screen 801). Thus, a situation is referred to as picture-in-picture in some cases, for example, wherein, at the time of a sport relay broadcast, the screen of the sport itself is taken as the present screen 801, and with a screen smaller than the present screen 801, for example, the image of a commentator is displayed over a portion of the present screen 801.

Figure 48:
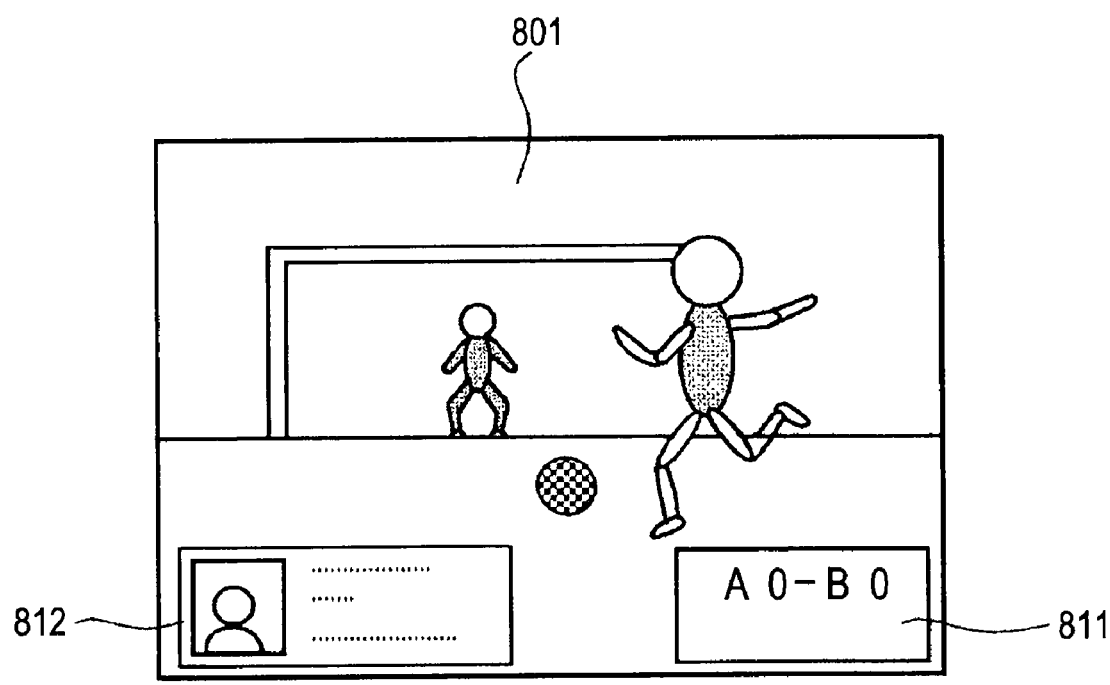
FIG. 48 is a diagram illustrating a screen example.

FIG. 48 is a diagram illustrating a screen example on which a caption is displayed. Another information, and principally information with text is displayed over the present screen 801. With the example shown in FIG. 48, at the time of a sport relay broadcast, the screen of the sport itself is taken as the present screen 801, and an intermediate step of the sport thereof (information such as a score) is displayed over the present screen 801 as a caption 811, and the information of a player is displayed over the present screen 801 as a caption 812.

Thus, an operand as to a screen such as the present screen 801, a picture or caption or the like displayed over the present screen 801, and specifically, an operand, for example, such as regarding on which position over the present screen 801 a caption is displayed, regarding in what size a caption is displayed, or the like, is included in a subcarrier.

Figure 49:
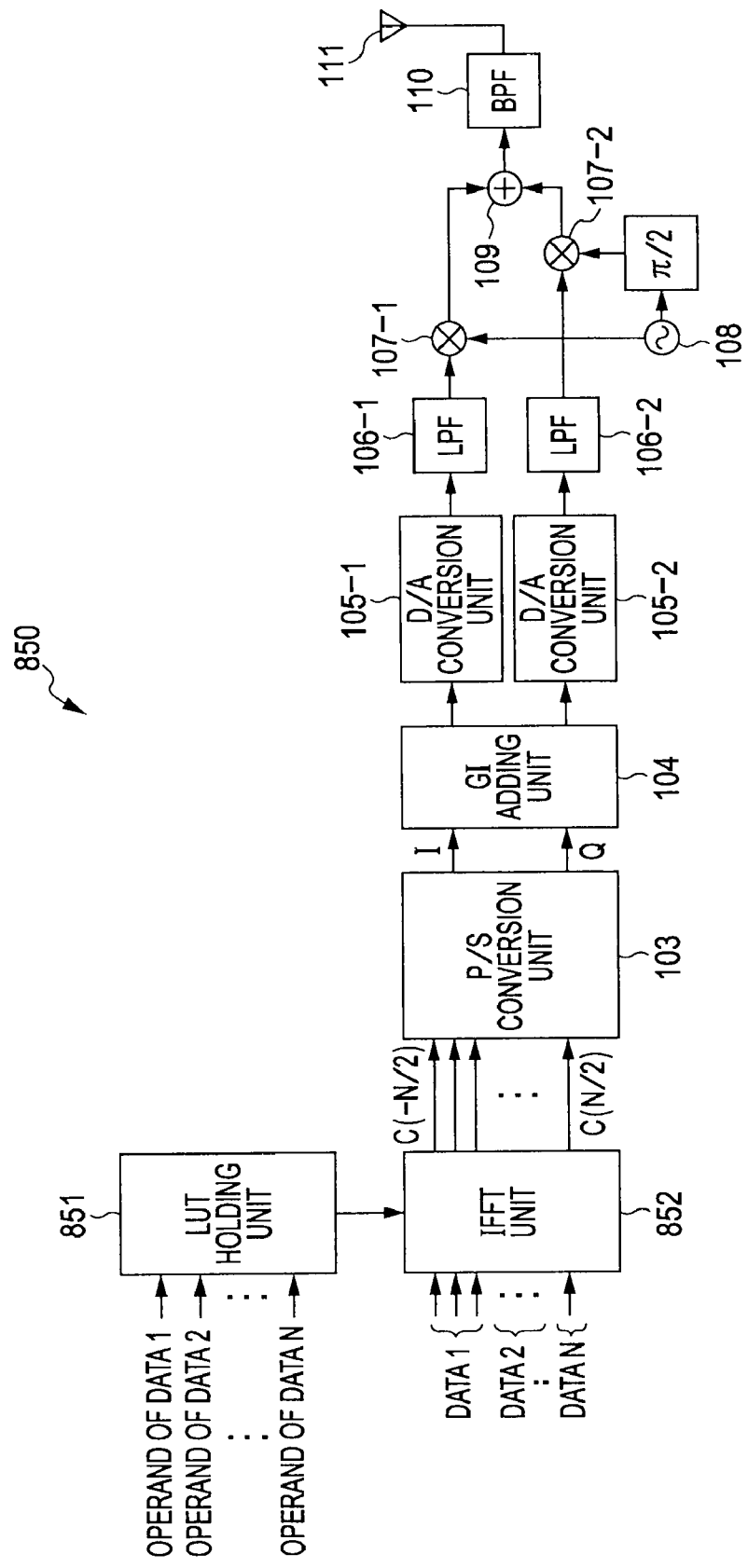
FIG. 49 is a diagram illustrating another configuration example of the modulating device.

FIG. 49 is a diagram illustrating a configuration example of a modulating device 850 according to the fourth embodiment. With the modulating device 850 shown in FIG. 49 and the modulating device 100 shown in FIG. 6, the same components are appended with the same reference numerals, and description thereof will be omitted. The modulating device 850 shown in FIG. 49 has the configuration from which the compression encoding unit 112 and S/P conversion unit 101 are removed, as compared to the modulating device 100 shown in FIG. 6, in which data is input directly to an LUT holding unit 851 and IFFT unit 852.

Note that, with the configuration example shown in FIG. 49, an arrangement is made wherein the S/P conversion unit 101 is removed, and data is input directly to an IFFT unit 852, but, of course, an arrangement may be made wherein the S/P conversion unit 101 is provided, in the same way as the above-mentioned embodiment, data input in serial is converted into parallel data, and then processing is performed.

An arrangement is made wherein different data is input to the LUT holding unit 851 and IFFT unit 852. The operand of data to be input to the IFFT unit 852 is input to the LUT holding unit 851, and the data is input to the IFFT unit 852. For example, in the case of the screen example shown in FIG. 47, the data input to the IFFT unit 852 is the data of the present screen 801 (referred to as data 1), and the data of the screen 802 (referred to as data 2), and at this time, the data to input to the LUT holding unit 851 is the operand of the data 1 and the operand of the data 2.

Also, in the case of the screen example such as shown in FIG. 48, the data input to the IFFT unit 852 is the data of the present screen 801 (referred to as data 1), the data of the caption 811 (referred to as data 2), and the data of the caption 813 (referred to as data 3), and at this time, the data input to the LUH holding unit 851 is the operand of the data 1, the operand of the data 2, and the operand of the data 3.

Thus, the number of data to be input to the LUT holding unit 851 and IFFT unit 852 differs depending on the number of screens to be superimposed on the screen. Also, all of the data to be input to the IFFT unit 852 do not have to have an operand, and accordingly, there is a case where the number of operands to be input to the LUT holding unit 852 is smaller than the number of data to be input to the IFFT unit 852. Also, multiple operands may be appended to one piece of data to be input to the IFFT unit 852, so there is a case where the number of operands to be input to the LUT holding unit 851 is greater than the number of data to be input to the IFFT unit 852.

Also, the data to be input to the IFFT unit 852 may be data having a different attribute such as audio or video, and an operand may be appended to each piece of data having a different attribute.

Figure 50:
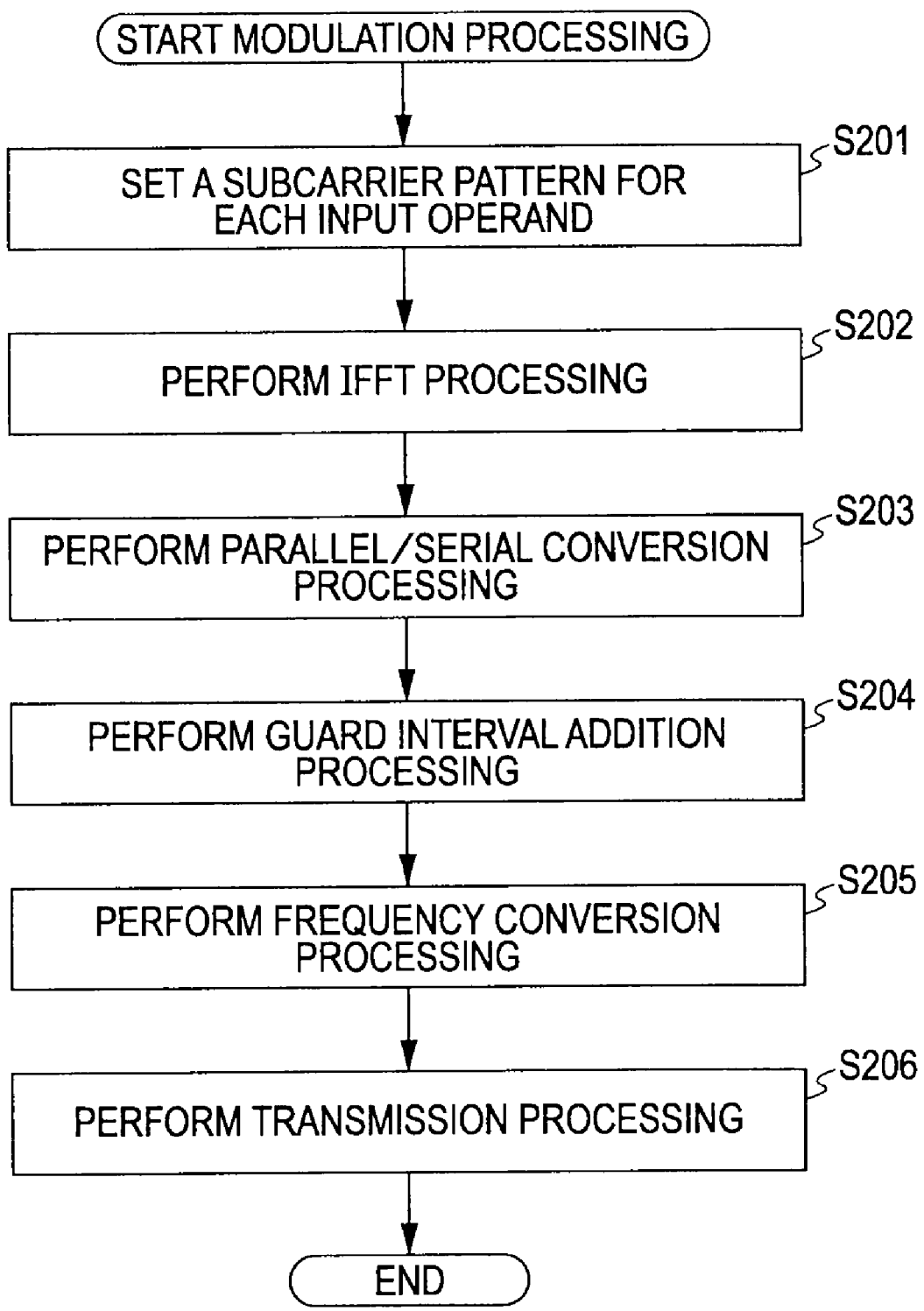
FIG. 50 is a flowchart describing the operation of the modulating device shown in FIG. 49.

Next, the operation of the modulating device 850 shown in FIG. 49 will be described with reference to the flowchart shown in FIG. 50. In step S201, an operand for each piece of data is input to the LUT holding unit 851. While an operand is input to the LUT holding unit 851, the data corresponding to the operand is also input to the IFFT unit 852. The LUT holding unit 851 sets a subcarrier pattern for each input operand.

The LUT holding unit 851 holds a table in which an operand is correlated with a subcarrier pattern (or information instructing a subcarrier pattern). When an operand is input, the LUT holding unit 851 references the held table to supply the subcarrier pattern corresponding to the input operand to the IFFT unit 852.

Figure 51:
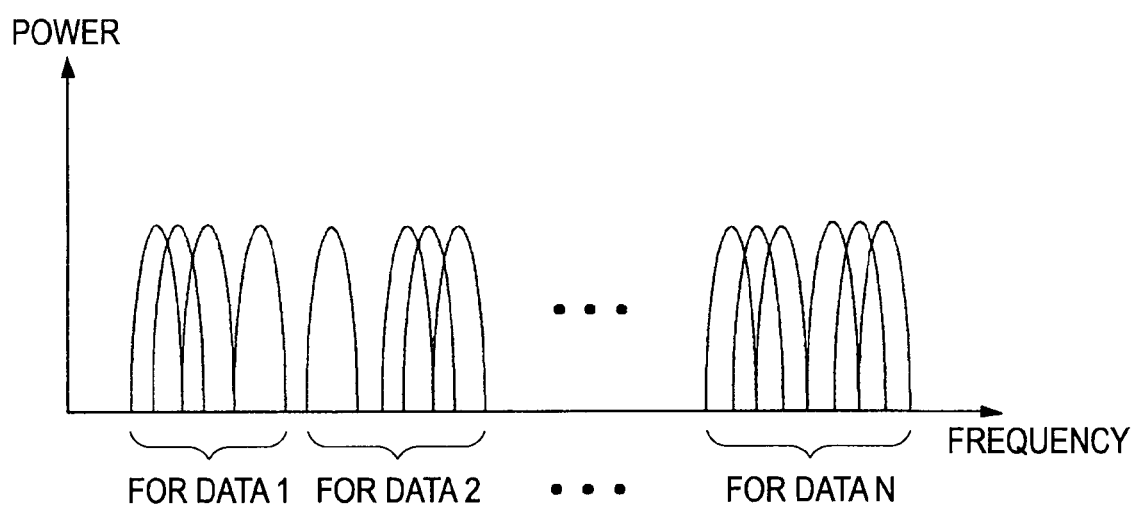
FIG. 51 is a diagram describing subcarrier patterns.

FIG. 51 is a diagram for describing the subcarrier pattern selected with the operand. As shown in FIG. 51, a subcarrier pattern is set for each of data 1 through data N, such as a subcarrier pattern for the operand of the data 1, a subcarrier pattern for the operand of the data 2, and so on through a subcarrier pattern for the operand of the data N.

Examples of an operand included in a subcarrier pattern include an operand such as a zoom ratio of XXX power with regard to the data 1, an operand such as noise removal with regard to the data 2, and so on through an operand such that the value of γ is set to YYY with regard to the data N.

In step S202, the IFFT unit 852 subjects the input data 1 through data N to the IFFT processing with the subcarrier pattern based on the instructions from the LUT holding unit 851, thereby performing modulation processing. The processing in step S202 and thereafter is performed in the same way as the processing in step S14 in FIG. 7 and thereafter, so description thereof will be omitted.

Figure 52:
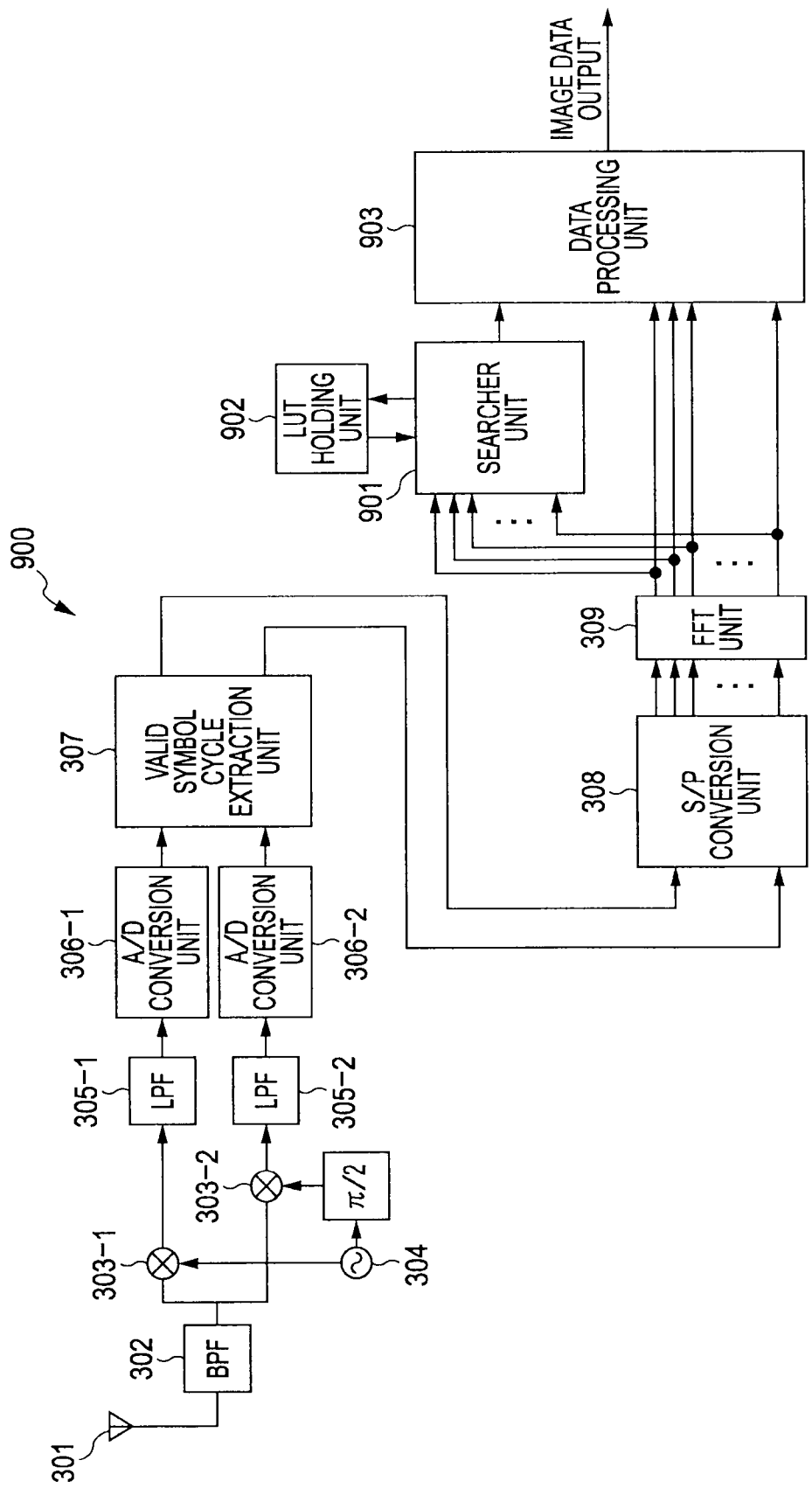
FIG. 52 is a diagram illustrating another configuration example of the demodulating device.

Thus, description will be made regarding a demodulating device which is a device at the reception side for receiving data and the operand as to the data. FIG. 52 is a diagram illustrating a configuration example of a demodulating device 900 according to the fourth embodiment. The demodulating device 900 shown in FIG. 52 has the configuration of the demodulating device 300 shown in FIG. 19 from which a data processing unit 903 is employed instead of the error concealed processing unit 313, the P/S conversion unit 310 is removed, in which the data from the FFT unit 309 is input directly to the data processing unit 903.

Also, the table held at the LUT holding unit 902 differs from the table 131 held at the LUT holding unit 312, and a searcher unit 901 for referencing the table thereof to perform processing differs from the searcher unit 311.

Figure 53:
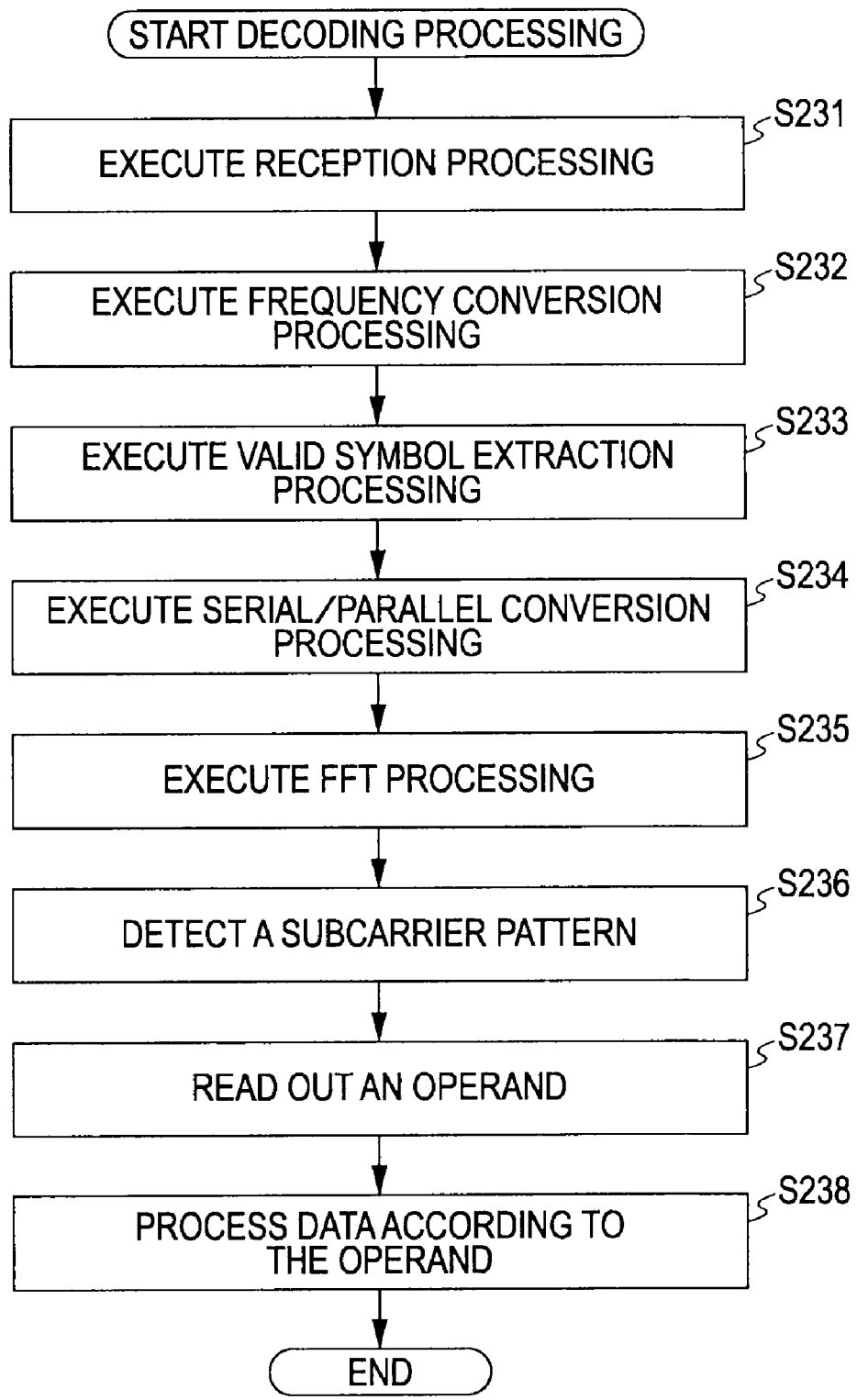
FIG. 53 is a flowchart describing the operation of the demodulating device shown in FIG. 52.

The operation of the demodulating device 900 shown in FIG. 52 will be described with reference to the flowchart shown in FIG. 53. Steps S231 through S236 are performed in the same way as the steps S61 through S65, and S67 in the flowchart shown in FIG. 21. That is to say, the operation of the demodulating device 900 shown in FIG. 52 is basically the same operation of the demodulating device 300 shown in FIG. 19, and the operation thereof is performed based on the flowchart shown in FIG. 21, but differs in that the parallel/serial conversion processing executed in step S66 is not performed (because the P/S conversion unit 310 is removed from the configuration), an operand is read out instead of readout of compressed data executed in step S68, and data processing is executed instead of the error concealed processing executed in step S69.

Specifically, with the demodulating device 900, in the processing up to step S235, the demodulated image data is output from the FFT unit 309. Subsequently, in step S236 a subcarrier pattern is detected by the searcher unit 901, in step S237 the table held at the LUT holding unit 902 is referenced, and an operand is read out. Subsequently, in step S238 data processing is executed by the data processing unit 903.

The data processing unit 903 receives supply of the operand read out from the LUT holding unit 902 by the searcher unit 901, and also receives supply of the data subjected to the FFT processing at the FFT unit 309, i.e., supply of the demodulated data. The data processing unit 903 employs the operand and the data corresponding to the operand thereof to subject the data to processing as appropriate. For example, in a case where the operand is instructions for setting the zoom ratio to XXX power as to the data 1, the data processing unit 903 subjects the data 1 from the FFT unit 309 to processing for converting into an image zoomed in by XXX power.

Thus, the demodulating device 900 side can read out the operand as to predetermined data from a subcarrier pattern. Accordingly, for example, with the modulating device 850 side, an operand for performing reduction is simply included in a subcarrier pattern without creating a reduced image beforehand to transmit this, whereby a reduced image can be reproduced with the demodulating device 900 side. Thus, effective data processing can be performed.

Fifth Embodiment

Next, description will be made regarding a fifth embodiment. The embodiment to be described as the fifth embodiment is an embodiment in which the first through fourth embodiments are collected.

Figure 54:
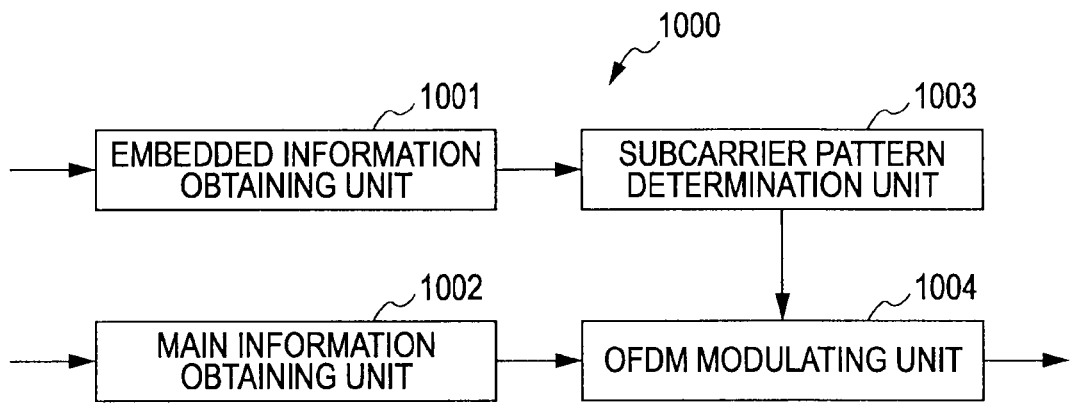
FIG. 54 is a diagram illustrating another configuration example of the modulating device.

FIG. 54 is a diagram illustrating a configuration example of a modulating device 1000 according to the fifth embodiment. The modulating device 1000 is configured of an embedded information obtaining unit 1001, main information obtaining unit 1002, subcarrier pattern determination unit 1003, and OFDM modulating unit 1004.

The embedded information obtaining unit 1001 is equivalent to, for example, each of the compression encoding unit 112 according to the first embodiment, the compression encoding unit 451 according to the second embodiment, the class classifying unit 602 according to the third embodiment, and the LUT holding unit 851 according to the fourth embodiment. The embedded information obtaining unit 1001 obtains information (additional information) to be desired to be embedded in a subcarrier pattern, such as a vector quantization code (first and second embodiments), class value (third embodiment), operand (fourth embodiment) or the like.

The subcarrier pattern determination unit 1003 is equivalent to, for example, each of the compression encoding unit 112 and LUT holding unit 113 according to the first embodiment, the compression encoding unit 451 and LUT holding unit 452 according to the second embodiment, the class classifying unit 602 and LUT holding unit 603 according to the third embodiment, and the LUT holding unit 851 according to the fourth embodiment. The subcarrier pattern determination unit 1003 determines the subcarrier pattern corresponding to a vector quantization code (first and second embodiments), the subcarrier pattern corresponding to a class value (third embodiment), or the subcarrier pattern corresponding to an operand (fourth embodiment).

The main information obtaining unit 1002 is equivalent to, for example, each of the S/P conversion unit 101 according to the first embodiment, the S/P conversion unit 101 according to the second embodiment, the reduction image creating unit 601 and S/P conversion unit 604 according to the third embodiment, and the IFFT unit 852 according to the fourth embodiment. The main information obtaining unit 1002 is a unit for obtaining data serving as an object of modulation which is desired to be transmitted. In other words, embedded information is additional information, and information serving as a subject to which the additional information thereof is added is main information, and the main information obtaining unit 1002 obtains the main information thereof.

The OFDM modulating unit 1004 is equivalent to, for example, each of the S/P conversion unit 101 through BPF 110 according to the first embodiment, the S/P conversion unit 101 through BPF 110 according to the second embodiment, the S/P conversion unit 604, IFFT unit 605, and P/S conversion unit 103 through BPF 110 according to the third embodiment, and the IFFT unit 852, P/S conversion unit 102 through BPF 110 according to the fourth embodiment. The OFDM modulating unit 1004 subjects the main information obtained at the main information obtaining unit 1002 to the OFDM modulation based on the subcarrier pattern determined at the subcarrier pattern determination unit 1003.

Note that, with the present embodiment, description has been made regarding a case where the OFDM modulation is performed as an example, but the present embodiment can be applied when employing a modulation method employing a subcarrier with the orthogonal frequency division multiplex method or the like.

Figure 55:
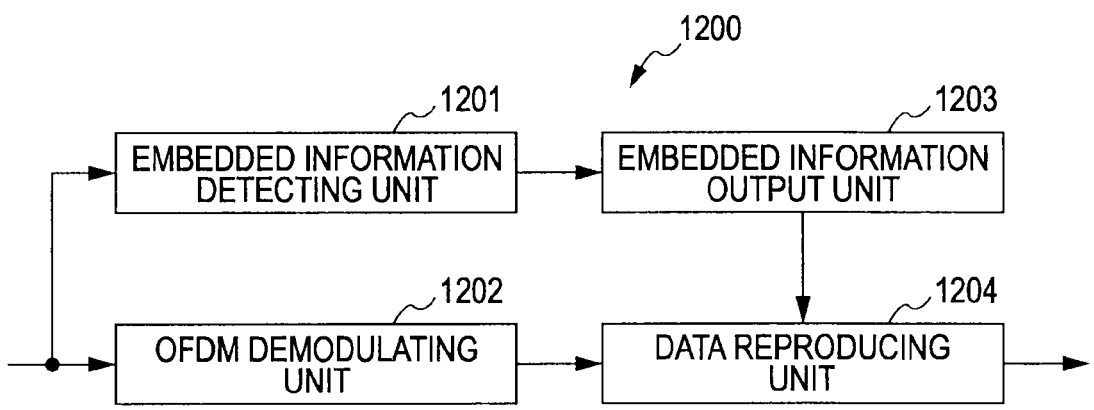
FIG. 55 is a diagram illustrating another configuration example of the demodulating device.

Next, description will be added regarding a demodulating device according to the fifth embodiment. FIG. 55 is a diagram illustrating a configuration example of a demodulating device 1200 according to the fifth embodiment. The demodulating device 1200 is configured of an embedded information detecting unit 1201, OFDM demodulating unit 1202, embedded information output unit 1203, and data reproducing unit 1204.

The embedded information detecting unit 1201 is equivalent to, for example, each of the searcher unit 311 and LUT holding unit 321 according to the first embodiment, the searcher unit 511 and LUT holding unit 512 according to the second embodiment, the searcher unit 701 and LUT holding unit 702 according to the third embodiment, and the searcher unit 901 and LUT holding unit 902 according to the fourth embodiment. The embedded information detecting unit 1201 obtains information embedded in a subcarrier pattern, such as a vector quantization code (first and second embodiments), class value (third embodiment), operand (fourth embodiment), or the like.

The embedded information output unit 1203 is equivalent to, for example, each of the searcher unit 311 and LUT holding unit 321 according to the first embodiment, the searcher unit 511 according to the second embodiment, the searcher unit 701 according to the third embodiment, and the searcher unit 901 according to the fourth embodiment. The embedded information output unit 1203 outputs information such as the vector quantization code, class value, operand, or the like detected by the embedded information detecting unit 1201.

The OFDM demodulating unit 1202 is equivalent to, for example, each of the BPF 302 through P/S conversion unit 310 according to the first embodiment, the BPF 302 through P/S conversion unit 310 according to the second embodiment, the BPF 302 through P/S conversion unit 310 according to the third embodiment, and the BPF 302 through FFT unit 309 according to the fourth embodiment. The OFDM demodulating unit 1202 subjects the received data to the OFDM modulation, thereby reproducing data before being modulated.

The data reproducing unit 1204 is equivalent to, for example, each of the error concealed processing unit 313 according to the first embodiment, the P/S conversion unit 310 and searcher unit 511 according to the second embodiment, the prediction processing unit 703 according to the third embodiment, and the data processing unit 903 according to the fourth embodiment. The data reproducing unit 1204 applies the embedded information from the embedded information output unit 1203 to the data demodulated at the OFDM demodulating unit 1202 (corresponding to the main information), thereby reproducing the data.

However, with the second embodiment, the embedded information and main information are separately output to downstream processing, so the data form the OFDM demodulating unit 1202, and the embedded information from the embedded information output unit 1203 are separately output to downstream processing, thereby providing a configuration excluding the data reproducing unit 1204.

As described above, according to the present invention, data compressed by a different compression method is transmitted as data relating to input data with a subcarrier, thereby enabling robustness to be improved. Also, according such an arrangement, an additional bit such as error correction or the like does not have to be provided, thereby enabling high speed data communication to be performed.

Also, according to the present invention, a circuit configuration can be provided wherein a complex circuit and extra memory for performing error correction which are employed for wireless communication according to the related art do not have to be provided, thereby enabling effective use of substrate space, and accordingly enabling reduction in development cost to be expected.

Also, according to the present invention, with a system which upgrades the function of a casing by inserting/extracting a new module, LSI, or substrate, the function employed before being upgraded can be used effectively.

Also, according to the present invention, such an advantage simplifies development such that all that has to be done is to develop only the difference between a new created module, LSI, substrate, new function or the like and the module, LSI, substrate, new function or the like employed so far, thereby enabling development cost and development man-hour to be reduced.

Also, according to an embodiment of the present invention, a signal for realizing a contrivance whereby a compressed image can be restored effectively is transmitted as data relating to input data with a subcarrier, thereby enabling processing an image with little deterioration.

Further, according to an embodiment of the present invention, a control signal for operating input data is transmitted simultaneously as data relating to the input data with a subcarrier, thereby enabling signal processing efficiency to be improved, and doing away with having to transmit a signal for control with another line, and accordingly, enabling reduction in wiring, effective use of substrate space, reduction in substrate development cost, and so forth.

The above-mentioned series of processing can be executed not only by hardware but also by software. In the event of executing the series of processing by software, a program making up the software thereof is installed from a program recording medium into a computer built into dedicated hardware, or for example, a general-purpose personal computer or the like which is capable of executing various types of function by various types of program being installed thereto.

Figure 56:
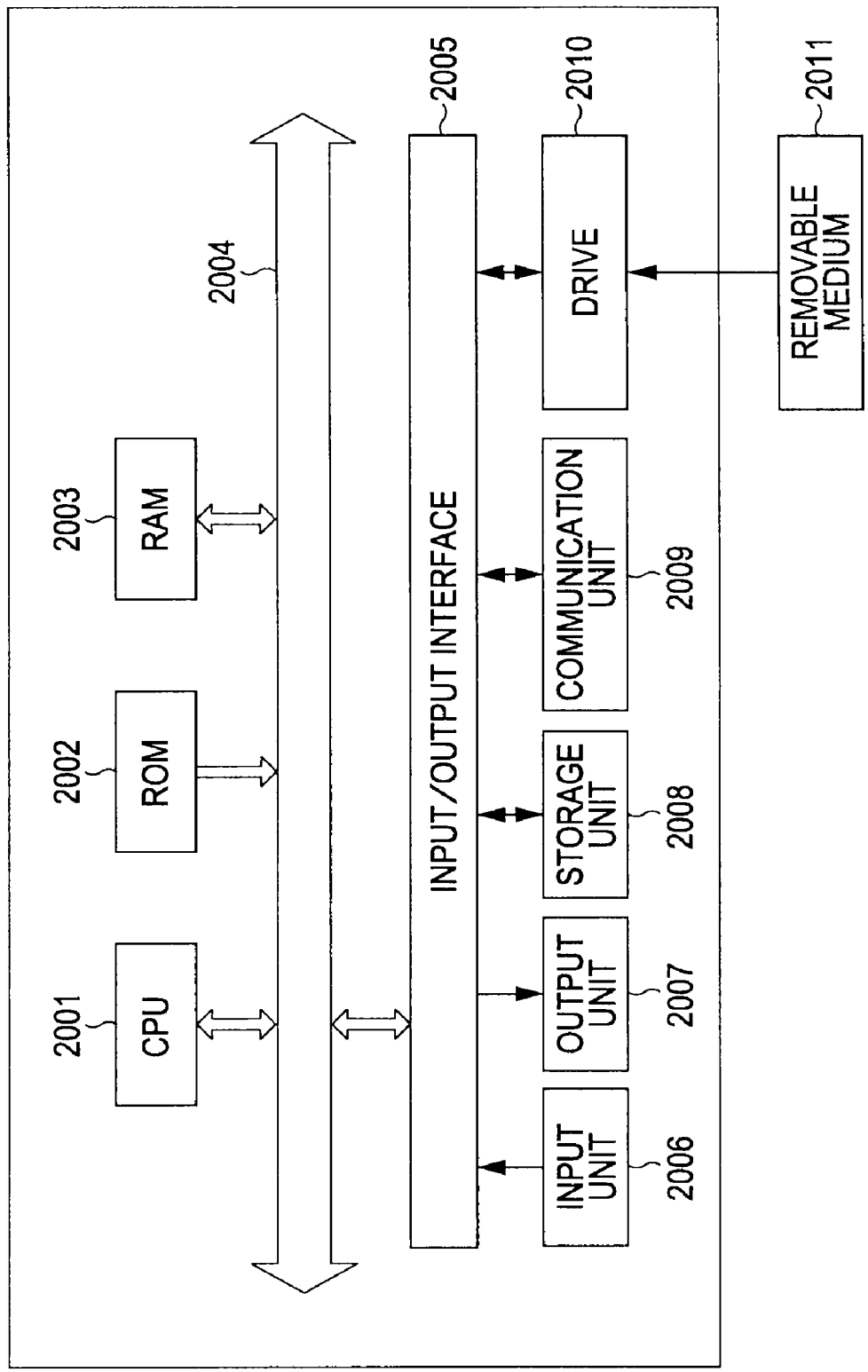
FIG. 56 is a diagram describing recording media.

FIG. 56 is a block diagram illustrating an example of the configuration of the hardware of a personal computer which executes the above-mentioned series of processing by the program.

With the computer, a CPU (Central Processing Unit) 2001, ROM (Read Only Memory) 2002, and RAM (Random Access Memory) 2003 are connected mutually by a bus 2004. Further, an input/output interface 2005 is connected to the bus 2004. The input/output interface 2005 is connected with an input unit 2006 made up of a keyboard, mouse, microphone, and so forth, an output unit 2007 made up of a display, speaker, and so forth, a storage unit 2008 configured of a hard disk, nonvolatile memory, or the like, a communication unit 2009 configured of a network interface or the like, and a drive 2010 which drives a removable medium 2011 such as a magnetic disk, optical disc, magneto-optical disk, or semiconductor memory.

With the computer thus configured, the CPU 2001 loads, for example, a program stored in the storage unit 2008 through the input/output interface 2005 and bus 2004, and executes this, thereby performing the above-mentioned series of processing. The program executed by the computer (CPU 2001) is provided by being recorded in the removable medium 2011 which is a package medium made up of, for example, a magnetic disk (including flexible disk), optical disc (CD-ROM (Compact Disc-Read Only Memory), DVD (Digital Versatile Disc), etc.), magneto-optical disk, semiconductor memory, or the like, or through cable or wireless transmission medium such as a local area network, the Internet, digital satellite broadcasting, or the like.

Subsequently, the program can be installed in the storage unit 2008 through the input/output interface 2005 by the removable medium 2011 being mounted on the drive 2010. Alternatively, the program can be installed in the storage unit 2008 by being received at the communication unit 2009 through a cable or wireless transmission medium. Additionally, the program can be installed in the ROM 2002 or storage unit 2008 beforehand.

Note that the program executed by the computer may be a program wherein the processing is performed in time series along a described order within the present Specification, or may be a program wherein the processing is performed in parallel or at a suitable timing such as calling, or the like.

Also, with the present Specification, the term "system" represents the entirety of equipment configured of multiple devices.

Note that embodiments of the present invention are not restricted to the above-mentioned embodiments, and various modifications can be made without departing from the essence and spirit of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A modulating device configured to perform modulation with an orthogonal frequency division multiplexing method, comprising:
    modulating means configured to modulate main information with the orthogonal frequency division multiplexing method; and
    determining means configured to determine a subcarrier pattern employed when modulating the main information by the modulating means based on additional information relating to the main information, wherein
    said determining means determines a vector quantization code from vector data at a time of compressing the main information, and regards the determined vector quantization code as the additional information to determine a subcarrier pattern corresponding to the additional information, and
    the determining means determines a subcarrier pattern included in a modulation band of image data of a low-resolution image, of a modulation band of image data of a high-resolution image.

2. The modulating device according to claim 1, further comprising:
    holding means configured to hold a table in which the vector quantization code is correlated with the vector data.

3. The modulating device according to claim 1, further comprising:
    holding means configured to hold a table in which vector data for each format is respectively correlated with one vector quantization code.

4. The modulating device according to claim 1, with the main information being image data, further comprising:
    reducing means configured to reduce an image based on the image data; and
    output means configured to execute class classifying processing upon the image data to output a class value, wherein
    the modulating device modulates the image data of the image reduced by the reducing means, and
    the determining means determines a subcarrier pattern corresponding to the class value.

5. The modulating device according to claim 1, wherein
    the main information is a content,
    the additional information is an operand as to the content, and
    the determining means determines the subcarrier pattern for each of the operand.

6. The modulating device according to claim 1, wherein
    the main information is image data of a plurality of images displayed on one screen,
    the additional information is an operand for each of the plurality of images, and
    the determining means determines the subcarrier pattern for each of the operand.

7. A modulating method for a modulating device configured to perform modulation with an orthogonal frequency division multiplexing method, comprising:
    determining a subcarrier pattern employed when modulating main information based on additional information relating to the main information; and
    modulating the main information with the orthogonal frequency division multiplexing method based on the determined subcarrier pattern, wherein the determining includes:
    determining a vector quantization code from vector data at a time of compressing the main information, and regarding the determined vector quantization code as the additional information to determine a subcarrier pattern corresponding to the additional information, and
    determining a subcarrier pattern included in a modulation band of image data of a low-resolution image, of a modulation band of image data of a high-resolution image.

8. A non-transitory computer-readable medium storing a program, which when executed by a computer causes the computer to perform a method comprising:
    determining a subcarrier pattern employed when modulating main information based on additional information relating to the main information; and
    modulating the main information with the orthogonal frequency division multiplexing method based on the determined subcarrier pattern, wherein the determining includes:

determining a vector quantization code from vector data at a time of compressing the main information, and regarding the determined vector quantization code as the additional information to determine a subcarrier pattern corresponding to the additional information, and determining a subcarrier pattern included in a modulation band of image data of a low-resolution image, of a modulation band of image data of a high-resolution image.

9. A modulating device configured to perform modulation with an orthogonal frequency division multiplexing method, comprising:

a modulator configured to modulate main information with said orthogonal frequency division multiplexing method; and a processor configured to determine a subcarrier pattern employed when modulating said main information by said modulator based on additional information relating to said main information, wherein the processor is configured to:

determine a vector quantization code from vector data at a time of compressing the main information, and regard the determined vector quantization code as the additional information to determine a subcarrier pattern corresponding to the additional information, and determine a subcarrier pattern included in a modulation band of image data of a low-resolution image, of a modulation band of image data of a high-resolution image.

\* \* \* \* \*